United States Patent [19]

Yazaki et al.

[11] Patent Number: 4,850,676

[45] Date of Patent: Jul. 25, 1989

[54] METHOD FOR DRIVING A LIQUID CRYSTAL ELEMENT

[75] Inventors: Minoru Yazaki; Yuzuru Sato; Akihiko Ito, all of Suwa, Japan

[73] Assignee: Seiko Epson Corporation, Tokyo, Japan

[21] Appl. No.: 34,176

[22] PCT Filed: Jul. 28, 1986

[86] PCT No.: PCT/JP86/00396

§ 371 Date: Mar. 22, 1987

§ 102(e) Date: Apr. 22, 1987

[30] Foreign Application Priority Data

| | | | |
|---|---|---|---|
| Jul. 31, 1985 | [JP] | Japan | 60-169445 |
| Aug. 13, 1985 | [JP] | Japan | 60-178120 |
| Oct. 2, 1985 | [JP] | Japan | 60-219364 |
| Nov. 18, 1985 | [JP] | Japan | 60-258181 |
| Mar. 3, 1986 | [JP] | Japan | 61-45868 |

[51] Int. Cl.[4] ........ G02F 1/13; G09G 3/00

[52] U.S. Cl. ........ 350/332; 340/805

[58] Field of Search ........ 350/333; 340/715, 716, 340/805, 803

[56] References Cited

U.S. PATENT DOCUMENTS 4,380,008 4/1983 Kawakami et al. ........ 340/805

FOREIGN PATENT DOCUMENTS 2856134 6/1979 Fed. Rep. of Germany ...... 340/805
60-263124 12/1985 Japan ........ 350/333
2141279 12/1984 United Kingdom ........ 350/333

OTHER PUBLICATIONS

Robert et al., "Multiplexing Techniques for Liquid Crystal Display", IEEE Transactions on Electron Devices, vol. 24, No. 6, 6/1977.

*Primary Examiner*—S. Miller
*Assistant Examiner*—Huy Kim Mai
*Attorney, Agent, or Firm*—Blum Kaplan

[57] ABSTRACT

A method and circuits for multiplex driving of a liquid crystal element employing a ferroelectric liquid crystal therein. The method includes the step of applying a voltage pulse having an amplitude and a pulse width which exceeds a saturation voltage during a first half of a selecting term or a non-selecting term just before the selecting term to place the liquid crystal element in an "ON" or "OFF" state. The method also includes the step of applying the voltage pulse having a opposite polarity with respect to said voltage pulse and having an amplitude and a pulse width smaller than the threshhold voltage or exceeding the saturation voltage so that it is selected in order to maintain or to change the "ON" or "OFF" state. Further, it includes the step of rendering the average of a DC component which is applied to the liquid crystal element to zero by the method for applying a voltage pulse. Thus, although the ferroelectric liquid crystal including a character that is is aligned in the different state, that is, "ON" or "OFF", the ferroelectric liquid crystal is multiplex driven by the polarity of the applied voltage pulse haivng more than saturation voltage regardless of the on-off pattern, thereby rendering the average of the applied voltage equal to zero. Namely, the present invention provides the improved liquid crystal element in which the deterioration of the liquid crystal element can be prevented and the life thereof can be extended.

10 Claims, 82 Drawing Sheets

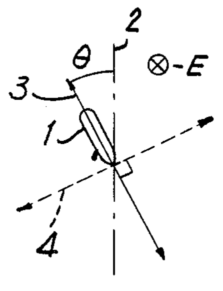
FIG. 1(a)
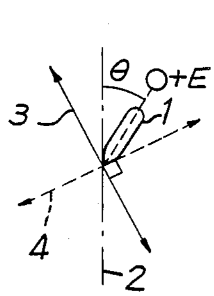
FIG. 1(b)
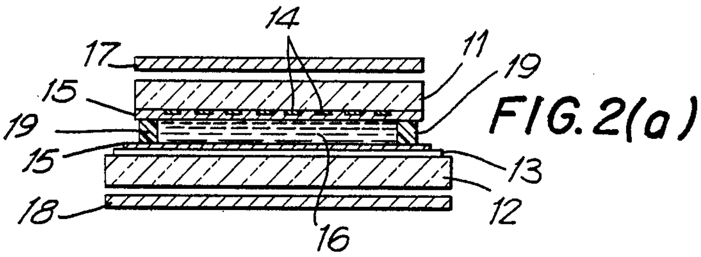
FIG. 2(a)
FIG. 2(b)
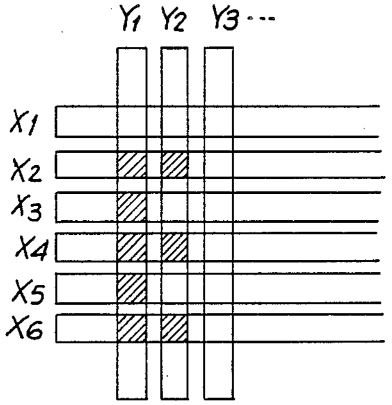

METHOD FOR DRIVING A LIQUID CRYSTAL ELEMENT

TECHNICAL FIELD

This invention relates to a method for driving a liquid crystal element, and in particular relates to a method for multiplex driving of the electrical optical element employing a ferroelectric liquid crystal.

BACKGROUND ART

It is already known that, as disclosed in U.S. Pat. No. 4,367,924, the electrical optical element employing the ferroelectric liquid crystal exhibiting the chiral smectic C-phase and the chiral smectic H-phase responds to the applied voltage at high speed, and have the memory property. It is expected to use ferroelectric liquid crystals to a large sized display having a number of pixels (picture elements), a high speed electronic shutter, and a polarizer and so on.

As typical driving method of the ferroelectric liquid crystal element up to now is that, as disclosed in U.S. Pat. No. 4,508,429, the voltage pulse which determines the optical transmitting state of the liquid crystal element is applied at the predetermined period to render the average of the voltage applied during the predetermined period equal to zero, thereby preventing the deterioration of the ferroelectric liquid crystal. However, the practical driving method which is disclosed in U.S. Pat. No. 4,508,429 is the static driving method, and the multiplex driving method which is the most useful driving method for the large sized display is not disclosed at all. It is already known that, the threshold voltage of the ferroelectric liquid crystal is varied in accordance with the pulse width of the applied voltage pulse, namely, the ferroelectric liquid crystal has "the dependence on the pulse width". However, the driving method disclosed in U.S. Pat. No. 4,508,429 have no consideration with respect to the dependence on the pulse width, and further the driving method is too difficult to realize in practice.

Accordingly, the presnt inventors provide the practical multiplex driving method in consideration of the dependence on the pulse width in Japan application No. 119,680 (see: Japan Laid-open 263124/85) and Japan application No. 177,818 (see: Japan Laid-open 55630/86). However, in the driving methods according to Japan application Nos. 119,680 and 177,818, since the average of the voltage applied to the ferroelectric liquid crystal is not considered in particular, there would be possible that the average of the voltage applied to the ferroelectric liquid crystal inclines to either of the positive or the negative, and thereby promoting the deterioration of the ferroelectric liquid crystal. Namely, the driving methods according to Japan application Nos. 119,680 and 177,818 have the disadvantage that the life of the liquid crystal element becomes short.

DISCLOSURE OF INVENTION

An object of the present invention is to provide an improved multiplex driving method which is very useful for the ferroelectric liquid crystal, in which the average of the voltage applied to the ferroelectric liquid crystal can be rendered equal to zero so as to prevent the deterioration of the ferroelectric liquid crystal in consideration of the dependence on the pulse width sufficiently.

The invention relates to the driving method wherein the liquid crystal element formed by sandwiching the ferroelectric liquid crystal between the substrate having the common electrode group and the substrate having the segment electrode group is multiplex driven by the linear sequential scan. The selecting signal or the non-selecting signal is applied to the common electrode group, on the other hand, the voltage pulse whose average voltage is equal to the intermediate voltage of the voltage pulse applied to the segment electrode group is applied to the segment electrode group. And therefore, the voltage pulse applied to the ferroelectric liquid crystal is as follows. Namely, at least one voltage pulse more than the saturation voltage which aligns the ferroelectric liquid crystal molecules to the predetermined orientating direction for turning the liquid crystal molecules "ON" or "OFF" state is applied during the first half of the selecting term or the non-selecting term, and the voltage pulse which selects the "ON" or "OFF" state is applied to the ferroelectric liquid crystal during the latter half of the selecting term or the selecting term just after the non-selecting term.

As disclosed in U.S. Pat. No. 4,508,429, when an electric field E is not applied, the ferroelectric liquid crystal molecules are helically oriented at an angle $\theta$ to the axis of helix. As shown in FIG. 1(*a*), for example, when an negative electric field E is applied, the ferroelectric liquid crystal molecules 1 are aligned on a plane perpendicular to the direction of the electric field E at an angle of $\theta$ with respect to the helix axis 2. When the polarity of the electric field E is reversed as shown in FIG. 1(*b*), the ferroelectric liquid crystal molecules are aligned to the direction of symmetry with respect to the direction according to FIG. 1(*a*) at the angle of $\theta$ around the helical axis 2. At this time, as shown in FIGS. 1(*a*) and 1(*b*), two polarizers are provided in the upper and lower of the ferroelectric liquid crystal, and further these two polarizers are crossed each other so that the polarization direction of the upper polarizer coincides to the direction of 3 and the polarization direction of the lower polarizer coincides to the direction of 4. Therefore, when the ferroelectric liquid crsytal molecules are aligned in the direction of FIG. 1(*a*), the least amount of the light transmission is obtained, on the other hand, when the ferroelectric liquid crystal molecules are aligned in the direction of FIG. 1(*b*), the largest amount of the light transmission is obtained. The orientating state of such ferroelectric liquid crystal molecules is still stable until the voltage exceeding the threshold voltage and having the opposite polarity is applied. This is one of the feature of the ferroelectric liquid crystal, namely, the memory property.

In the present invention, it is defined that the polarity of the voltage which aligns the ferroelectric liquid crystal molecules of the direction as shown in FIG. 1(*a*) is negative, and the polarity of the voltage which aligns the ferroelectric liquid crystal molecules to the direction as shown in FIG. 1(*b*) is positive. Further, when the light transmitting state is least in the relationship between the orientating direction of molecules and the polarization direction of polarizer as shown in FIG. 1(*a*), it is defined as the "OFF" state (or simply "OFF"), on the other hand, when the light transmitting state is largest in the relationship between the orientating direction of molecules and the polarization direction of polarizer as shown in FIG. 1(*b*), it is defined as the "ON" state (or simply "ON").

Next, the relationship between the orientating direction of molecules and the polarization direction of polarizer, namely, the relationships according to FIGS. 1(*a*) and 1(*b*) is reversed. So, when the positive voltage is applied, the least amount of the light transmitting is obtained, on the other hand, when the negative voltage is applied, the largest amount of the light transmitting is obtained. That is that the relationships of the combinations of the polarity and the "ON" or "OFF" state is only reversed, accordingly, the driving method is drived in the same manner substantially regardless of the polarity of the applied voltage. Therefore, the driving method according to U.S. Pat. No. 4,508,429 is included in the present invention.

Namely, the present invention provides the improved multiplex driving method, wherein the ferroelectric liquid crystal element is once turned "ON" or "OFF" state, then the voltage pulse for selecting the desired "ON" or "OFF" state which is required to hold until next selecting term is applied in consideration of the dependence on the pulse width and the memory property peculiar to the ferroelectric liquid crystal sufficiently, thereby realizing the improved multiplex driving method wherein the average of the voltage applied to the ferroelectric liquid crystal is rendered equal to zero. Further, the multiplex driving method is suitable for the practical use in that the deterioration of the ferroelectric liquid crystal can be prevented and that the desired light transmitting state can be hold for the long time.

BRIEF DESCRIPTION OF DRAWINGS

FIGS. 1(*a*) and 1(*b*) show the orientating state of the ferroelectric liquid crystal molecules.

FIG. 2(*a*) is the sectional view of an example of a liquid crystal element used in each embodiment according to the present invention.

FIG. 2(*b*) shows the structure of electrode of the liquid crystal element shown in FIG. 2(*a*).

BEST MODE OF CARRYING OUT THE INVENTION

Figure 3:
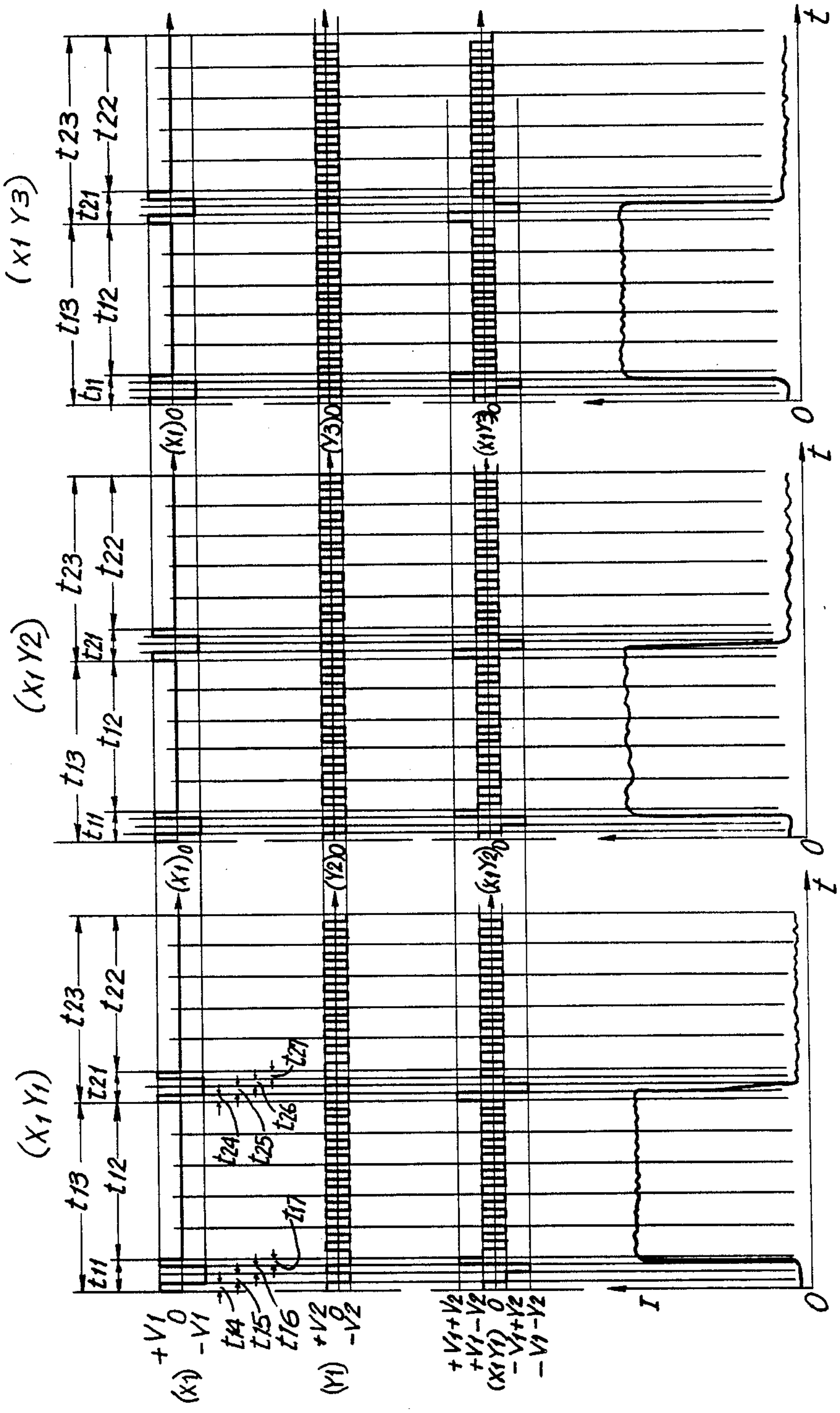
FIG. 3 shows the relationship between the driving waveform and the light transmitting state indicated in Embodiment 1 of the present invention.

FIG. 2(*a*) is a sectional view showing an example of the liquid crystal element used in each embodiment. A number of transparent common electrodes 13 and segment electrodes 14 composed of $In_2O_3$ or $SnO_2$ are provided on the confronting faces of a pair of opposed transparent substrates 11 and 12 composed of glass or plastic or the like. After a insulating layer composed of SiO or the like is provided on these electrodes 13 and 14 as occasion demands, an orientating film 15 composed of polyimide, nylon and so on is provided, then the surface of the orientating film of at least one substrate is rubbed so that the ferroelectric liquid crystal 16 is oriented to the predetermined direction.

19 is a sealing agent composed of epoxy adhesive. Each of the polarizer 17 and 18 is adjusted respectively on the outside surface in which a pair of substrates 11 and 12 are not provided. At this time, the polarization direction of polarizer 17 and the polarization direction of polarizer 18 are crossed each other, and the polarization direction of polarizer is determined that one of two polarization directions of polarizers is parallel to the orientating direction of the ferroelectric liquid crystal molecules at the time when the negative voltage more than the saturation voltage is applied to the ferroelectric liquid crystal 16.

The gap between two substrates namely, the thickness of the liquid crystal layer was approximately 1.3 μm, and the used ferroelectric liquid crystal was P-tetradecyloxybenzylidene-P'-amino(2-methyl)-butyl-(α-cyano)-cinnamate (TDOBAMBCC). The threshold voltage of the liquid crystal was 6.5 V at the time when the pulse width was 200 μsec and the saturation voltage thereof was 8 V. And the threshold voltage of the liquid crystal was 4.2 V at the time when the pulse width was 400 μsec, and the saturation voltage thereof was 6.3 V. The approximately same value could be obtained even from the method in which the polarity was reversed.

As shown in FIG. 2(*b*), the common electrode 13 and the segment electrode 14 are formed in the shape of stripe, and are crossed to each other. This common electrode is overlapped on the segment electrode, and the overlapped portions formes a picture element in the case of a display element. For a fuller understanding the following explanation, FIG. 2(*b*) shows three typical ON-OFF patterns, wherein the number of the common electrode Xn is 6, and the number of the segment electrode Yn is 3. However, the present invention is not limited to such an element, therefore, it has only to determined the number of the electrode according to the desired picture element. In FIG. 2(*b*), the picture elements which are indicated with diagonal lines show the "OFF" state, and the other picture elements show the "ON" state.

An example of the practical driving method which drives the liquid crystal element, is disclosed as follows.

Embodiment 1

FIG. 3 shows the waveform applied to each picture element on the common electrode X1 for turning "ON" or "OFF" as shown in FIG. 2(*b*) and the light transmitting state according to the present embodiment. For a fuller understanding the variation of the light transmitting state, "ON" or "OFF" state of all elements is switched in the next frame period.

In FIG. 3, t13 shows a first frame period and t23 shows a next frame period. Each of t11 and t21 shows a selecting term and each of t12 and t22 shows a non-selecting term, respectively. Moreover, each of t14, t15, t16, t17, t24, t25, t26, and t27 shows the pulse width of 200 μsec, respectively, and the amplitude V1 is 6 V and V2 is 3 V.

The voltage of ±V1 is applied to the common electrode X1 in the selecting term t11 (t21), on the other hand, OV is applied in the nonselecting term t12 (t22). The voltages of V2, −V2, V2 and −V2 having the pulse width of 200 μsec are applied to the segment electrode Y1, Y2, and Y3 by turns so that the picture element is turned "ON", on the other hand, the voltages of −V2, V2, −V2, and V2 having the pulse width of 200 μsec are applied by turns so that the picture element is turned "OFF". At this time, in the former the voltage pulses of (+V1−V2), (−V1+V2), (−V1−V2), (−V1+V2) and (+V1−V2) are applied to the each element by turns, on the other hand, in the later the voltage pulses of (+V1+V2), (−V1−V2), and (+V1+V2) are applied by turns. Since the applied voltages of (+V1−V2) and (−V1+V2) are smaller than the threthhold voltage of the liquid crystal, the liquid crystal does not respond but responds to the applied voltages of (+V1+V2) and (−V1−V2) which are larger than the saturation voltage. However, since the ferroelectric liquid crystal responds at high speed and has a memory property, it seems that "ON" or "OFF" state is determined by the polarity of the pulse more than the saturation voltage applied in the last of selecting term.

The voltage pulses of (+V1−V2) and (−V1+V2) are applied in the non-selecting term, wherein the maximum pulse width is 400 μsec. Since the amplitude is smaller than the threthhold voltage at the time when the pulse width of the liquid crystal is 400 μsec, there is almost no effect on the light transmitting state. The contrast ratio of the "ON" or "OFF" state of the element (X1 Y1) is 18:1, (X1 Y2) is 16:1, and (X1 Y3) is 18:1, respectively, therefore the almost fixed contrast ratio is obtained in disregard of the on-off pattern.

The present embodiment provides the driving method in which the positive and negative pulses having the amplutude and the pulse width more than at least the saturation voltage of the liquid crystal, are applied to the liquid crystal in the selecting term t11 (t21). The positive voltage pulse has a same amplitude and a pulse width as the negative pulse, further the "ON" or "OFF" state is selected according to the order of applying the positive or negative voltage pulse more than the saturation voltage. Since the number of the positive pulses is same as that of the negative pulse and the positive or negative voltage pulse having the amplitude and the pulse width less than the threshold voltage is applied in the non-selecting term t12 (t22), as shown in FIG. 3, the average of the DC component becomes zero, and therefore there is no DC component. Accordingly, the deterioration of the liquid crystal element can be prevented.

Figure 4:
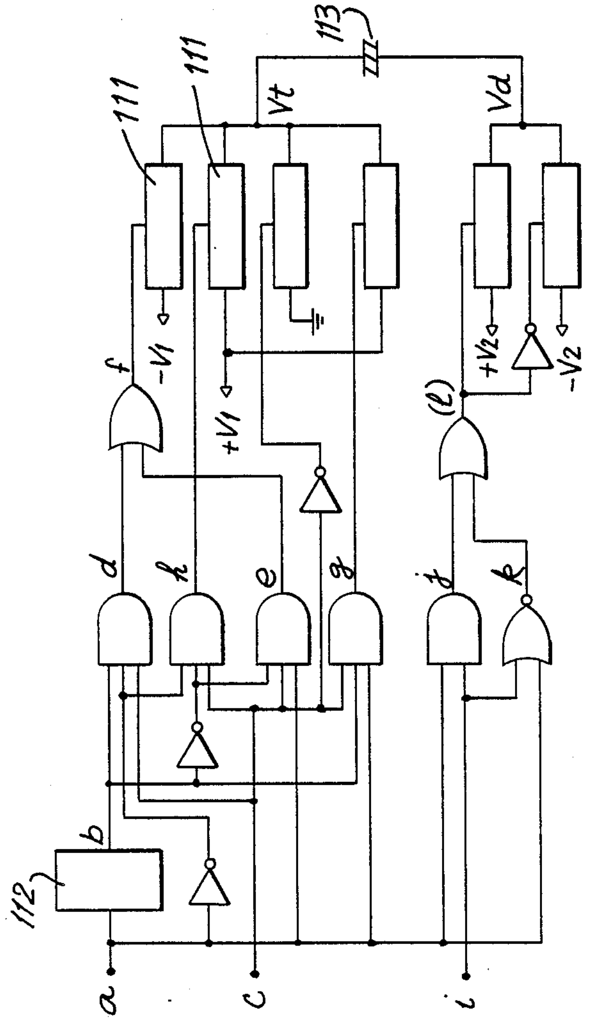
FIG. 4 shows an example of the practical circuit for realizing the driving waveform illustrated in FIG. 3.
Figure 5:
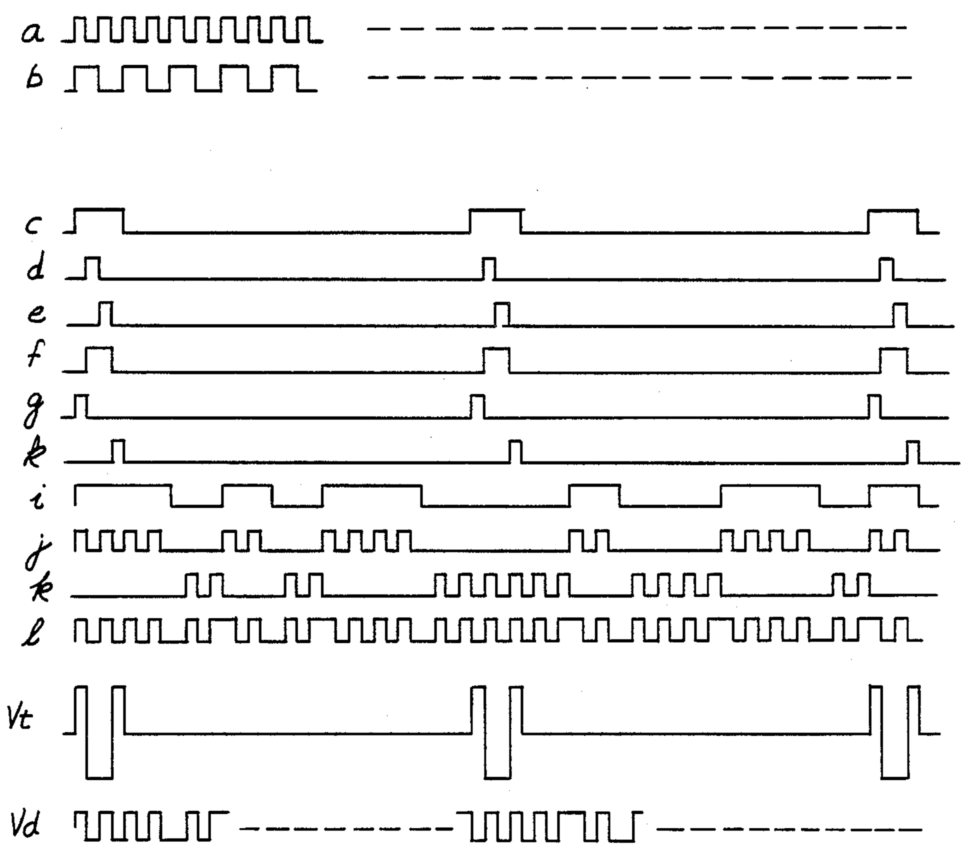
FIG. 5 is the time charts for signal waveform at each point of the circuit illustrated in FIG. 4.

FIG. 4 is a block diagram showing an example of a practical circuit for realizing the driving waveform as shown in FIG. 3. 111 is a transmission gate, 112 is a flip-flop, and 113 is a liquid crystal element. The transmission gate 111 is selected from the signals d, h, e, f, g, j, k, and l, thereby forming the common electrode signal Vt and the segment electrode signal Vd, and the common electrode signal Vt and the segment electrode signal Vd are applied to the liquid crystal element 113, respectively. ±V1 and 0 V, ±V2 are the source voltages of the common electrode and the segment electrode. FIG. 5 shows each signal at each point to form the common electrode signal Vt and the segment electrode signal Vd of the circuit as shown in FIG. 4.

Embodiment 2

Figure 6:
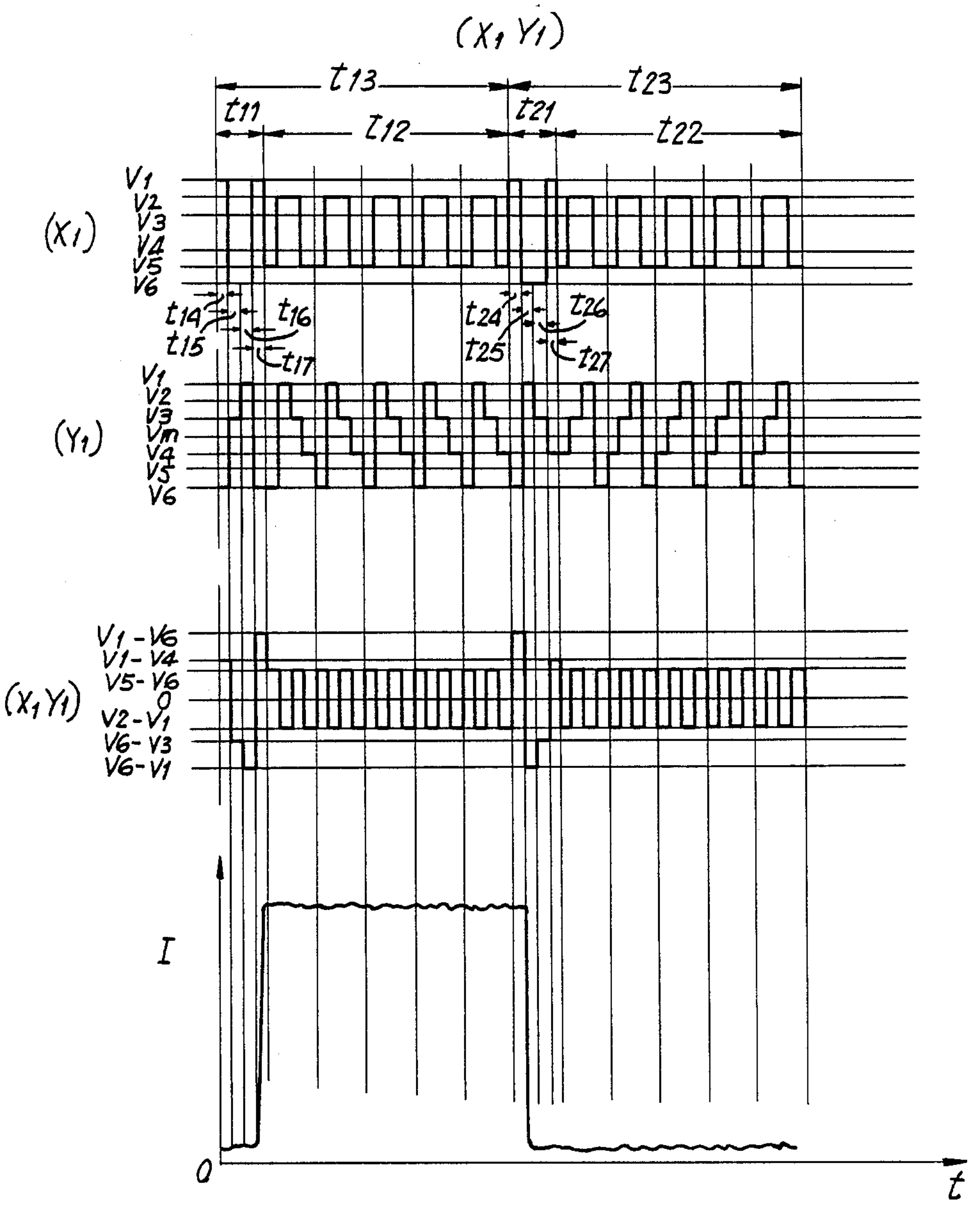
FIG. 6 shows the relationship between the driving waveform and the light transmitting state indicated in Embodiment 2 of the present invention.

FIG. 6 shows the waveform applied to the common electrode X1 and the signal electrode Y1 for turning "ON" or "OFF" as shown in FIG. 2(*b*) and the light transmitting state of the picture element (X1 Y1). For a fuller understanding the variation of the light transmitting state, "ON" or "OFF" state is switched in the next flame period t23.

In FIG. 6, each of t11 to t27 shows the same as that in FIG. 3, the amplitudes V1, V2, V3, V4, V5, and V6 are 8 V, 6 V, 5 V, 3 V, 2 V, and 0 V, respectively. Vm is the intermediate voltage of the voltage pulse applied to the segment electrode, at this time, the value of Vm is 4 V.

Embodiment 2 is different from Embodiment 1 in that the voltage level of the common electrode is equal to that of the segment electrode so as to reduce the voltage applied to the common electrode.

The voltages of V1, V6, V6, and V1 having the pulse width of 200 μsec are applied to the common electrode X1 by turns in the selecting term t11 (t21), on the other hand, the voltages of V2, and V5 are applied by turns in the non-selecting term t12 (t22) as shown in FIG. 6. The voltages of V4, V3, V1, and V6 having the pulse width of 200 μsec are applied to the segment electrode Y1 by turns so that the picture element is turned "ON", on the other hand, reversely the voltages of V6, V1, V3, and V4 are applied by turns so that the picture element is turned "OFF". At this time, in the former the voltage pulses of (V1-V4), (V6-V3), (V6-V1), and (V1-V6) are applied to the picture element (X1 Y1) by turns, on the other hand, in the later the voltage pulses of (V1-V6), (V6-V1), (V6-V3), and (V1-V4) are applied by turns, and "ON" or "OFF" state is determined by the polarity of the pulse more than the saturation voltage, and which is the last to be applied. The applied voltages of (V1-V4) and (V6-V3) which is applied in the selecting term are +5 V and −5 V, respectively, which is larger than the threshold voltage at the time when the pulse width is 400 μsec. However, since the pulse width is 200 μsec, the voltage pulse is smaller than the threshold voltage at the time when the pulse width is 200 μsec, and therefore the liquid crystal does not respond.

The voltage pulses of (V5-V6) and (V2-V1) are applied in the non-selecting term, although there may be cases that the pulse width becomes 400 μsec according to on-off pattern, and therefore there is almost no affect on the light transmitting state since the amplitude of the voltage pulses of (V5-V6) and (V2-V1) are smaller than the threthhold voltage of the liquid crystal at the time when the pulse width is 400 μsec.

In the driving method according to the present embodiment, the same good contrast ratio as that of the embodiment 1 is obtained.

The present invention provides the driving method in which the positive and negative pulses having the amplitude and the pulse width more than at least the saturation voltage of the liquid crystal are applied to the liquid crystal in the selecting term t11 (t21). The positive voltage pulse has a same amplitude and a pulse width as the negative pulse, further the "ON" or "OFF" state is selected according to the order of applying the positive or nagative voltage pulse more than the saturation voltage. Since the number of the positive pulse is same as that of the negative pulse and the positive or negative voltage pulse having the amplitude and the pulse width less than the threthhold voltage is applied in the non-selecting term t12 (t22), the average of the applied voltage becomes zero in disregard of the on-off pattern. Accordingly, the deterioration of the liquid crystal element can be prevented.

Figure 7:
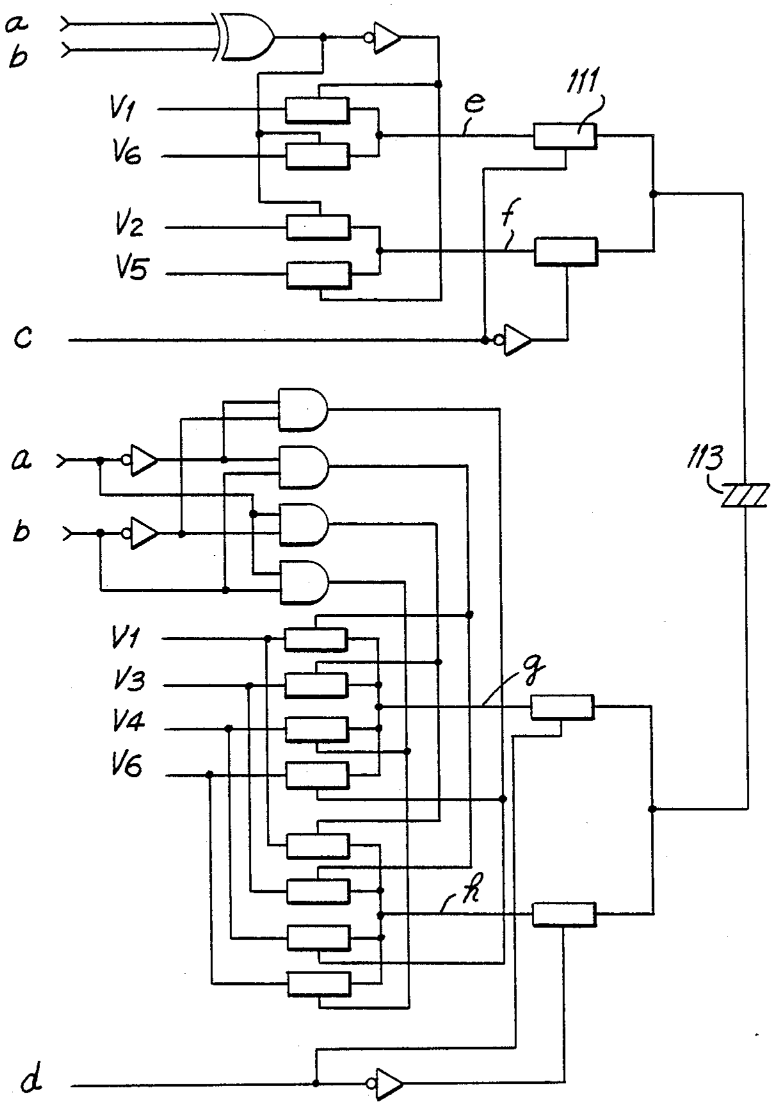
FIG. 7 shows an example of the practical circuit for realizing the driving waveform illustrated in FIG. 6.
Figure 8:
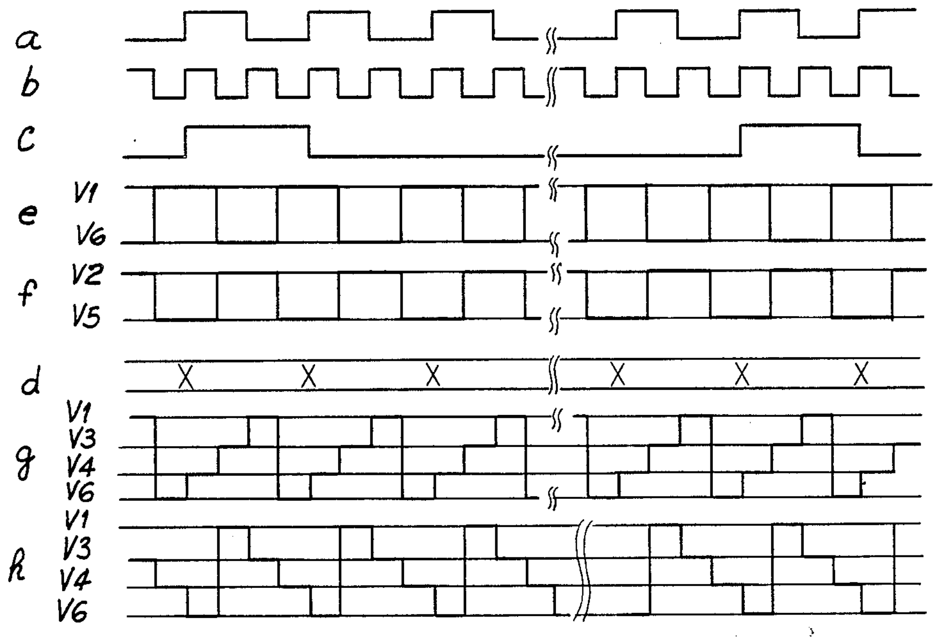
FIG. 8 is the time charts for signal waveform at each point of the circuit illustrated in FIG. 7.

FIG. 7 is a block diagram showing an example of a practical circuit for realizing the driving waveform as shown in FIG. 6. Upon receipt of the signal a or b the transmission gate 111 is selected, and then the common electrode waveform at the time of selecting e and the common electrode waveform at the time of non-selecting f are selected by the common electrode data c to form the common electrode waveform. On the ther hand, upon receipt of the signal a or b, the transmissiobn gate 111 is selected, and the "ON" waveform g and "OFF" waveform h are selected by the segment electrode data d to form the segment electrode waveform, and then the segment electrode waveform are applied to the liquid crystal element 113. V1, V2, V3, V4, V5, and V6 are the source voltages of the common electrode and the segment electrode. FIG. 8 shows each signal at each point of the circuit as shown in FIG. 7.

Embodiment 3

Figure 9:
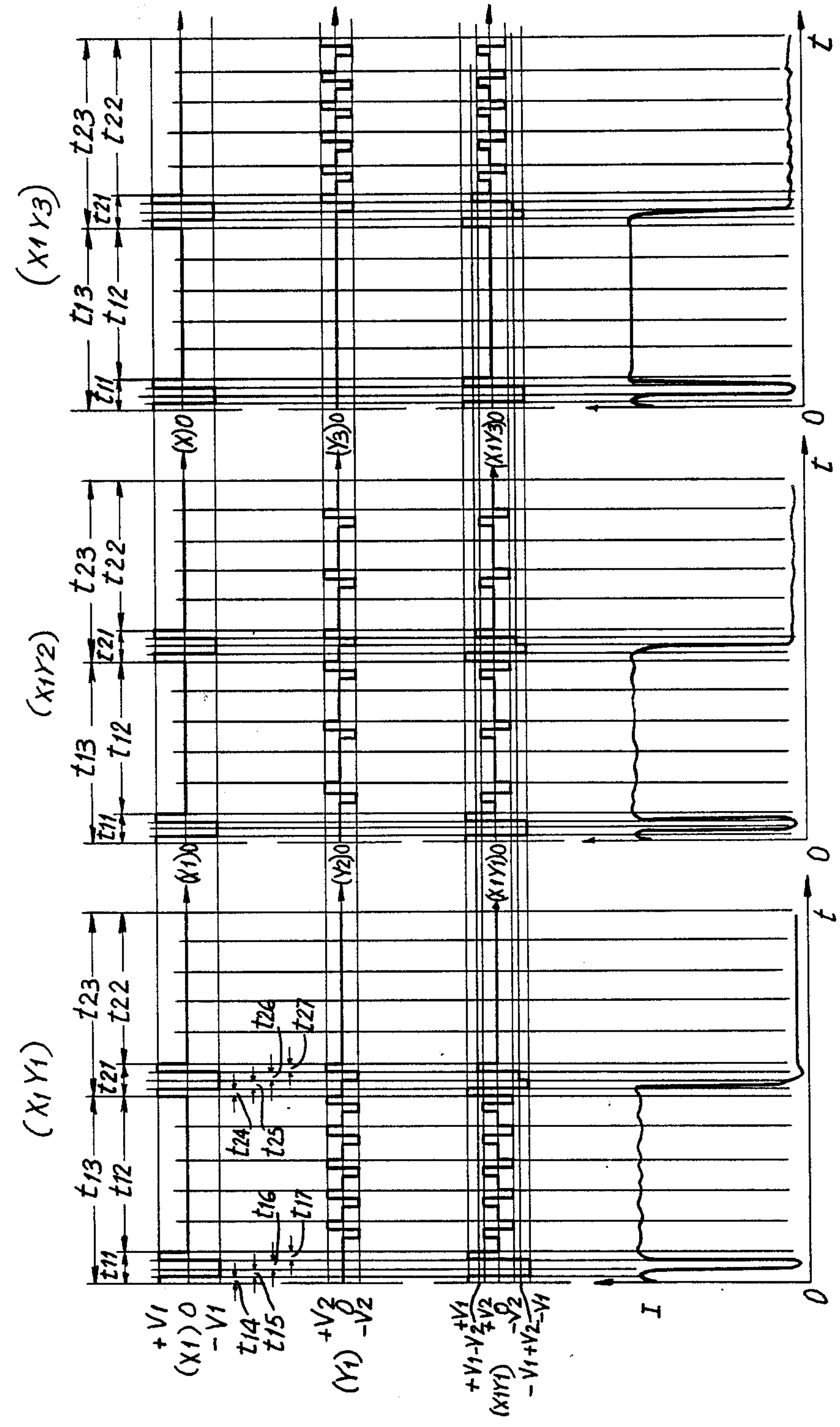
FIG. 9 shows the relationship between the driving waveform and the light transmitting state indicated in Embodiment 3 of the present invention.

FIG. 9 shows the waveform applied to each picture element on the common electrode X1 for turning "ON" or "OFF" as shown in FIG. 2(*b*) and the light transmitting state. For a fuller understanding the variation of the light transmitting state, "ON" or "OFF" state is switched in the next flame period t23.

In FIG. 9, each of t11 to t27 shows the same as that in FIG. 3, the amplitude V1 is 9 V, V2 is 4 V.

Embodiment 1 is different from Embodiment 2 in that the pulse width of the pulse which is applied in the non-selecting term is not larger than that of the pulse width which is more than the saturation voltage, and which is applied for turning "ON" or "OFF" state of the liquid crystal so as to improve the contrast ratio.

The voltage of ±V1 is applied to the common electrode X1 in the selecting term t11 (t21), on the other hand, the voltage of 0 V is applied in the non-selecting term. The voltage of 0 V is applied so that the picture element is turned "ON", on the other hand, the voltage of 0 V is applied in the first period of 400 μsec and −V2 and +V2 are applied by turns in the next period of 400 μsec by halves. At this time, in the former the voltage pulses of (+V1), (−V1), (−V1), and (+V1) are applied to each picture element by turns, on the other hand, in the later the voltage pulses of (+V1), (−V1), (−V1+V2), and (+V1−V2) are applied by turns. Since the voltage pulses of (−V1+V2) and (+V1−V2) are smaller than the threshold voltage of the liquid crystal at the time when the pulse width is 200 μsec, the liquid crystal does not respond. However, by repeating "ON" or "OFF" state in the selecting term t11, the voltage pulses of (−V1+V2) and (+V1−V2) respond to +V1 which is applied at last in the term t17, thereby obtaining "ON" state. On the other hand, in the selecting term t21, the voltage pulses of (V1+V2) and (+V1−V2) respond to −V1 which is applied in the term t25 after "ON" state in the term t24, thereby obtaining "OFF" state. The voltages of 0 V and +V2 or −V2 having the pulse width of 200 μsec are applied in the non-selecting term, however, since V2 is smaller than the threshold voltage of the liquid crystal it is almost never affect on the light transmitting state.

According to the present embodiment the contrast ratio of the picture element (X1 Y1) is 24:1, (X1 Y2) is 22:1, and (X1 Y3) is 20:1, and therefore the better contrast ratio than that of Embodiments 1 and 2 can be obtained.

The present embodiment provides the driving method in which the positive and negative voltage pulses having the amplitude and the pulse width more than at least the saturation voltage of the liquid crystal are applied to the liquid crystal in the selecting term t11 (t21). The positive voltage pulse has a same amplitude and a pulse width as the negative pulse, further the "ON" or "OFF" state is selected according to the order of applying the positive or negative voltage pulse more than the saturation voltage. Since the number of the positive pulse is same as that of the negative pulse and further the positive or negative voltage pulse having the amplitude and the pulse width less than the threthhold voltage is applied in the non-selecting term t12 (t22), the average which is applied to the liquid crystal element becomes zero in disregard of the on-off pattern. Accordingly, the deterioration of the liquid crystal element can be prevented.

Figure 10:
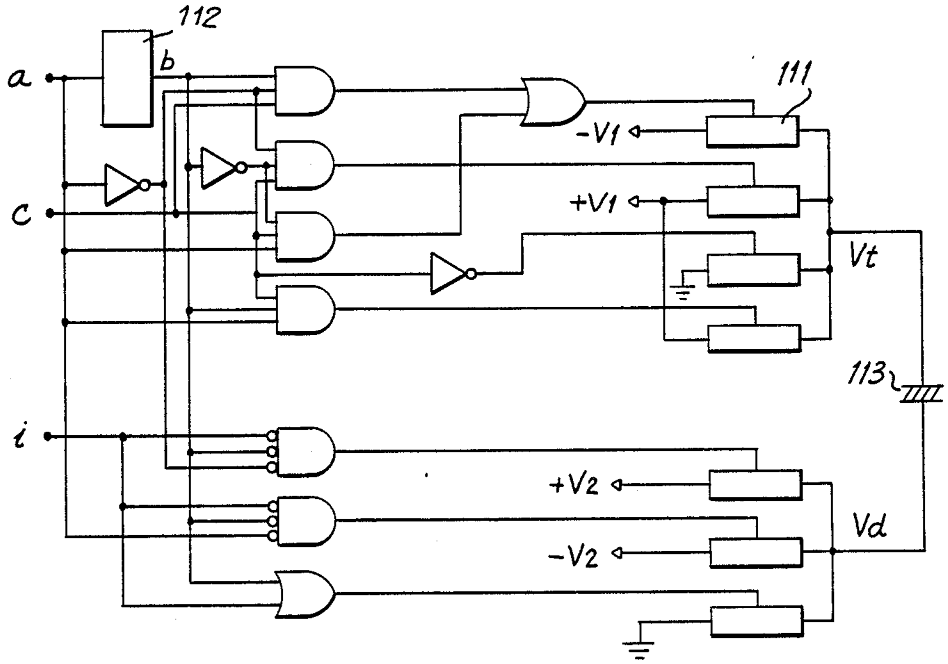
FIG. 10 shows an example of the practical circuit for realizing the driving waveform illustrated in FIG. 9.
Figure 11:
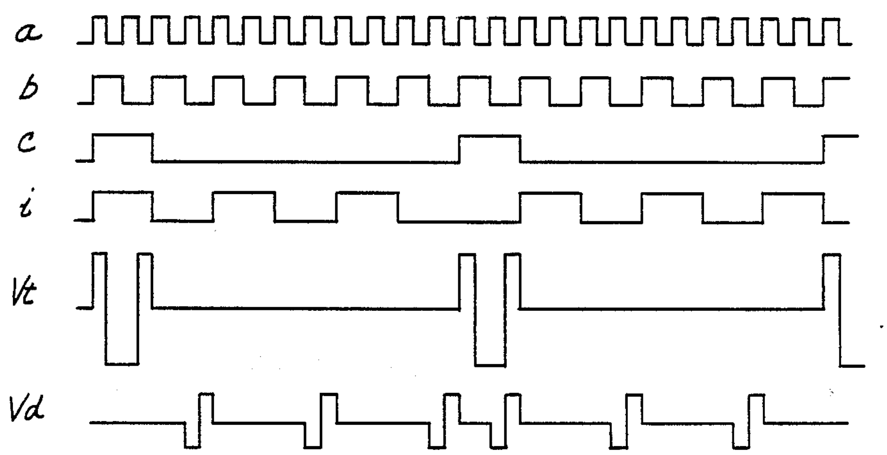
FIG. 11 shows the time charts for signal waveform at each point of the circuit illustrated in FIG. 10.

FIG. 10 is a block diagram showing an example of a practical circuit for realizing the driving waveform as shown in FIG. 9. Upon receipt of the signal a, c, or i, the signal which selects the transmission gate 111 is formed, and the transmission gate 111 is selected therefrom in order to form the common electrode Vt and the segment electrode signal Vd, and then these signals are applied to the liquid crystal element 113. ±V1, ±V2 and 0 V are the source voltages of the common electrode and the segment electrode. FIG. 11 shows each signal at each point of the circuit as shown in FIG. 10.

Embodiment 4

Figure 12:
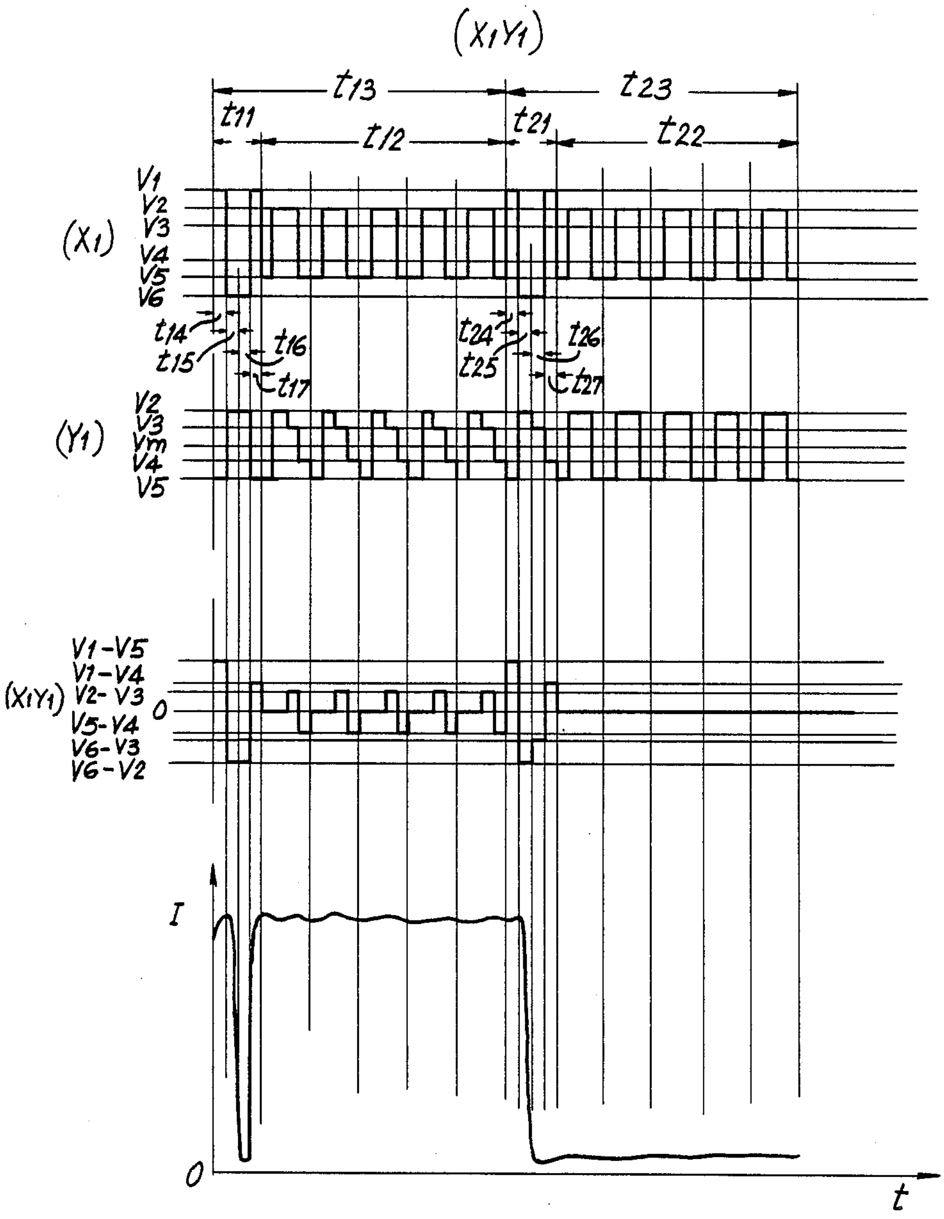
FIG. 12 shows the relationship between the driving waveform and the light transmitting state indicated in Embodiment 4 of the present invention.

FIG. 12 shows the waveform applied to the common electrode X1 and the segment electrode Y1 for turning the "ON" or "OFF" as shown in FIG. 2(*b*) and the light transmitting state of the picture element (X1 Y1). For a fuller understanding the variation of the light transmitting state, "ON" or "OFF" state is switched in the next flame period T23.

In FIG. 12, each of t11 to t27 shows the same as that in FIG. 3, and the amplitudes V1, V2, V3, V4, V5, and V6 are 10 V, 8 V, 6 V, 4 V, 2 V, and 0 V, respectively. Vm is the intermediate voltage of the voltage pulse which is applied to the segment electrode, at this time, the value of Vm is 5 V.

Embodiment 4 is different from Embodiment 3 in that the voltage level of the common electrode is equal to that of the segment electrode so as to reduce the voltage applied to the common electrode.

The voltages of V1, V6, V6, and V1 are applied to the common electrode X1 by turns in the selecting term t11 (t21), on the other hand, the voltages of V5, V2, V2, and V5 are applied by turns in the non-selecting term t12 (t22). The voltage pulses of V5, V2, V2, and V5 are applied to the segment electrode Y1 by turns so that the picture element is turned "ON", on the other hand, the voltage pulses of V5, V2, V3, and V4 are applied by turns so that the picture element is turned "OFF". Both of these have the pulse width of 200 μsec. At this time, the waveform of the voltage pulse applied to the picture element (X1 Y1) shows the same waveform as in the driving method according to Embodiment 3 as shown in FIG. 9, wherein the amplitude is only different from Embodiment 3. Namely, the voltage pulses of (V1-V5) and V6-V2) are +8 V and −8 V, respectively, which is larger than the saturation voltage of the liquid crystal. The voltage pulses of V1-V4) and (V6-V3) are +6 V and −6 V, respectively, which is smaller than the threshold voltage at the time when the pulse width is 200 μsec. The applied voltages (V2-V3) and (V5-V4) are +2 V and −2 V, respectively, which is far smaller than the threshold voltage of the liquid crystal. Therefore, the liquid crystal element responds as shown in Embodiment 3, and the same good contrast ratio as shown in Embodiment 3 can be obtained.

Figure 13:
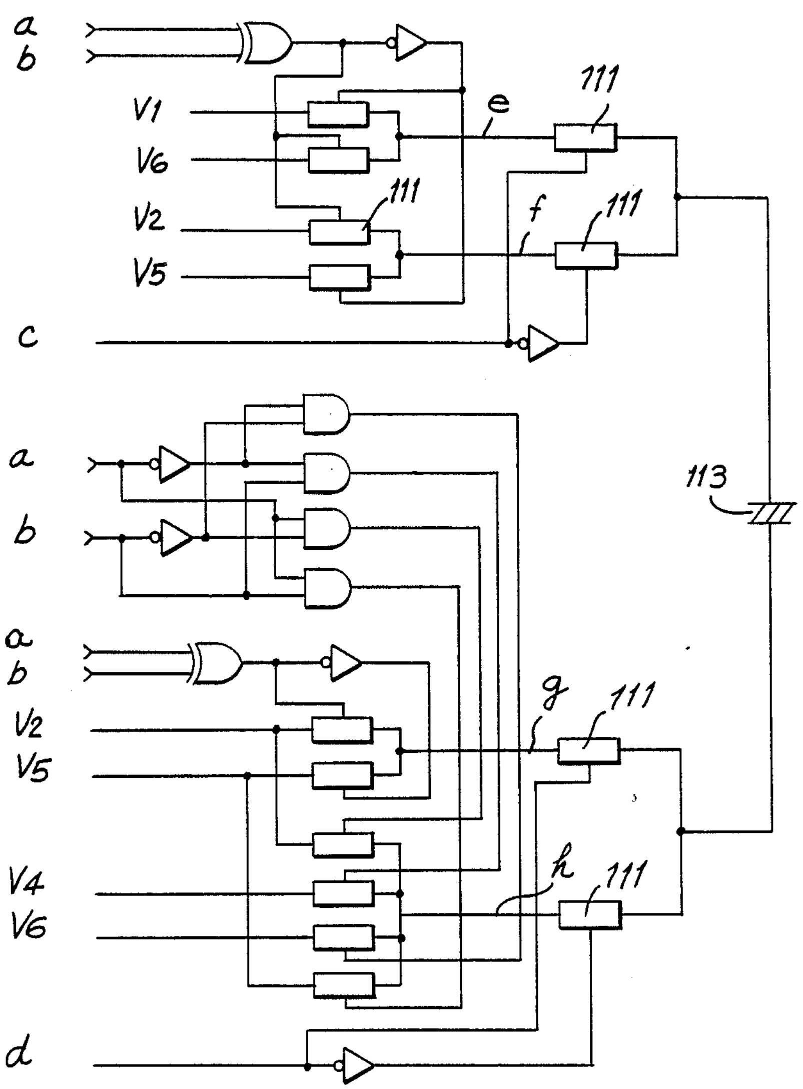
FIG. 13 shows an example of the practical circuit for realizing the driving waveform illustrated in FIG. 12.
Figure 14:
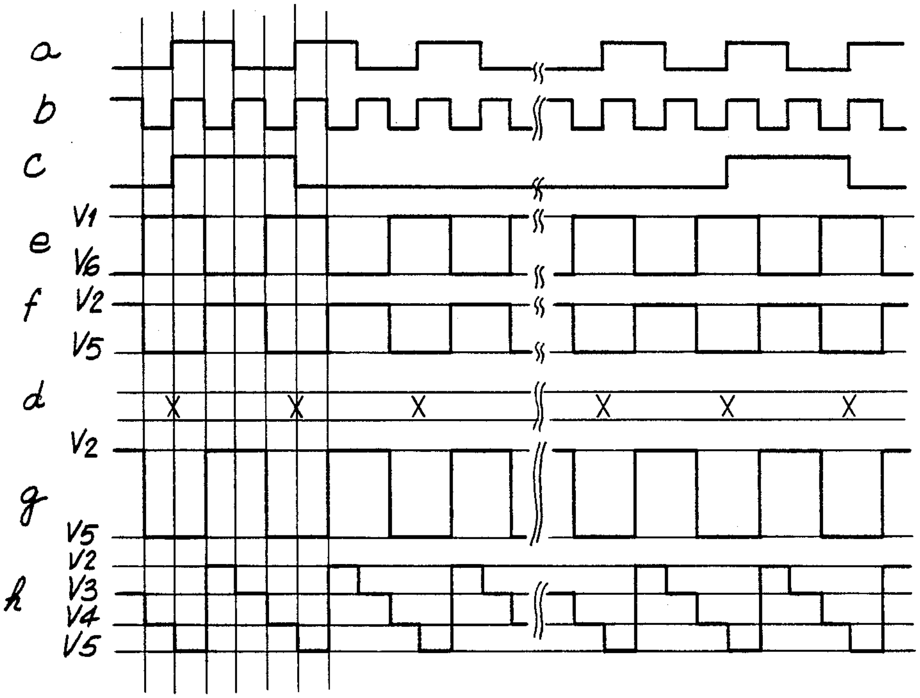
FIG. 14 shows the time charts for signal waveform at each point of the circuit illustrated in FIG. 13.

FIG. 13 is a block diagram showing an example of a practical circuit for realizing the driving waveform as shown in FIG. 12. Upon receipt of the signal a or b the transmission gate 111 is selected, and then the common electrode waveform at the time of selecting e and the common electrode waveform at the time of non-selecting f are selected by the common electrode data c to form the common electrode waveform. On the other hand, upon receipt of the signal a, or b, the transmission gate 111 is selected, thereby forming the segment electrode waveform, and the "ON" waveform g and "OFF" waveform h are selected by the segment electrode data d to form the segment electrode waveform, and then the pulses of the segment electrode waveform are applied to the liquid crystal element 113. V1, V2, V3, V4, V5, and V6 are the source voltages of the common electrode and the segment electrode. FIG. 14 shows each signal at each point of the circuit as shown in FIG. 13.

Embodiment 5

Figure 15:
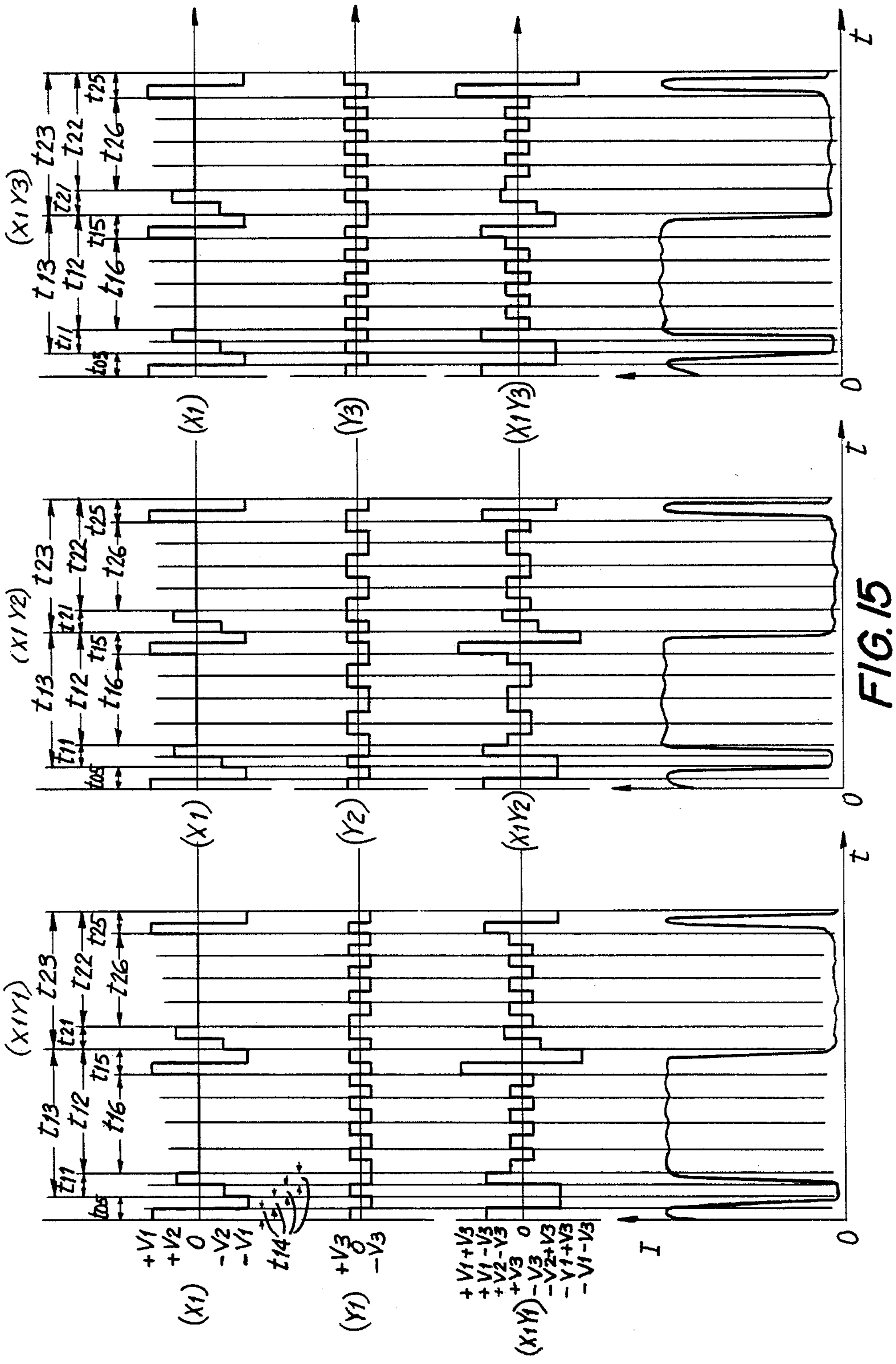
FIG. 15 shows the relationship between the driving waveform and the light transmitting state indicated in Embodiment 5 of the present invention.

FIG. 15 shows the waveform applied to each element on the common electrode X1 for turning "ON" or "OFF" such as shown in FIG. 2(*b*) and the light transmitting state. For a fuller understanding the variation of the light transmitting state, "ON" or "OFF" state is switched in the next flame period t23.

In FIG. 15, t13 shows the first flame period and t23 shows the next flame period. And t11 and t21 show the selecting term, t12 and t22 show the non-selecting term, and further t12 and t22 are divided into two sections, respectively. Namely, t12 is divided into two sections of the first non-selecting term t16 and the second non-selecting term t15 which is provided just before next selecting term, that is, in the last of the flame period, in the same way, t22 is divided into two sections of the first non-selecting term t26 and the second non-selecting term t25 which is provided just before next selecting term. T05 shows the second non-selecting term just before the first flame period t13. t14 shows the pulse width of 200 μsec. And the amplitude V1 is 11 V, V2 is 6 V, and V3 is 2.5 V.

The voltage of V2 is applied to the common electrode X1 in the selecting term t11 (t21), the voltage 0 V is applied in the first non-selecting term t16 (t26), and the voltage pulses of ±V1 are applied in the second non-selecting term t05 (t15, t25). On the other hand, the voltage pulses of V3, and −V3 are applied to the segment electrode Y1 by turns so that the picture element is turned "ON", on the other hand, −V3 and V3 are applied by turns so that the picture element is turned "OFF". At this time, the voltage pulses of (+V1−V3) and (−V1+V3) or (+V1+V3) and (−V1−V3) more than the saturation voltage are applied to each picture element in the second non-selecting term t05 (t15, t25) just before the selecting term t11 (t21). In case of "ON" state the voltage pulses of (−V1+V3) and (+V1−V3) are applied in the selecting term t11 (t21), on the other hand, in case of "OFF" state, the voltage pulses of (−V2+V3) and (+V2−V3) are applied. The voltage pulses of ±V3 having the pulse width of 200 μsec or 400 μsec are applied in the non-selecting term t16 (26) according to the on-off pattern. Since the voltage pulses of ±V3 are smaller than the threthhold voltage at the time when pulse width is 400 μsec, although there may be the cases that the pulse width becomes 400 μsec, and therefore there is almost no affect on the light transmitting state.

The present embodiment provides the driving method in which the picture element is once turned to "ON" state just before the selecting term, then the same is turned to "OFF" state, and further it is selected that to turn to "ON" state or to hold "OFF" state by whether the possitive pulse more than the saturation voltage is applied or the negative pulse less than the threshold voltage is applied in the selecting term just after the picture element is turned to "OFF". Therefore, in this embodiment it is possible to reduce the time of the selecting term to half in comparison with the driving method according to Embodiments 1 to 4. And further this driving method is available for the cases, for example, that the high speed driving is required and that many common electrodes are required.

The amplitude applied in the second non-selecting term t05(t15, t25) is different in accordance with the on-off pattern, however, since both of them are more than the saturation voltage, the amount of the light transmitting state does not change. Further, since "ON" or "OFF" state is turned by applying the pulse more than the saturation voltage of the liquid crystal during the non-selecting term in the present embodiment the contrast ratio deteriorates a little. However, the more the number of the common electrode, the lower the deterioration of the contrast ratio, therefore the good contrast ratio can be obtained. In the present embodiment, the contrast ratio of the picture element (X1 Y1) is 17:1, (X1 Y2) is 16:1, and (X1 Y3) is 17:1. The average voltage which is applied to the liquid crystal according to the present embodiment becomes also zero, and the deterioration of the liquid crystal element is never realized.

In the present embodiment, the second non-selecting term is provided in the last of the flame period, namely, just before the next selecting term. However, when the present driving method is applied to the display device, it need not to output just before the selecting term so long as the time can not be realized by human's eye.

Figure 16:
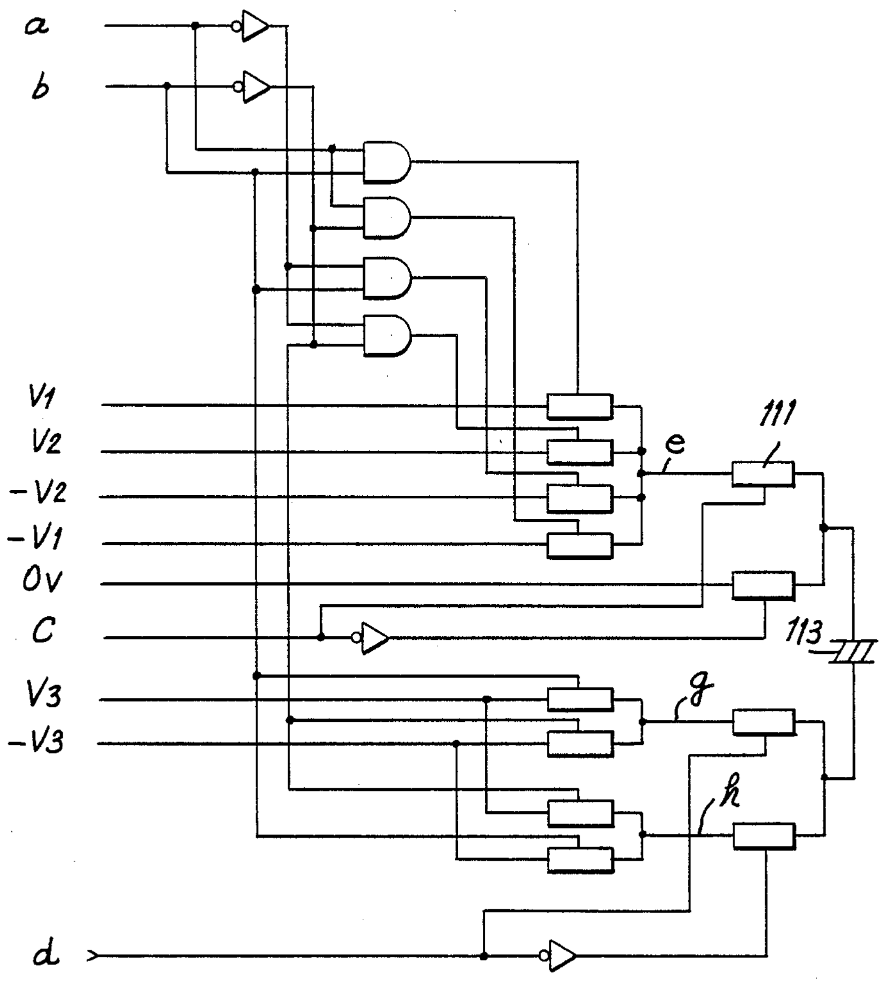
FIG. 16 shows an example of the practical circuit for realizing the driving waveform illustrated in FIG. 15.
Figure 17:
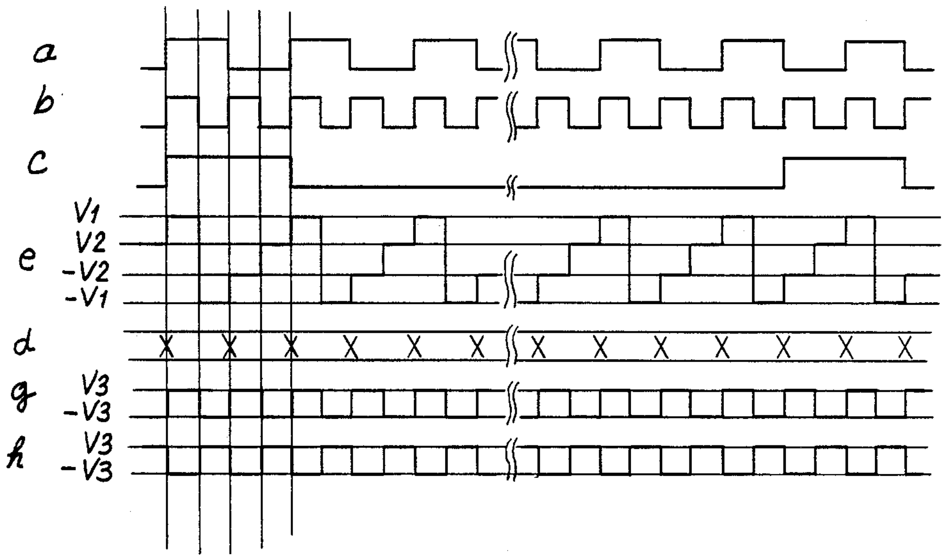
FIG. 17 shows the time charts for signal waveform at each point of the circuit illustrated in FIG. 16.

FIG. 16 is a block diagram showing an example of a practical circuit for realizing the driving waveform as shown in FIG. 6. Upon receipt of the signal a or b the transmission gate 111 is selected, then the common electorode waveform at the time of selecting e and the common electrode waveform at the time of non-selecting 0 V are selected by the common electrode data c to form the common electrode waveform. On the other hand, upon receipt of the signal b, the transmission gate 111 is selected, and the "ON" waveform g and "OFF" waveform h are selected by the segment electrode data d to form the segment electrode waveform, and then the pulses of the segment electrode waveform are applied to the liquid crystal element 113. ±V1, ±V2, ±V3, and 0 V are the source voltages of the common electrode and the segment electrode. FIG. 17 shows each signal at each point of the circuit as shown in FIG. 16.

Embodiment 6

Figure 18:
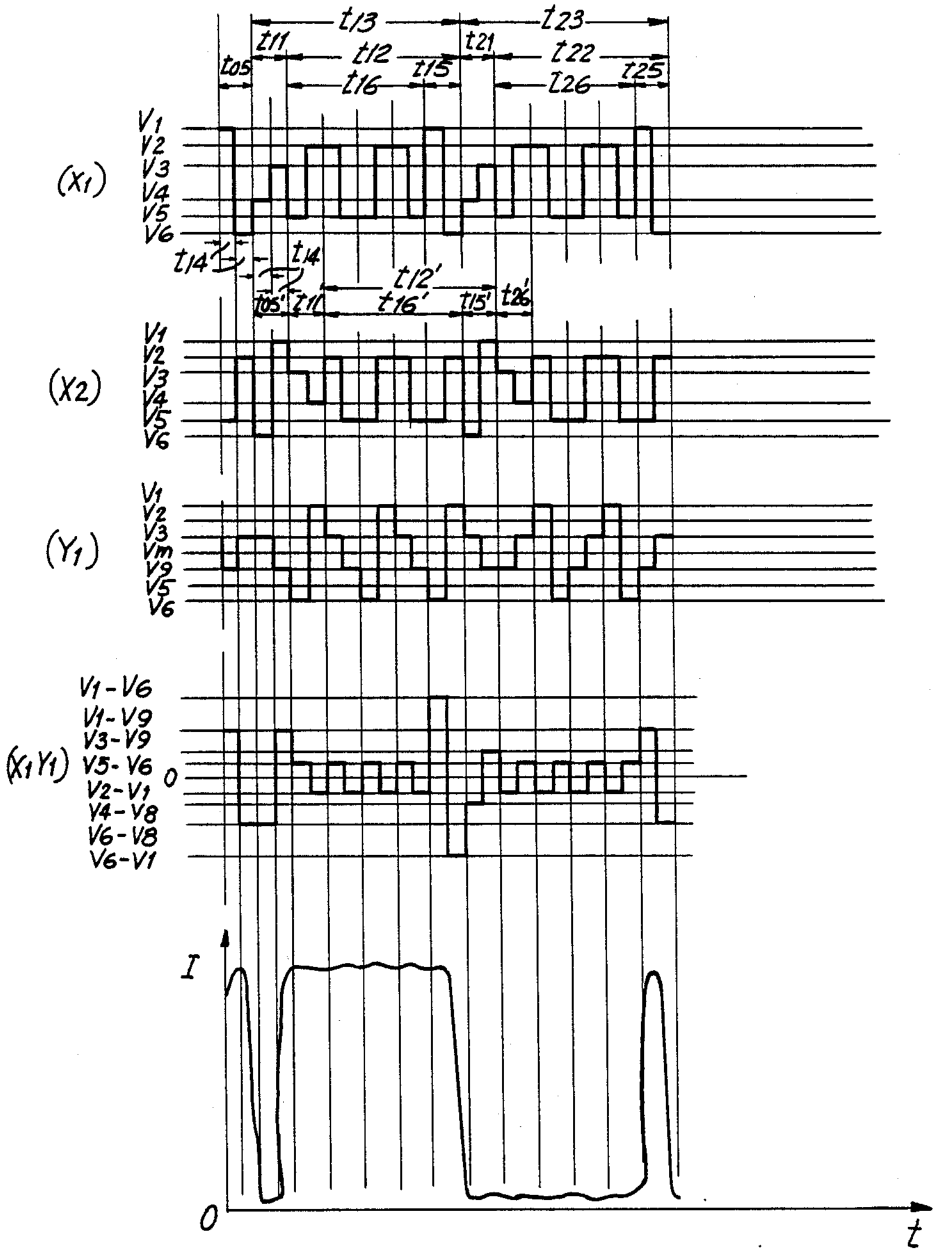
FIG. 18 shows the relationship between the driving waveform and the light transmitting state indicated in Embodiment 6 of the present invention.

FIG. 18 shows the waveform applied to the common electrode X1 and X2 and the segment electrode Y1 for turning "ON" or "OFF" shown in FIG. 2(*b*) and the light transmitting state of the picture element (X1 Y1). For a fuller understanding the variation of the light transmitting state, "ON" or "OFF" state is switched in the next flame period t23.

In FIG. 18, each of t05 to t26 shows the same as that in FIG. 15, t'11 and t'21 are the selecting term in the common electrode X2, t'05 and t'15 are the second non-selecting term, t'16 is the first non-selecting term, and t'12 is the non-selecting term during the flame period including the first and second non-selecting term.

The amplitudes V1, V2, V5, and V6 are 12 V, 10 V, 2 V, and 0 V, respectively, V3 and V8 are 8 V, and V4 and V9 are 4 V.

Embodiment 6 is different from Embodiment 5 in that the voltage level of the common electrode is equal to that of the segment electrode so as to reduce the voltage applied to the common electrode.

The voltage pulses of V4 and V3 are applied to the common electrode X1 in the selecting term t11(t21), the voltage pulses of V2 and V5 are applied in the first non-selecting term t16(t26), and the voltage pulses of V1 and V6 are applied in the second non-selecting term t05(t15, t25). Providing that the common electrode X1 is the odd numbered common electrode, the pulse line having the reverse phase with respect to the common electrode X1 is applied to the even numbered common electrode X2 as shown in FIG. 18. This is the reason that when the picture element on the common electrode X1 is in the selecting term t11(t21) the picture element on the common electrode X2 is in the second non-selecting term t'05(t'15), at this time, the pulse more than the saturation voltage for turning the picture element "ON" or "OFF" is applied. Namely, in the present embodiment, it is necessary that the pulse having the reverse phase is applied to each common electrode alternatively. Therefore, it is also necessary that the waveform of the pulse applied to the segment electrode Y1, which are the pulse to turn the picture element "ON" state and "OFF" state is different between the picture element on the odd numbered common electrode and the picture element on the even numbered common electrode. Namely, the voltage pulses of V1 and V6 are applied by turns so that the picture element on the odd numbered common electrode (for example, X1) is turned "ON", on the other hand, the voltage pulses of V8 and V9 are applied by turns so that the picture element on the odd numbered common electrode (for example, X1) is turned "OFF". The voltage pulses of V9 and V8 are applied by turns so that the picture element on the even numbered common electrode (for example, X2) is turned "ON", on the other hand the voltage pulses of V6 and V1 are applied by turns so that the picture element on the even numbered common electrode (for example, X2) is turned "OFF". At this time, the pulse applied to the picture element (X1 Y1) is only different from Embodiment 5 in that the amplitude, and substantially, the pulse having same waveform as Embodiment 5 is applied. Namely, at the time of "ON", the applied voltages of (V4–V1) and (V3–V6) more than the saturation voltage are applied in the selecting term t11, on the other hand, at the time of "OFF", the applied voltages of (V4–V8) and (V3–V9) less than the threshold voltage are applied in the selecting term t21. The voltage pulses of (V1–V4) and (V6–V8) or (V1–V6) and (V6–V1) more than the saturation voltage are applied in the order of positive, and negative in the second non-selecting term t05(t15, t25) just before the selecting term. Thus, the picture element turns "OFF" state just after "ON" state, and it is selected that to turn to "ON" or to hold "OFF" state.

For the first non-selecting term t16(t26), the voltage pulses of (V5–V6) and (V2–V1) or (V2–V8) and (V5–V9) having the pulse width of 200 μsec or 400 μsec, which is less than the threshold voltage at the time when the pulse width is 400 μsec are applied in accordance with on-off pattern, as shown in Embodiment 5.

This driving method according to the present embodiment, as indicated in Embodiment 5, is available for the cases that the high speed driving is required and that many common electrodes are required, and then the same contrast ratio as that in Embodiment 5 is obtained.

Figure 19:
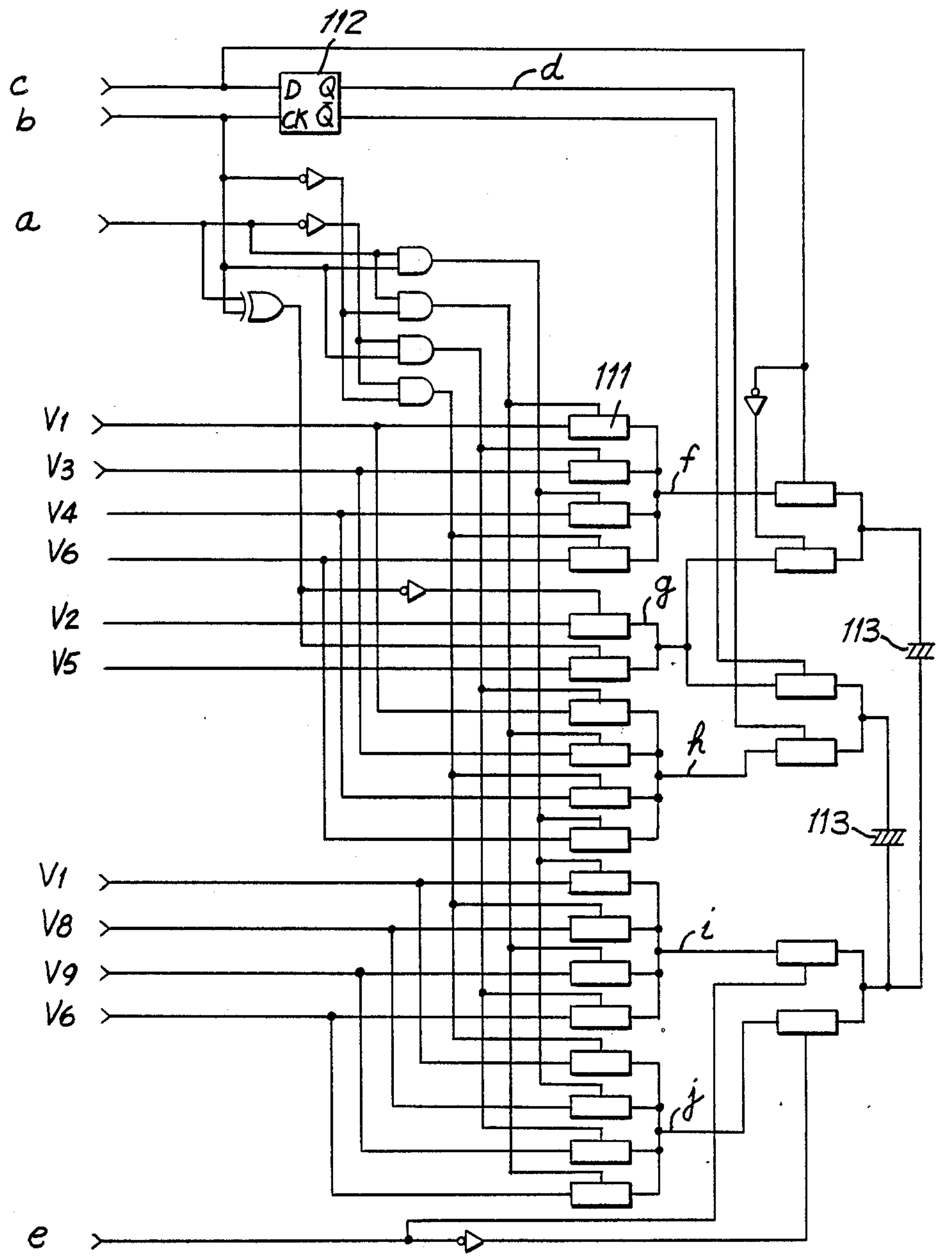
FIG. 19 shows an example of the practical circuit for realizing the driving waveform illustrated in FIG. 18.
Figure 20:
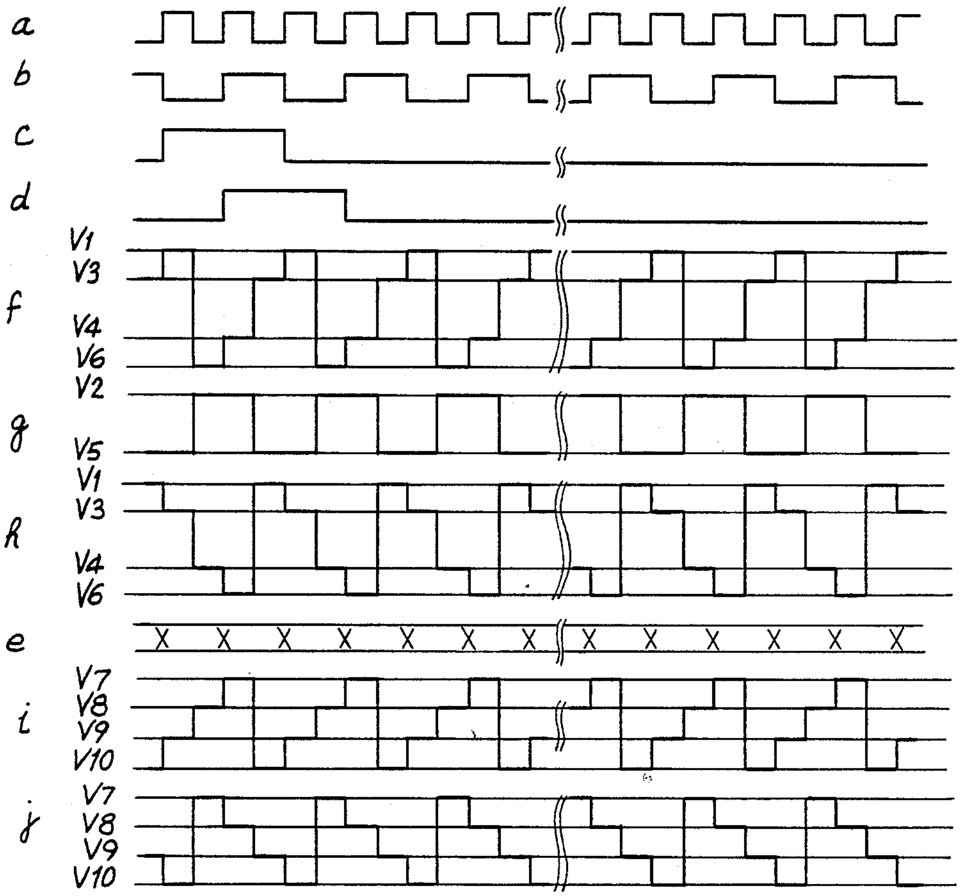
FIG. 20 shows the time charts for signal waveform at each point of the circuit illustrated in FIG. 19.

FIG. 19 is a block diagram showing an example of a practical circuit for realizing the driving waveform as shown in FIG. 18. Upon receipt of the signal a or b the transmission gate 111 is selected, and then the common electrode waveform at the time of selecting f and the common electrode waveform at the time of non-selecting g are selected by the common electrode data c to form the common electrode waveform. h is the even numbered common electrode selecting waveform. On the other hand, upon receipt of the signal a or b the transmission gate 111 is selected, and the "ON" waveform i and "OFF" waveform j are selected by the segment electrode data e to form the segment electrode waveform, and then the pulses of the segment electrode waveform are applied to the liquid crystal element 113. V1, V2, V3, V4, V5, V6, V8, and V9 are the source voltages of the common electrode and the segment electrode. FIG. 20 shows each signal at each point of the circuit as shown in FIG. 19.

Embodiment 7

Figure 21:
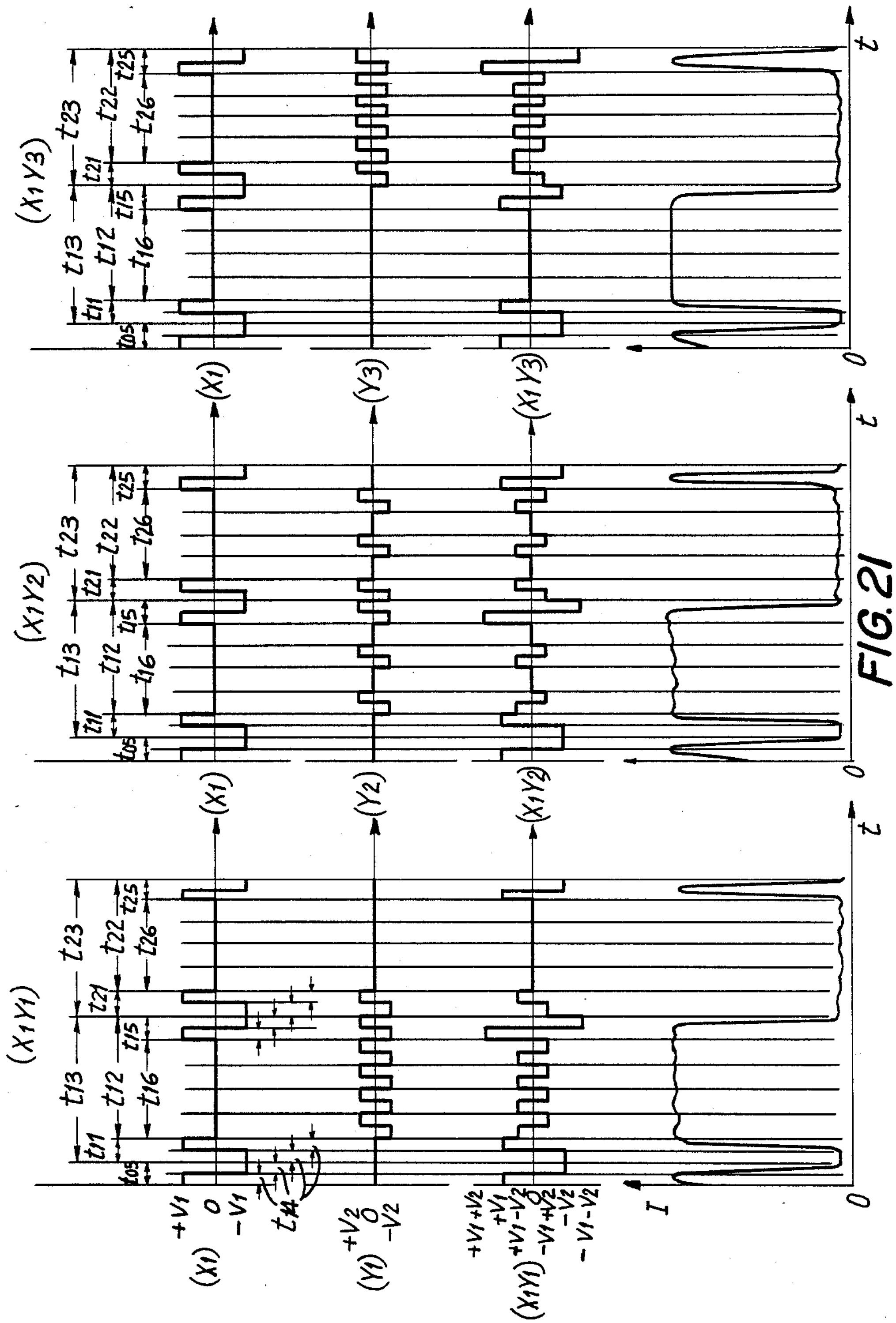
FIG. 21 shows the relationship between the driving waveform and the light transmitting state indicated in Embodiment 7 of the present invention.

FIG. 21 shows the waveform applied to the each picture element on the common electrode X1 for turning "ON" or "OFF" as shown in FIG. 2(*b*) and the light transmitting state. For a fuller understanding the variation of the light transmitting state, "ON" or "OFF" state is switched in the next flame period t23.

In FIG. 21, each of t05 to t26 shows the same as that in FIG. 15, the amplitude V1 is 8 V, and V2 is 4 V.

Embodiment 7 is different from Embodiments 5 and 6 in that the pulse width of the pulse which is applied in the non-selecting term is not larger than that of the pulse more than the saturation voltage, and which is applied for turning "ON" or "OFF" state of the liquid crystal so as to improve the contrast ratio.

The voltage of V1 is applied to the common electrode X1 in the selecting term t11(t21). The voltage of 0 V is applied in the first non-selecting term t16(t26), and the voltages of V1 are applied by the reveres order with respec to the selecting term in the second non-selecting term t05(t15, t25). The voltage of 0 V is applied to the segment electrode Y1, Y2, and Y3 so that the picture element is turned "ON", on the other hand, the voltage pulses of −V2, and V2 are applied by turns so that the picture element is turned "OFF". At this time, the voltage pulses ±V1 or (+V1 +V2) and (−V1−V2), in which both of them are more than the saturation voltage are applied to each element in the second non-selecting term t05(t15, t25) just before the selecting term t11(t21). During the selecting term t11(t21), at the time of "ON" the voltage of ±V1 are applied, on the other hand, at the time of "OFF" the voltages of (−V1+V2) and (+V1−V2) are applied. And the voltage pulses of (+V1−V2) and (−V1+V2) or 0V are applied according to on-off pattern in the first non-selecting term t16(t26). Therefore, since the pulse whose pulse width is more than 200 μsec is not applied in the non-selecting term there is almost no affect on the light transmitting state.

The present embodiment provides the driving method in which the picture element is once turned to "ON" state just before the selecting term, then the same is turned to "OFF" state, as indicated in Embodiments 5 and 6, and further it is selected that to turn to "ON" state or to hold "OFF" state by whether the positive pulse more than the saturation voltage is applied or the pulse less than the threthhold voltage is applied in the selecting term just after the picture element is turned to "OFF". Therefore, in this embodiment it is possible to reduce the time of the selecting term to half in comparison with the driving method according to Embodiments 1 to 4. And further this driving method is available for the cases, for example, that the high speed driving is required and that many common electrodes are required. In this embodiment, the contrast ratio of the picture element (X1 Y1) is 22:1, (X1 Y2) is 21:1, and (X1 Y3) is 20:1. The average of the voltage applied to the liquid crystal according to this embodiment becomes also zero, and the deterioration of the liquid crystal element is never realized.

In the present embodiment, the second non-selecting term is provided in the last of the flame period, namely, just before the next selecting term. However, when the present driving method is applied to the display device, it need not to output just before the selecting term so long as the time can not be realized by human's eye.

Figure 22:
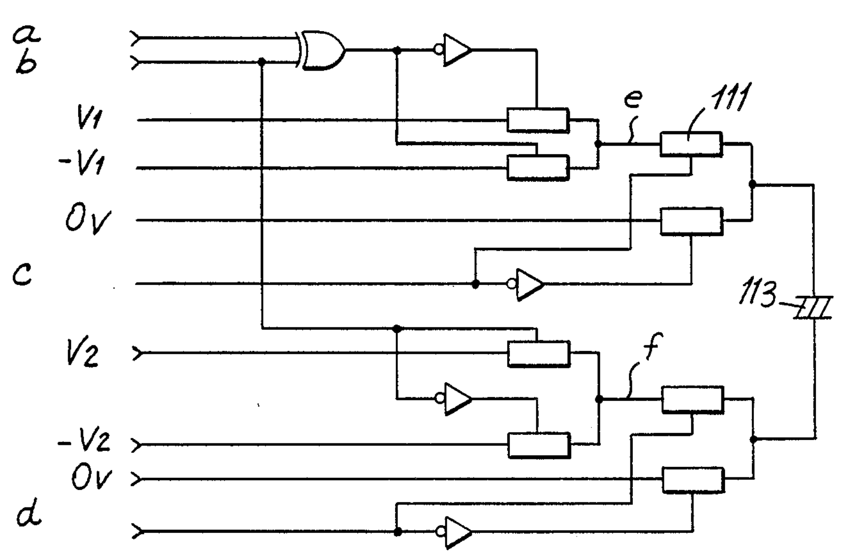
FIG. 22 shows an example of the practical circuit for realizing the driving waveform illustrated in FIG. 21.
Figure 23:
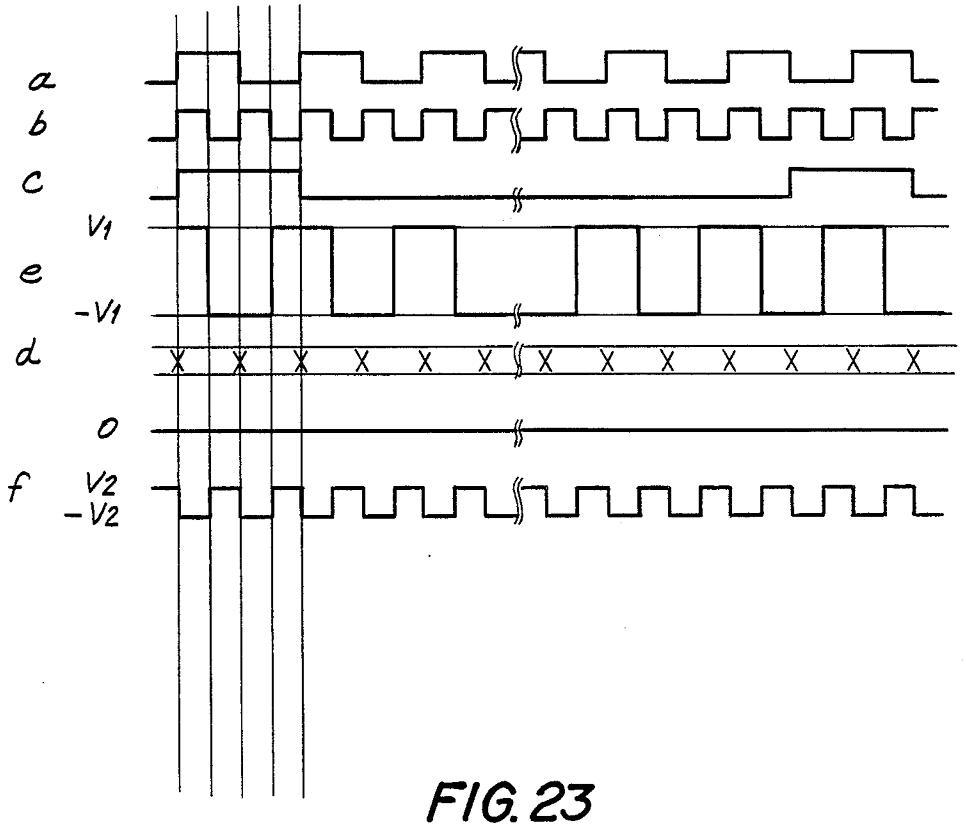
FIG. 23 shows the time charts for signal waveform at each point of the circuit illustrated in FIG. 22.

FIG. 22 is a block diagram showing an example of a practical circuit for realizing the driving waveform as shown in FIG. 21. Upon receipt of the signal a or b the transmission gate 111 is selected, and then the common electrode waveform at the time of selecting e and the common electrode waveform at the time of non-selecting 0V are selected by the common electrode data c to form the common electrode waveform. On the other hand, upon receipt of the signal b the transmission gate 111 is selected, and the "ON" waveform g and the "OFF" waveform h are selected by the segment electrode data d to form the segment electrode waveform, and then the pulses of the segment electrode waveform are applied to the liquid crystal element 113. ±V1, ±V2, and 0V are the source voltages of the common electrode and the segment electrode. FIG. 23 shows each signal at each point of the circuit as shown in FIG. 22.

Embodiment 8

Figure 24:
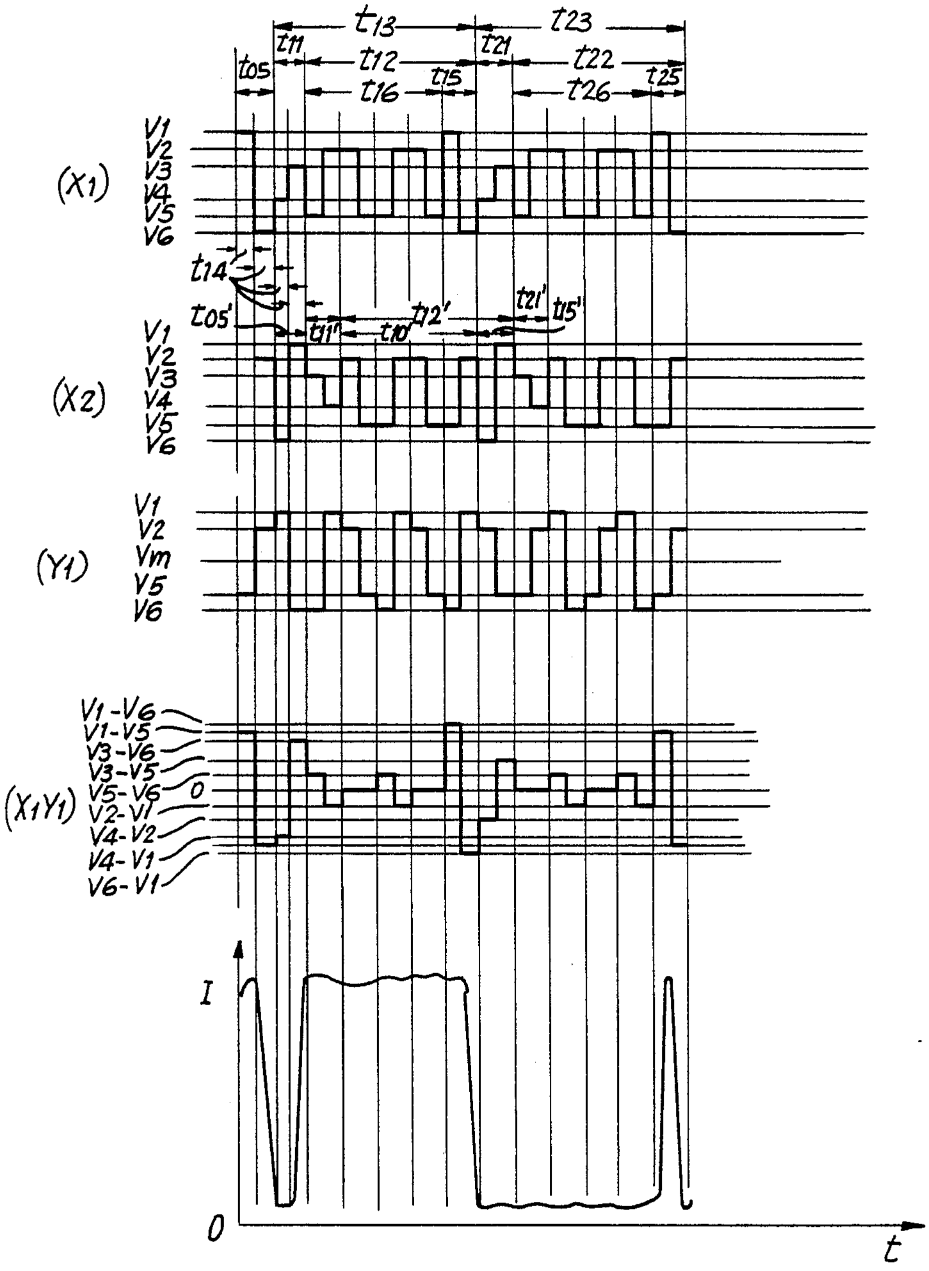
FIG. 24 shows the relationship between the driving waveform and the light transmitting state in Embodiment 8 of the present invention.

FIG. 24 shows the waveform applied to the common electrode X1, X2 and the segment electrode Y1 for turning "ON" or "OFF" as shown in FIG. 2(*b*) and the light transmitting state of the picture element (X1 Y1). For a fuller understanding the vaiation of the light transmitting state, "ON" or "OFF" state is switched in the next flame period t23.

In FIG. 24, each of t05 to t26 and t'05 to t'21 shows the same as that in FIG. 18.

The amplitudes V1, V2, V3, V4, V5, and V6 are 10 V, 9 V, 7 V, 3 V, 1 V, and 0 V, respectively. Vm is the intermediate voltage of the voltage pulse applied to the segment electrode, and at this time, Vm is 5 V.

This embodiment is different from Embodiment 7 in that the voltage level of the common electrode is equal to that of the signal electrode so as to reduce the voltage applied to the common electrode.

The voltages of V4 and V3 are by turns applied to the common electrode X1 in the selecting term t11(t21), the voltages of V2 and V5 are applied by turns in the first non-selecting term t16(t26), and the voltages of V1 and V6 are applied by turns in the second non-selecting term t05(t15, t25). Providing that the common electrode X1 is the odd numbered common electrode, the pulse line having the reverse phase with respect to the common electrode X1 is applied to the even numbered common electrode X2 as shown in FIG. 24. This is the reason that when the picture element on the common electrode X1 is in the selecting term t11(t21) the picture element on the common electrode X2 is in the second non-selecting term t'05 (t'15), at this time, the pulse more than the saturation voltage for turning the picture element "ON" or "OFF" is applied. Namely, in the present embodiment, it is necessary that the pulse having the reverse phase is applied to each common electrode alternatively. As a result of that, it is also necessary that the waveform of the pulse applied to the segment electrode Y1, which are the pulse to turn the picture element "ON" state and "OFF" state is different between the picture element on the odd numbered common electrode and the picture element on the even numbered common electrode. Namely, the voltage pulses of V1 and V6 are applied by turns so that the picture element on the odd numbered common electrode (for example, X1) is turned "ON", on the other hand, the voltage pulses of V2 and V5 are applied by turns so that the picture element on the odd numbered common electrode (for example, X1) is turned "OFF". The voltage pulses of V5 and V2 are applied by turns so that the picture element on the even numbered common electrode (for example, X2) is turned "ON", on the other hand, the voltage pulses of V6 and V1 are applied by turns so that the picture element on the even numbered common electrode (for example, X2) is turned "OFF". At this time, in case of "ON", the voltage pulses of (V4–V1) and (V3–V6) more than the saturation voltage are applied to the picture element (X1 Y1) in the selecting term t11, on the other hand, in case of "OFF", the voltage pulses of (V4–V2) and (V3–V5) less than the threshold voltage are applied in the selecting term t21. The voltage pulses of (V1–V5) and (V6–V2) or (V1–V6) and (V6–V1) more than the saturation voltage are applied in the order of positive and negative in the second non-selecting term t05(t15,t25) just before the selecting term. Thus, the picture element turns "OFF" state just after "ON" state, and it is selected that whether "OFF" state is still maintained or not.

For the first non-selecting term t16(t26), the voltages of 0V or (V5–V6) and (V2–V1) which is far smaller than the threshold voltage of the liquid crystal are applied in accordance with an on-off pattern, as indicated in Embodiment 7.

This driving method according to the present embodiment, as indicated in Embodiments 5 to 7, is available for the cases that the high speed driving is required and that many common electrodes are required, and then the same contrast ratio as that in Embodiment 7.

Figure 25:
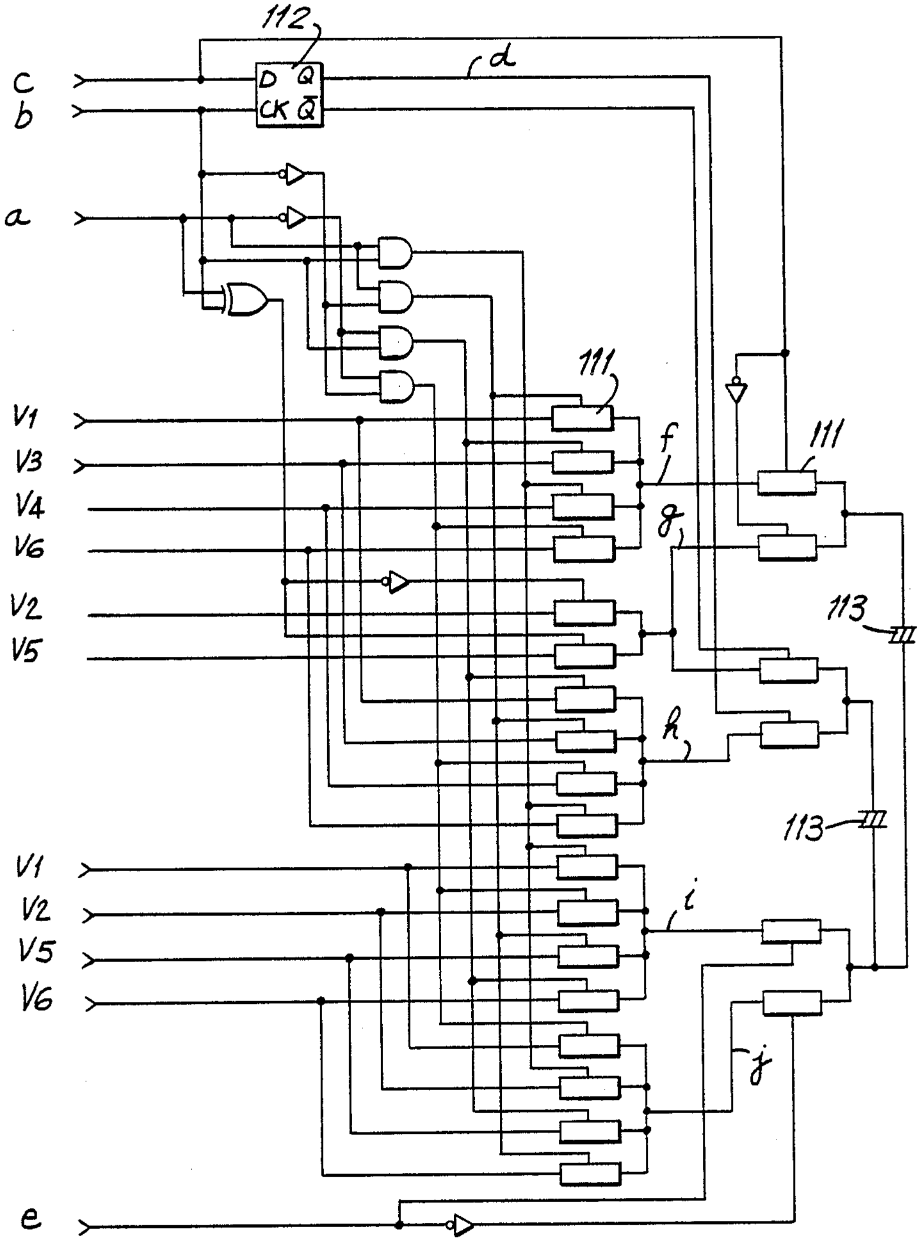
FIG. 25 shows an example of the practical circuit for realizing the driving waveform illustrated in FIG. 24.
Figure 26:
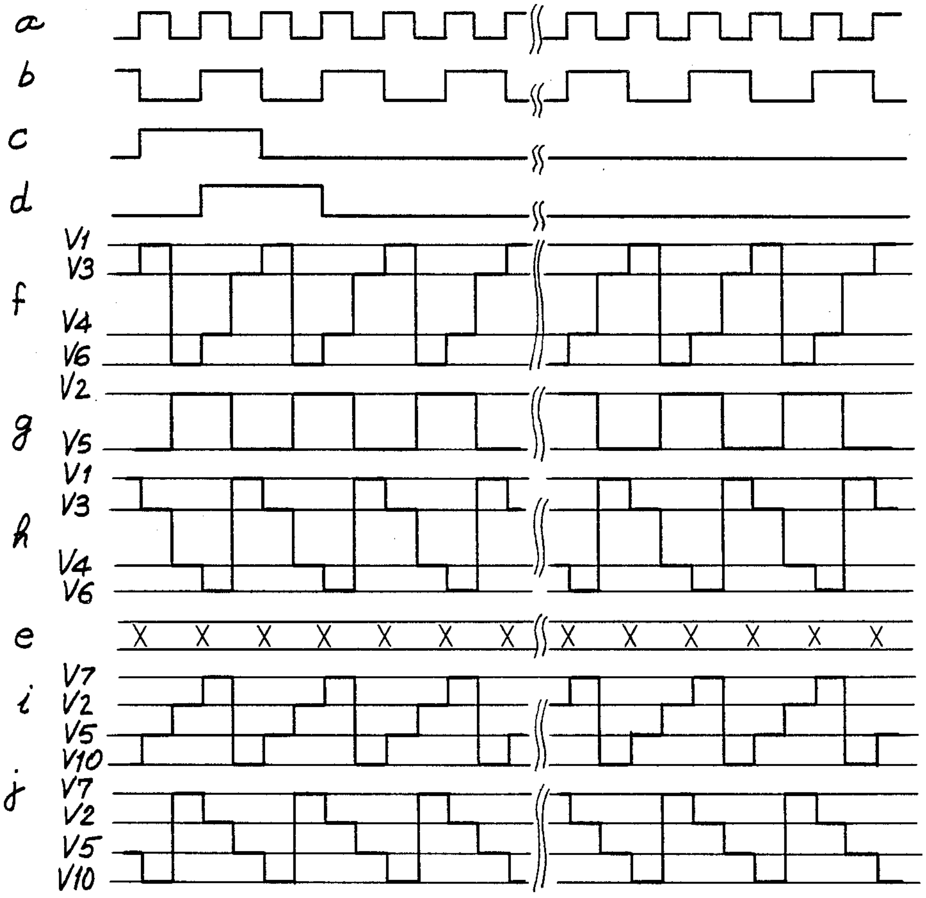
FIG. 26 shows the time charts for signal waveform at each point of the circuit illustrated in FIG. 25.

FIG. 25 is a block diagram showing an example of a practical circuit for realizing the driving waveform as shown in FIG. 24. Upon receipt of the signal a or b, the transmission gate 111 is selected, and then the common electrode waveform at the time of selecting f and the common electrode waveform at the time of non-selecting g are selected by the common electrode data c to form the common electrode waveform. h is the even numbered common electrode selecting waveform. On the other hand, upon receipt of the signal a or b, the transmission gate 111 is selected, and the "ON" waveform i and "OFF" waveform j are selected by the segment electrode data e to form the segment electrode waveform, and then the segment electrode waveform are applied to the liquid crystal element 113. V1, V2, V3, V4, V5, and V6 are the source voltages of the common electrode and the segment electrode. FIG. 26 shows each signal at each point of the circuit as shown in FIG. 25.

Embodiment 9

Figure 27:
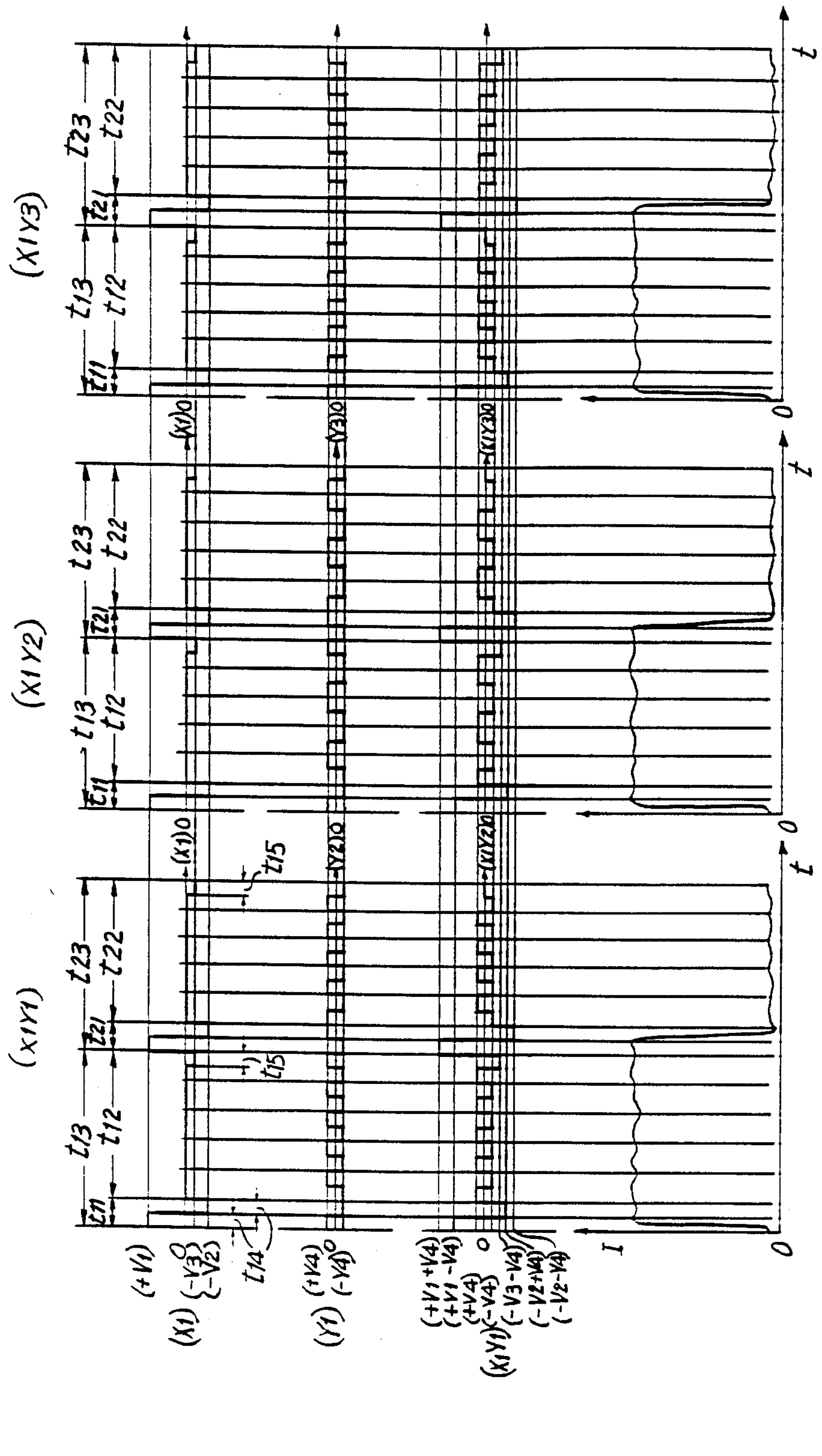
FIG. 27 shows the relationship between the driving waveform and the light transmitting state indicated in Embodiment 9 of the present invention.

FIG. 27 shows the driving waveform applied to the common electrode X1 for turning "ON" or "OFF" state as shown in FIG. 2(*b*) and the light transmitting state. For a fuller understanding the variation of the light transmitting state, "ON" or "OFF" state is switched in the next flame period t23.

In FIG. 27, t13 shows the first flame period and t23 shows the next flame period. t11 and t21 show the selecting term and t12 and t22 show the non-selecting term, respectively. Moreover, t14 shows the pulse width of 200 μsec. And further, t15 and t25 are the period for applying the amendment pulse of the average which is provided just before the next selecting term, namely, in the last of the flame period. In this case, the period is 200 μsec.

And the amplitude V1 is 10 V, V2 is 8 V, and V3 and V4 are 2 V, respectively.

The voltage pulses of +V1 and −V2 are applied to the common electrode X1 by turns in the selecting term t11 (t21), on the other hand, 0V is applied in the non-selecting term t12(t22), and the voltage of −V3 is applied as the amendment pulse in the term t15 (t25) which is the last term of the flame period. The voltage pulses of +V4 and −V4 are applied to the segment electrode by turns Y1, Y2, and Y3 so that the picture element is turned "ON", on the other hand, the voltage pulses of −V4 and +V4 are applied by turns so that the picture element is turned "OFF". At this time, in case of "ON", the voltage pulse of (−V2+V4) which is less than the threshold voltage is applied to each picture element after the voltage pulse of (+V1−V4) more than the saturation voltage is applied, on the other hand, in case of "OFF", the voltage pulses of (+V1+V4) and (−V2−V4) more than the saturation voltage are applied in the order of positive and negative. The voltage pulses of ±V4 having the pulse width of 200 μsec or 400 μsec according to on-off pattern are applied in the non-selecting term t15(t25), however, since the amendment pulse −V3 is added in the non-selecting term t15(t25), the voltage pulses of (−V3–V4) and (−V3+V4), namely −4 V or 0 V is applied.

In the present embodiment, the first positive pulse more than the saturation voltage which makes the picture element "ON" state at the begining of the selecting term is applied, and then the second negative pulse having the amplitude different from the first pulse is applied. Thus, on-off patter is selected in accordance with whether this second pulse is less than the threthhold voltage or the same is more than the saturation voltage. At this time, the difference of the amplitude of the first pulse is made to be same as the difference of the amplitude of the second pulse. And then the difference is amended in the term t15(t25), thereby rendering the average of the voltage which is applied during one flame period equal to zero.

In the present embodiment, the pulse width of the amendment pulse is same as the pulse width of the first pulse and the second pulse. However, it is not necessary to limit this, therefore it has only to do that the amplitude and the pulse width of each pulse are determined so that the condition of $|V1 \cdot t1| - |V2 \cdot t2| = |V3 \cdot t3|$ (t1, t2, and t3 show the pulse widths of each pulse) is satisfied.

Therefore, in this embodiment it is also possible to reduce the time of the selecting term to half, as indicated in Embodiments 5 to 8, in comparison with the driving method according to Embodiments 1 to 4. And further this driving method is also available for the cases, for example, that the high speed driving is required and that many common electrodes are required. Since the picture element never turns "ON" or "OFF" state during the non-selecting term, as indicated in the driving method according to Embodiments 5 to 8, this driving method is also available for the liquid crystal shutter, wherein even the variation of the light transmitting state in the very short time becomes in serious question in quarity.

In case of the present embodiment, the contrast ratio of the picture element (X1 Y1) is 20:1, (X1 Y2) is 17:1, and (X1 Y3) is 20:1. According to the present embodiment, the amendment pulse is applied to the last of the flame period, namely, just before the next selecting term, however, since the amendment pulse does not almost affect on the light transmitting state, the amendment pulse can be applied with the arbitrary timing so long as in the non-selecting term.

Figure 28:
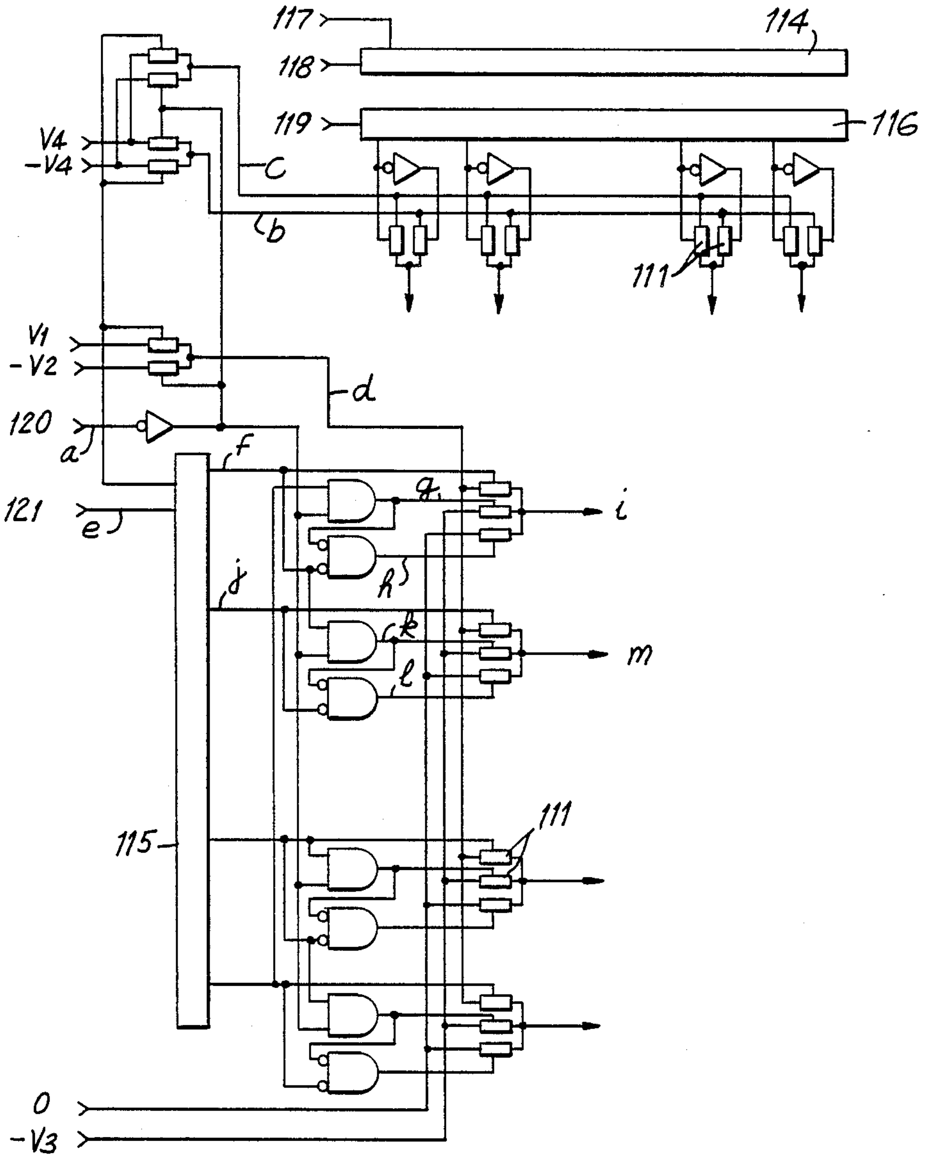
FIG. 28 shows an example of the practical circuit for realizing the driving waveform illustrated in FIG. 27.

FIG. 28 is a block diagram showing an example of a practical circuit for realizing the driving waveform as shown in FIG. 27. The common electrode data signal 121 is transmitted to the shift register 115 by the common electrode shift clock signal 120. And the waveform d is applied in the selecting term, 0 V is applied in the non-selecting term, and the voltage which amends the DC component just before the selecting term is switched so that the common electrode waveform can be output. The segment electrode data signal 117 is transmitted to the shift register 114 by the segment electrode shift clock 118. After the data enough for one line is transmitted, the segment electrode data signal 117 is latched by the latch signal 119, then the transmission gate 111 is switched by the output signal to output "ON" or "OFF" state (the waveform of b or c). V1, −V2, −V3, and ±V4 are the source voltages of the common electrode and the segment electrode.

Figure 29:
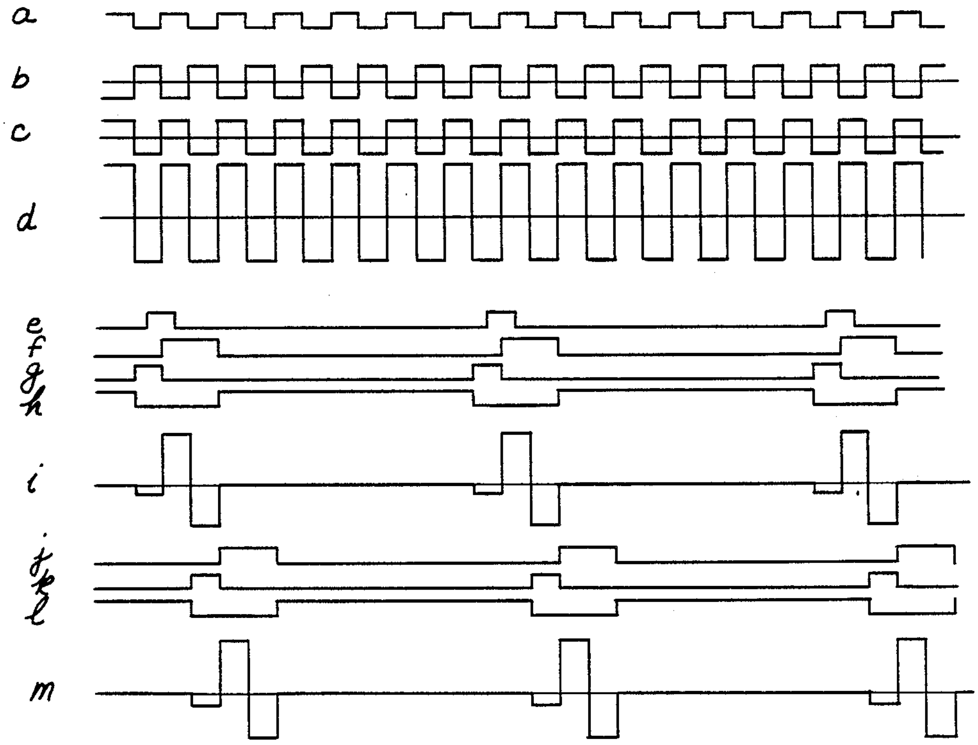
FIG. 29 shows the time charts for signal waveform at each point of the circuit illustrated in FIG. 28.

FIG. 29 shows the time charts showing the signal waveform of the circuit as shown in FIG. 28.

Embodiment 10

Figure 30:
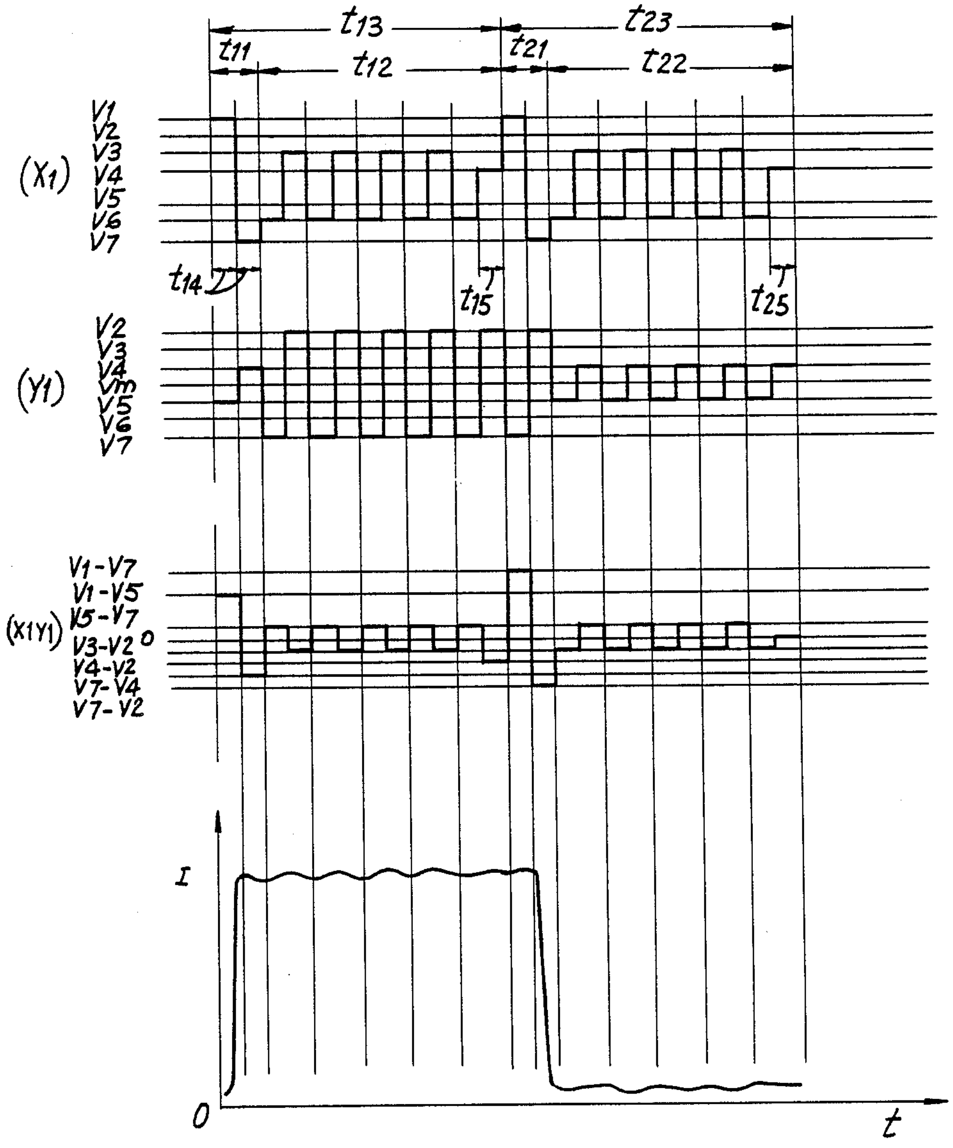
FIG. 30 shows the relationship between the driving waveform and the light transmitting state indicated in Embodiment 10 of the present invention.

FIG. 30 shows the waveform applied to the common electrode X1 and the segment electrode Y1 for turning "ON" or "OFF" as shown in FIG. 2(*b*) and the light transmitting state of the picture element (X1 Y1). For a fuller understanding of the variation of the light transmitting state, "ON" or "OFF" state is switched in the next flame perion 23.

In FIG. 30, each of t11 to t25 shows the same as that in FIG. 27.

The amplitudes V1, V2, V3, V4, V5, V6, and V7 show 12 V, 10 V, 8 V, 6 V, 4 V, 2 V, and 0 V, respectively. Vm is a intermediate voltage of the voltage pulse applied to the segment electrode, and at this time, the value of Vm is 5 V.

The present embodiment is different from Embodiment 9 in that the voltage level of the common electrode is equal to that of the segment electrode so as to reduce the voltage applied to the common electrode.

The voltage pulses of V1 and V7 are applied to the common electrode X1 by turns in the selecting term t11(t21), the voltage pulses of V6 and V3 are applied by turns in the non-selecting term t12(t22), and the voltage pulse of V4 are applied as the amendment pulse in the term t15(t25). The voltage pulses of V5 and V4 are applied to the segment electrode Y1 by turns so that the picture element is turns "ON", on the other hand, the voltage pulses of V7 and V2 are applied by turns so that the picture element is turned "OFF". At this time, in case of "ON", the voltage pulse of (V7–V4) less than the threshold voltage is applied to each picture element after the voltage pulse of (V1–V5) more than the saturation voltage is applied, on the other hand, in case of "OFF", the voltage pulses of (V7–V4) and (V7–V2) which are more than the saturation voltage are applied as shown in FIG. 30. The voltage pulses of (V6–V7) and (V3–V2) having the pulse width of 200 μsec or 400 μsec are applied according to on-off pattern in the non-selecting term t12(t22). However, since the amendment pulse V4 is applied in the last of the flame period, that is, term t15(t25), the voltage pulses of (V4—V2) and (V4—V4), that is, −4 V or 0 V is applied. In the present embodiment, as indicated in Embodiment 9, the difference of the amplitudes between the positive pulse and the negative pulse which are applied to the selecting term is amended in the term t15(t25), thereby rendering the average of the voltage which is applied during one flame period equal to zero.

This driving method according to the present embodiment is also available for such like the liquid crystal shutter, as same in Embodiment 9, and further the same contrast ratio as Embodiment 9 can be obtained.

Figure 31:
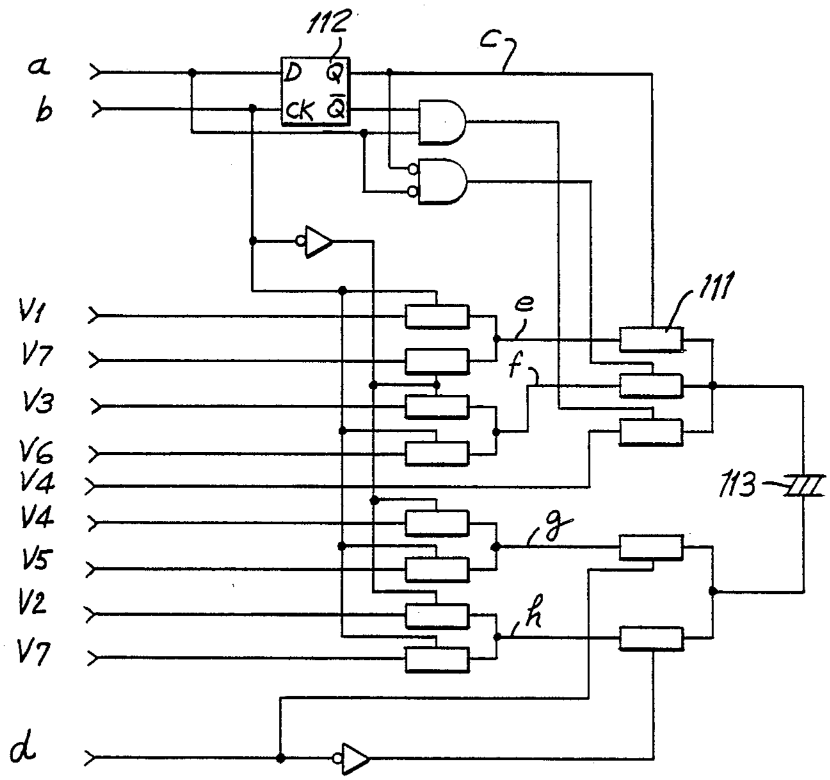
FIG. 31 shows an example of the practical circuit for realizing the driving waveform illustrated in FIG. 30.
Figure 32:
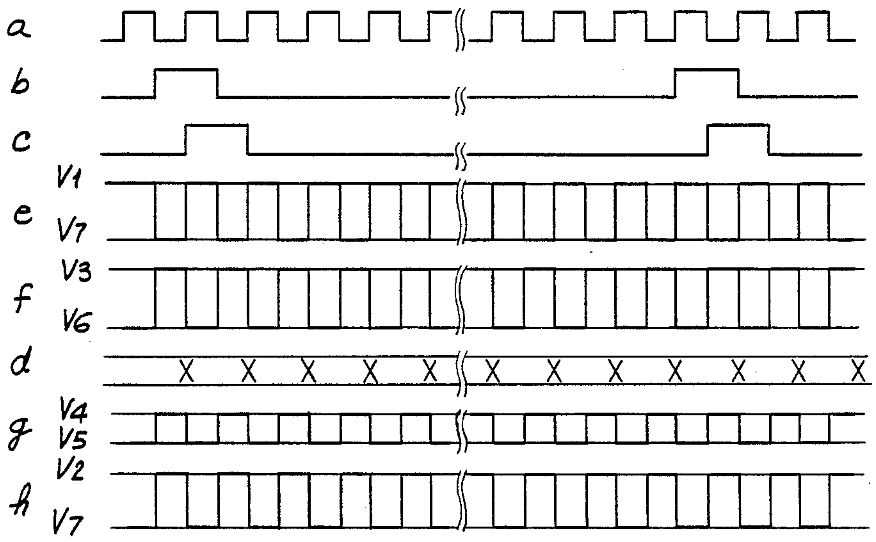
FIG. 32 shows the time charts for signal waveform at each point of the cirucit illustrated in FIG. 31.

FIG. 31 is a block diagram showing an example of a practical circuit for realizing the driving waveform as shown in FIG. 30. Upon receipt of the signal a the transmission gate 111 is selected, and then the common electrode waveform at the time of selecting e and the common electrode waveform at the time of non-selecting f are selected by the common electrode data b to form the common electrode waveform. On the othe hand, upon receipt of the signal a the transmission gate 111 is selected, and "ON" waveform g and "OFF" waveform h are selected by the segment electode data d to form the segment electrode waveform, and then the formed segment electrode waveform is applied to the liquid crystal element 113. V1, V2, V3, V4, V5, V6, and V7 are the source voltage of the common electrode and segment electrode. FIG. 32 shows each signal at each point of the circuit as shown in FIG. 31.

Embodiment 11

Figure 33:
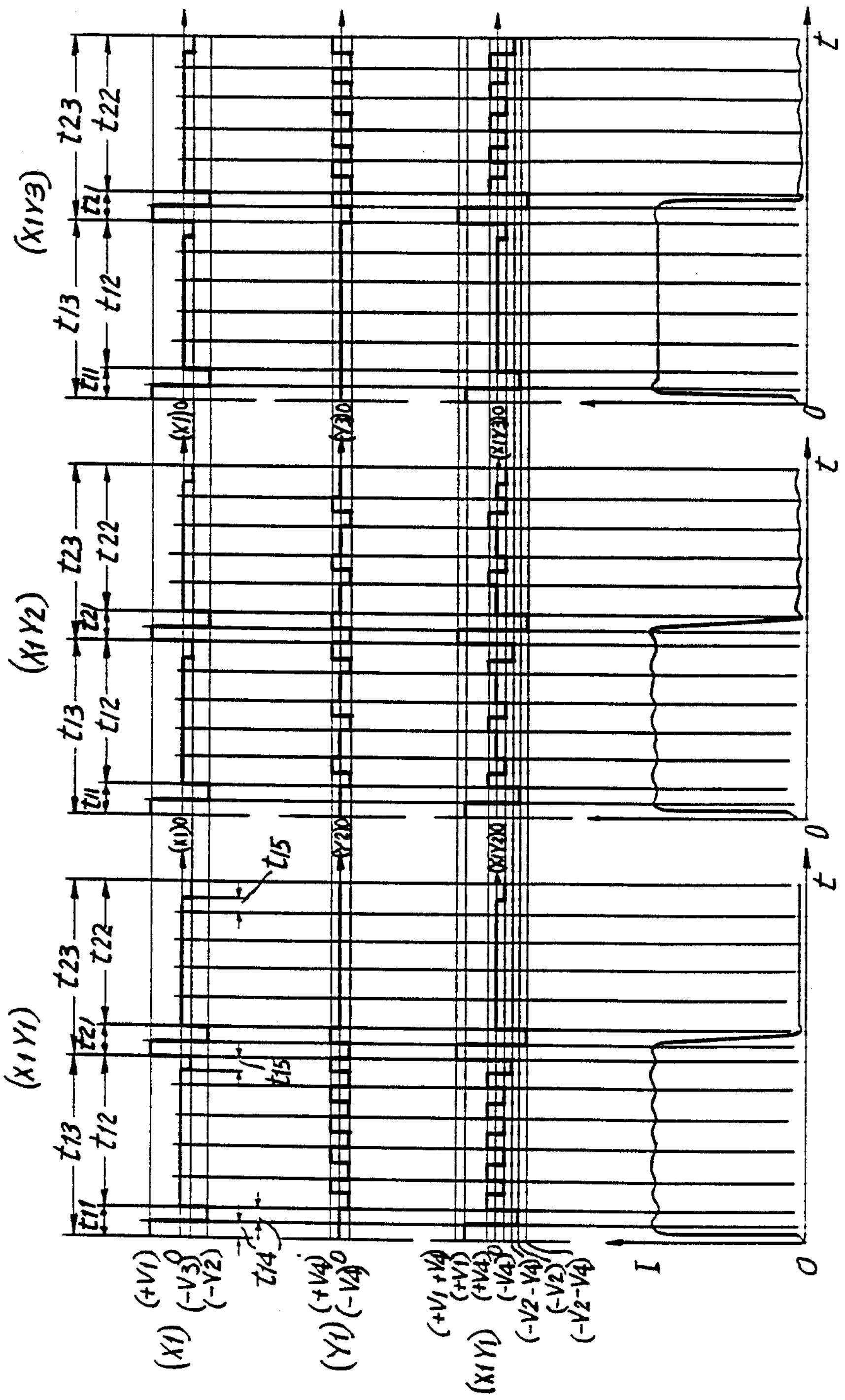
FIG. 33 shows the relationship between the driving waveform and the light transmitting state indicated in Embodiment 11 of the present invention.

FIG. 33 shows the waveform applied to each picture element on the common electrode X1 for turning "ON" or "OFF" state as shown in FIG. 2(*b*) and the light transmitting state. For a fuller understanding the variation of the light transmitting state, "ON" or "OFF" state is switched in the next flame period t23.

In FIG. 33, each of t11 to t25 shows the same as that in FIG. 27, and the amplitude V1 is 8 V, V2 is 6 V, and V3 or V4 is 2 V, respectively.

Embodiment 11 is different from Embodiments 9 and 10 in that the pulse width of the pulse which is applied to the non-selecting term is not larger than that of the pulse more than the saturation voltage, applied for turning the liquid crystal "ON" or "OFF" state so as to the contrast ratio can be improved.

The voltage pulses of +V1 and −V2 are applied to the common electrode X1 by turns in the selecting term t11(t21), 0 V is applied in the non-selecting term t12(t22), and the voltage pulse of −V3 is applied as the amendment pulse in the term t15(t25). The voltage of 0 V is applied to the segment electrode Y1, Y2, and Y3 so that the picture element is turned "ON", on the other hand, the voltage pulses of −V4 and +V4 are applied by turns so that the picture element is turned "OFF". At this time, in case of "ON", the voltage pulse of—V2 less than the threthhold voltage is applied to each picture element after the pulse +V1 more than the saturation voltage is applied, on the other hand, in case of "OFF", the voltage pulses of (+V1+V4) and (−V2−V4) more than the saturation voltage are applied by turns.

The voltage pulses of ±V4 having the pulss width of 200 sec or 0 V are applied according to on-off pattern in the non-selecting term t12 (t22). However, since the amendment pulse −V3 is applied in the last of the flame period, namely, the term t15(t25), the voltage pulse (−V3−V4) or −V3 is applied.

In the present embodiment, the first positive pulse more than the saturation voltage which makes the picture element "ON" state at the begining of the selecting term is applied, and then the second negative pulse having the amplitude different from the first pulse is applied. Thus, on-off pattern is selected according to whether this second pulse is less than the threshold voltage or the same is more than the saturation voltage. At this time, the difference of the amplitude of the first pulse is made to be same as the difference of the amplitude of the second pulse. And then the difference is amended in the term t15(t25), thereby rendering that the average of the voltage which is applied during one flame period equal to zero.

In the present embodiment, the pulse width of the amendment pulse is same as the pulse width of the first pulse and the second pulse. However, it is not necessary to limit this, therefore, it has only to do that the amplitude and the pulse width of each pulse are determined so that the condition of $|V1{\cdot}t1|-|V2{\cdot}t2|=|V3{\cdot}t3|$ (t1, t2, and t3 show the pulse width of each pulse) is satisfied.

Therefore, in this embodiment, as indicated in Embodiments 9 and 10, it is also possible to reduce the time of the selecting term to half in comparison with the driving method according to Embodiments 1 to 4. And further this driving method is also available for the cases, for example, that the high speed driving is required and that many common electrodes are required. Since the picture element never turns "ON" or "OFF" state in the non-selecting term, as indicated in the driving method according to Embodimens 5 to 8, the present driving method is also available for the liquid crystal shutter, wherein even the variation of light transmiiting state in the very short time becomes in serious question in quarity.

In case of the present embodiment, the contrast ratio of the picture element (X1 Y1) is 24:1, (X1 Y2) is 23:1, and (X1 Y3) is 23:1. In the present embodiment, the timing applying the amendment pulse is not restricted in just before the selecting term.

Figure 34:
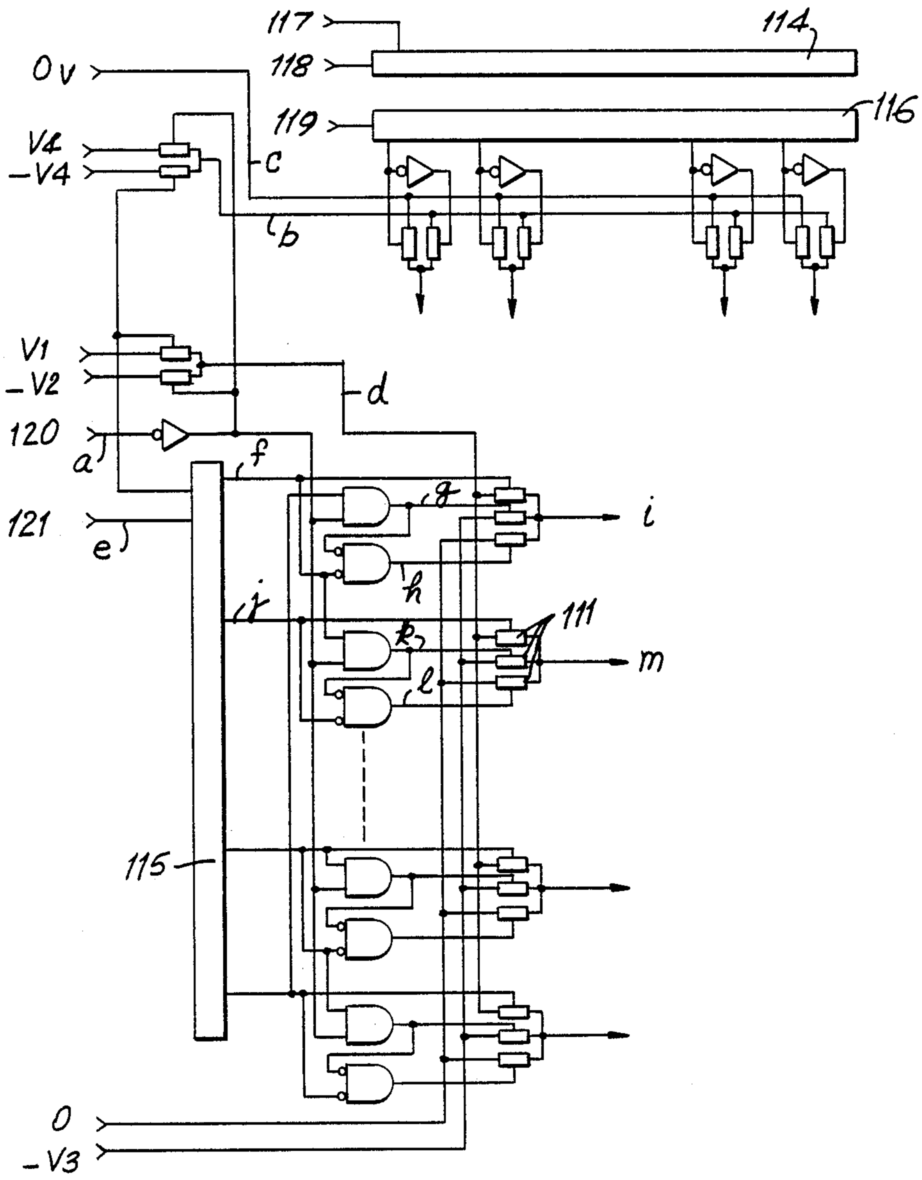
FIG. 34 shows an example of the practical circuit for realizing the driving waveform illustrated in FIG. 33.

FIG. 34 is a block diagram showing an example of a practical circuit for realizing the driving waveform as shown in FIG. 33. The common electrode data signal 121 is transmitted to the shift register 15 by the common electrode shift clock signal 120. And the waveform d is applied in the selecting term, 0 V is applied in the non-selecting term, and the voltage which amends the DC component just before the selecting term is switched so that the common electrode waveform is output. On the other hand, the segment electrode data signal 117 is transmitted to the shift register 114 by the segment electrode shift clock 118. After the data enough for one line is transmitted, the segment electrode data signal 117 is latched by the latch signal 119, then the transmission gate 111 is switched by the output signal to output "ON" or "OFF" state (the waveform of b or c). V1, V2, V3, and V4 are the source voltages of the common electrode and the segment electrode.

Figure 35:
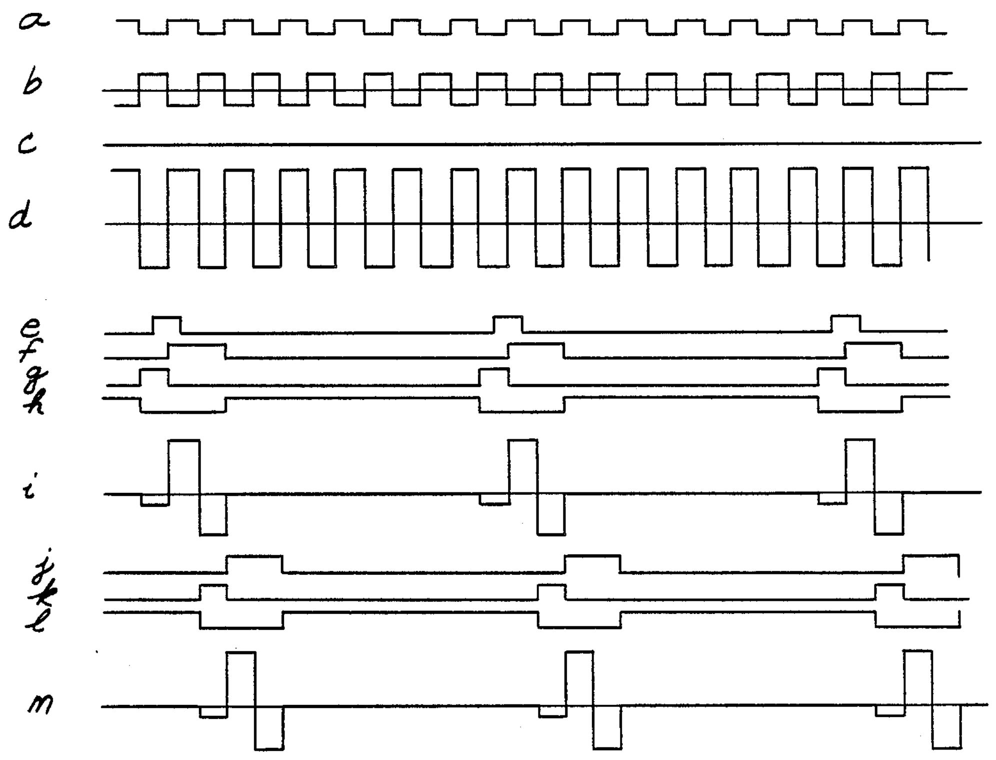
FIG. 35 shows the time charts for signal waveform at each point of the circuit illustrated in FIG. 34.

FIG. 35 shows the time charts showing the signal waveform of the circuit as shown in FIG. 34.

Embodiment 12

Figure 36:
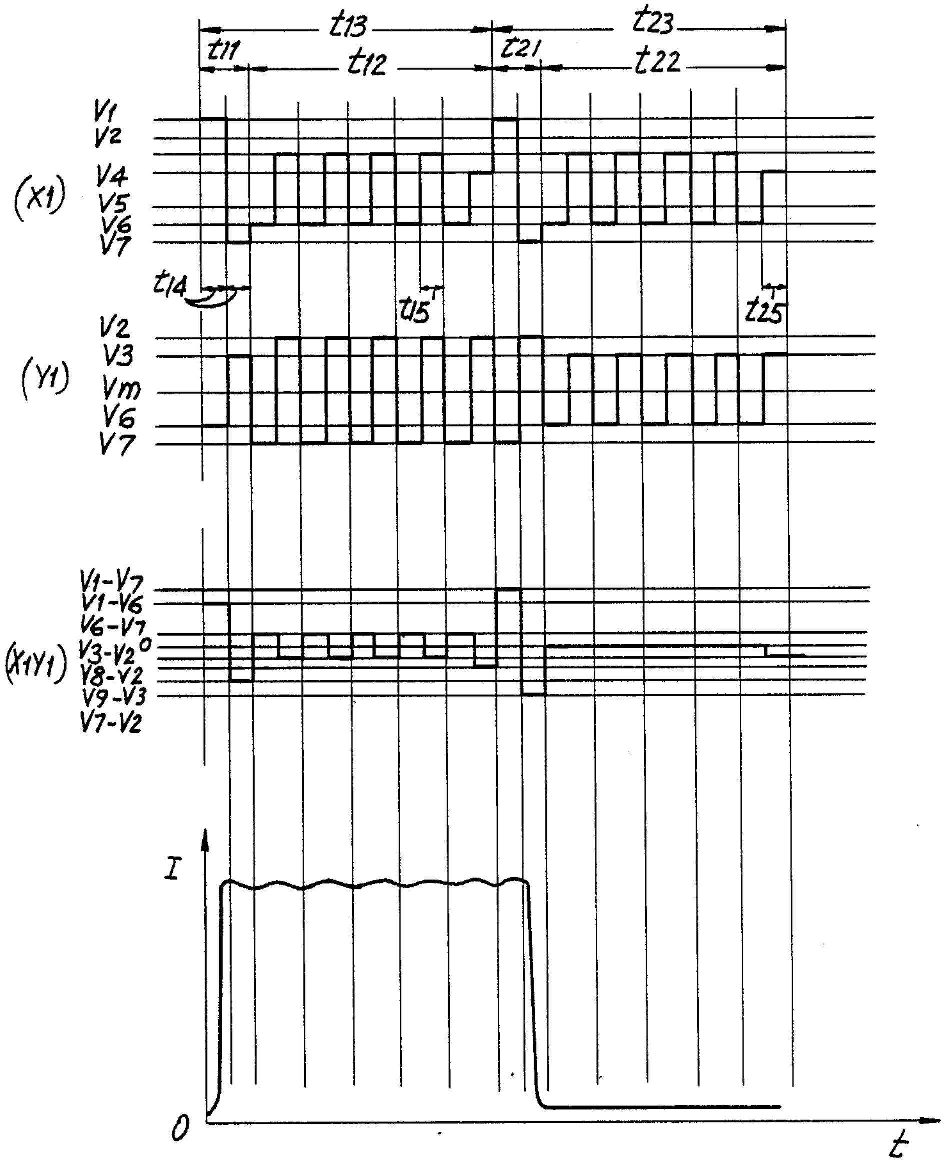
FIG. 36 shows the relationship between the driving waveform and the light transmitting state indicated in Embodiment 12 of the present invention.

FIG. 36 shows the waveform applied to the common electrode X1 and the segment electrode Y1 for turning "ON" or "OFF" as shown in FIG. 2(*b*) and the light transmitting state of the picture element (X1 Y1). For a fuller understanding the variation of the light transmitting state, "ON" or "OFF" state is switched in the next flame period t23.

In FIG. 36, each of t11 to t25 shows the same as that in FIG. 27. The amplitudes V1, V2, V3, V4, V6, and V7 are 10 V, 8 V, 6 V, 4 V, 2 V, and 0 V, respectively. Vm is the intermediate voltage of the voltage pulse which is applied to the segment electrode, at this time, the value of Vm is 4 V.

Embodiment 12 is different from Embodiment 11 in that the voltage level of the common electrode is same as that of the segment electrode so as to reduce the voltage applied to the common electrode.

The voltage pulses of V1 and V7 are applied to the common electrode X1 by turns in the selecting term t11(t21), the voltage pulses of V6 and V3 are applied by turns in the non-selecting term t12(t22), and the amendment pulse V4 is applied in the term t15(t25). The voltage pulses of V6 and V3 are applied to the segment electrode Y1 by turns so that the picture element is turned "ON", on the other hand, the voltage pulses V7 and V1 are applied by turns so that the picture elemnt is turned "OFF". At this time, in case of "ON", the voltage pulse (V7–V3) less than the threthhold voltage is applied after the voltage pulse (V1–V6) more than the saturation voltage is applied, on the other hand, in case of "OFF", the voltage pulses (V1–V7) and (V7–V2) more than the saturation voltage are applied by turns as shown in FIG. 36. The voltage pulses of (V6–V7) and (V3–V2) or 0 V are applied according to on-off pattern in the non-selecting term t12(t22). However, since the amendment pulse V3 is added in the last of the flame period, namely, the term t15(t25), the voltage pulse of (V4–V2) or (V4–V3) is applied.

In the present embodiment, as indicated in Embodiment 11, the difference of the amplitude of the positive and negative pulses applied in the selecting term is amended in the term t15(t25), thereby rendering the average of the voltage applied during one flame period equal to zero.

The driving method according to the present embodiment is also available for such like the liquid crystal shutter, as same in Embodiment 11, and further, the same contrast ratio as Embodiment 11 can be obtained.

Figure 37:
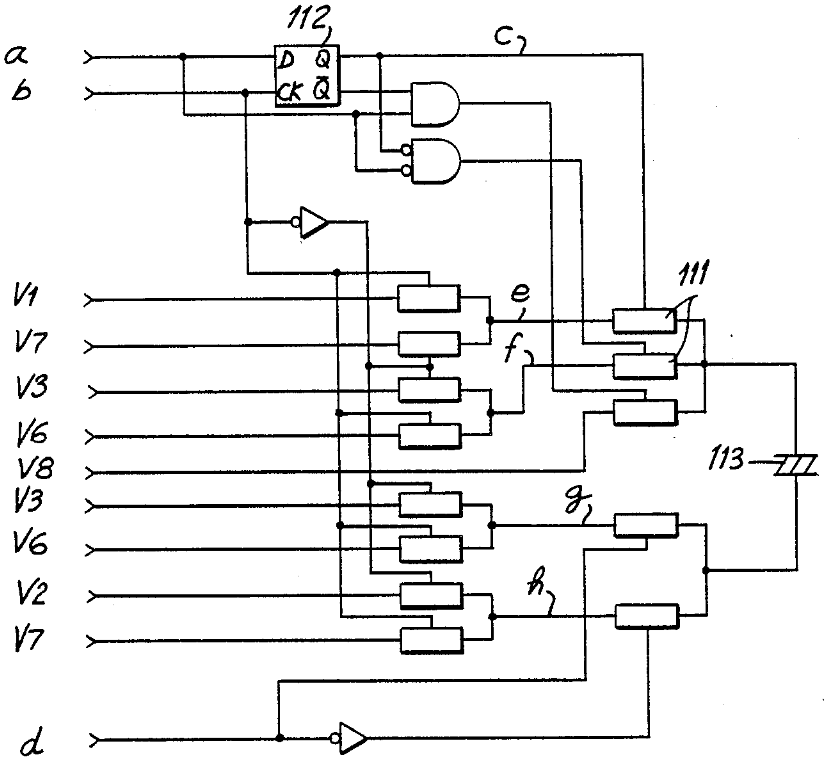
FIG. 37 shows an example of the practical circuit for realizing the driving waveform illustrated in FIG. 36.
Figure 38:
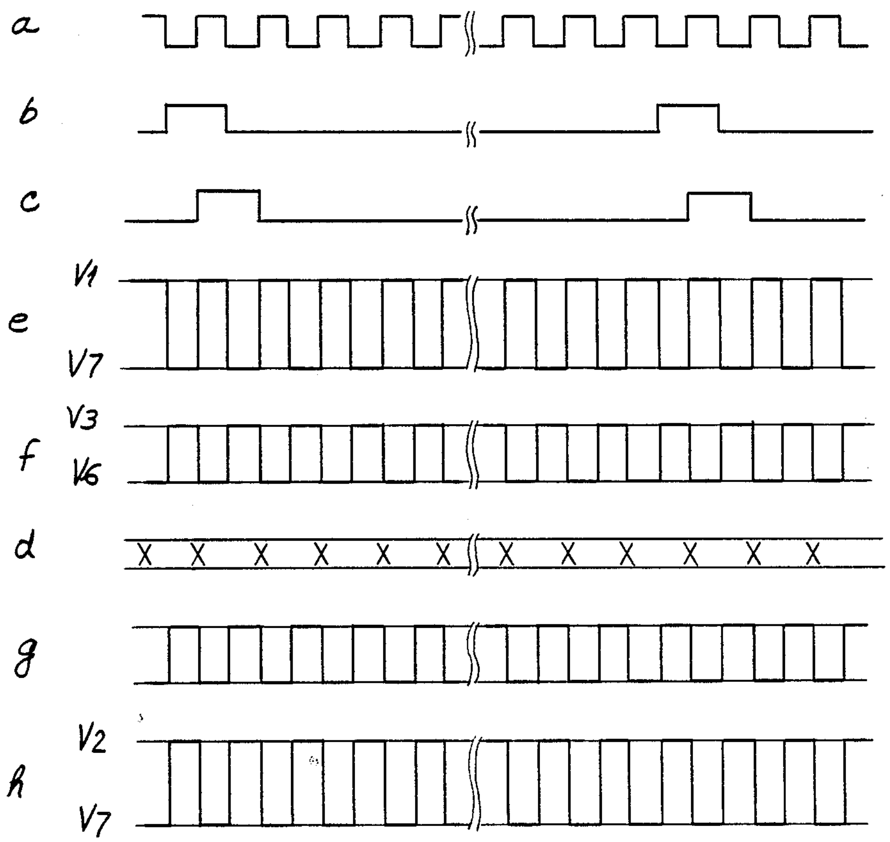
FIG. 38 shows the time charts for signal waveform at each point of the circuit illustrated in FIG. 37.

FIG. 37 is a block diagram showing an example of a practical circuit for realizing the driving waveform as shown in FIG. 36. Upon receipt of the signal a the transmission gate 111 is selected, and then the common electrode waveform at the time of selecting e and the common electrode waveform at the time of non-selecting f are selected by the common electrode data b to form the common electrode waveform. On the other hand, upon receipt of the signal a the transmission gate 111 is selected, and the "ON" waveform g and the "OFF" waveform h are selected by the segment electrode data d to form the segment electrode waveform, and then the formed segment electrode waveform is applied to the liquid crystal element 113. V1, V2, V3, V4, V6, and V7 are the source voltages of the common electrode and the segment electrode. FIG. 38 shows each signal at each point of the circuit as shown in FIG. 37.

Embodiment 13

Figure 39:
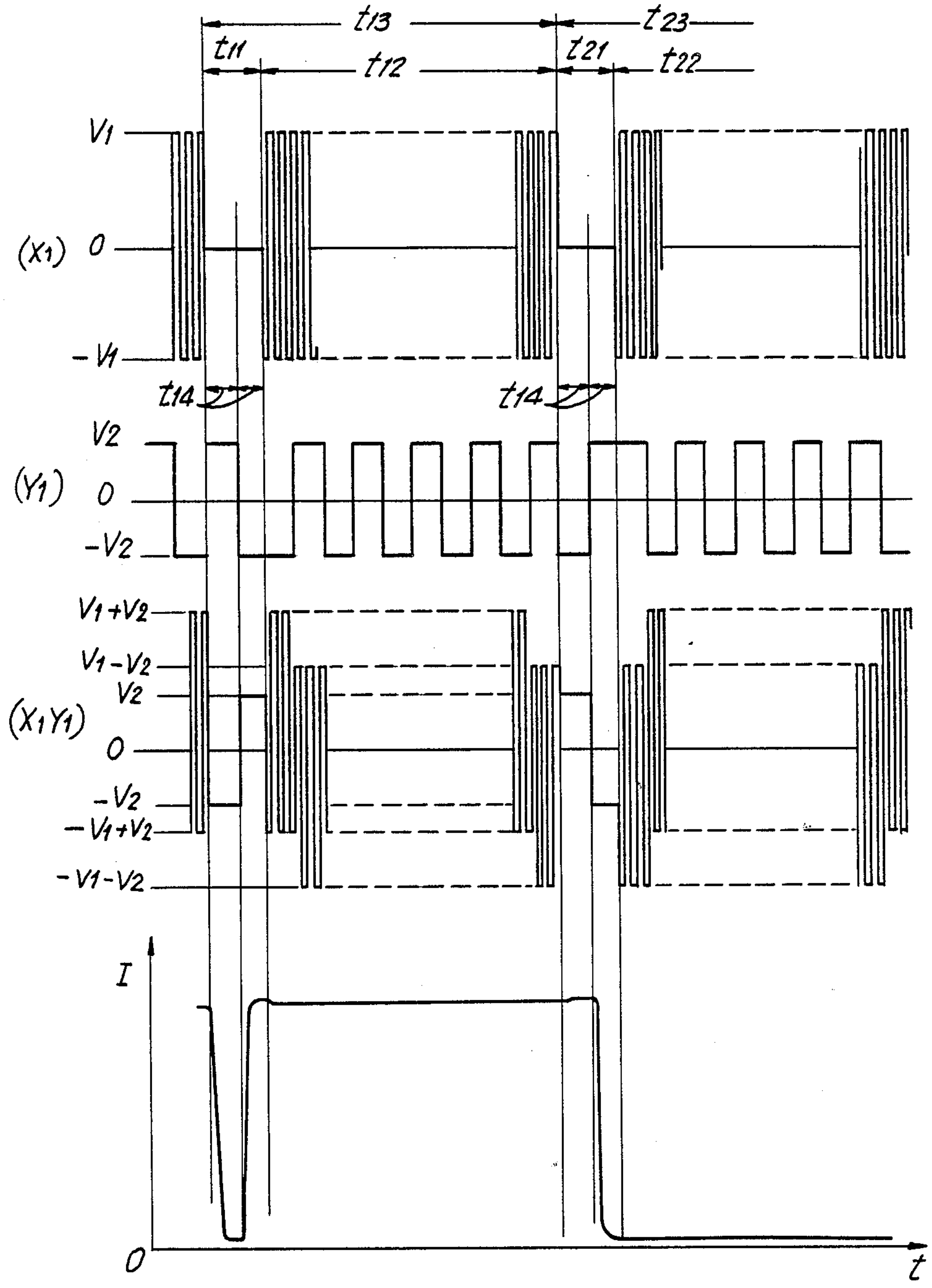
FIG. 39 shows the relationship between the driving waveform and the light transmitting state indicated in Embodiment 13 of the present invention.

FIG. 39 shows the waveform applied to the common electrode X1 and the segment electrode Y1 for turning "ON" or "OFF" as shown in FIG. 2(*b*) and the light transmitting state of the picture element (X1 Y1). For a fuller understanding the variation of the light transmitting state, "ON" or "OFF" state is switched in the next flame period t23.

In FIG. 39, t13 shows the first flame period and t23 shows the next flame period. t11 and t21 show the selecting term and t12 and t22 show the non-selecting term. t14 shows the pulse width of 200 μsec.

The amplitude V1 is 30 V and V2 is 12 V.

The feature of the present embodiment is that the memory property of the liquid crystal element is improved by applying the alternating pulse having high-frequency of 10 KHz in the non-selecting term, thereby eliminating the contrast ratio.

The voltage of 0 V is applied to the common electrode X1 in the selecting term t11(t21), on the other hand, the alternating pulses of ±V1 are applied in the non-selecting term t12(t22). The voltage pulses +V2 and −V2 are applied by turns to the segment electrode Y1 by turns so that the picture element is turned "ON", on the other hand, the voltage pulses −V2 and +V2 are applied by turns so that the picture element is turned "OFF".

At this time, in case of "ON" the voltage pulses −V2 and +V2 are applied by turns to the picture element (X1 Y1), on the other hand, in case of "OFF", the voltage pulses +V2 and −V2 are applied by turns. The alternating pulse having the positive amplitude of (+V1+V2) and the negative amplitude of (−V+V2) and the alternating pulse having the positive amplitude of (+V1−V2) and the negative amplitude of (−V1+V2) are applied alternatively over the term t14 in the non-selecting term. Both of the voltage pulses applied in the selecting term are more than the saturation voltage, and the on-off pattern is selected according to the polarity of the pulse which is the last to applied. The amplitude of the alternating pulse applied in the selecting term is very large, however, since the pulse width of 50 μsec is very small value, the liquid crystal element does not respond, therefore, the memory property is improved, thereby eliminating the contrast ratio. The good contrast ratio, that is, 40:1 can be obtained in the present embodiment.

The average of the voltage pulse applied to the liquid crystal element is zero, and accordingly, the deterioration of the liquid crystal element can be prevented.

Figure 40:
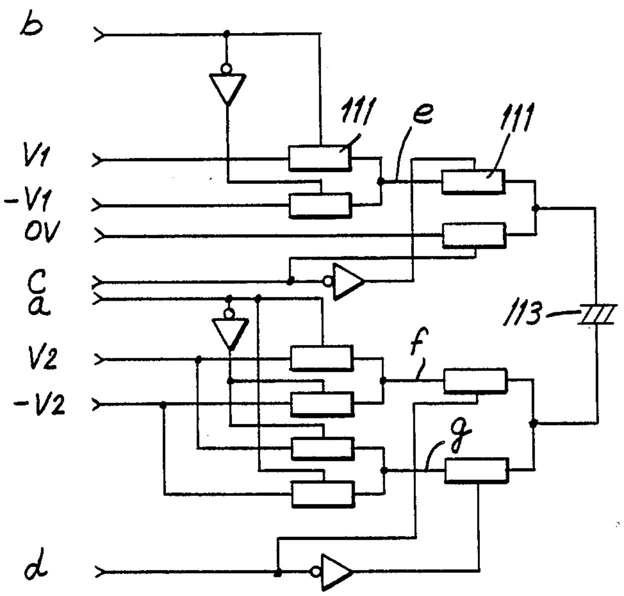
FIG. 40 shows an example of the practical circuit for realizing the driving waveform illustrated in FIG. 39.
Figure 41:
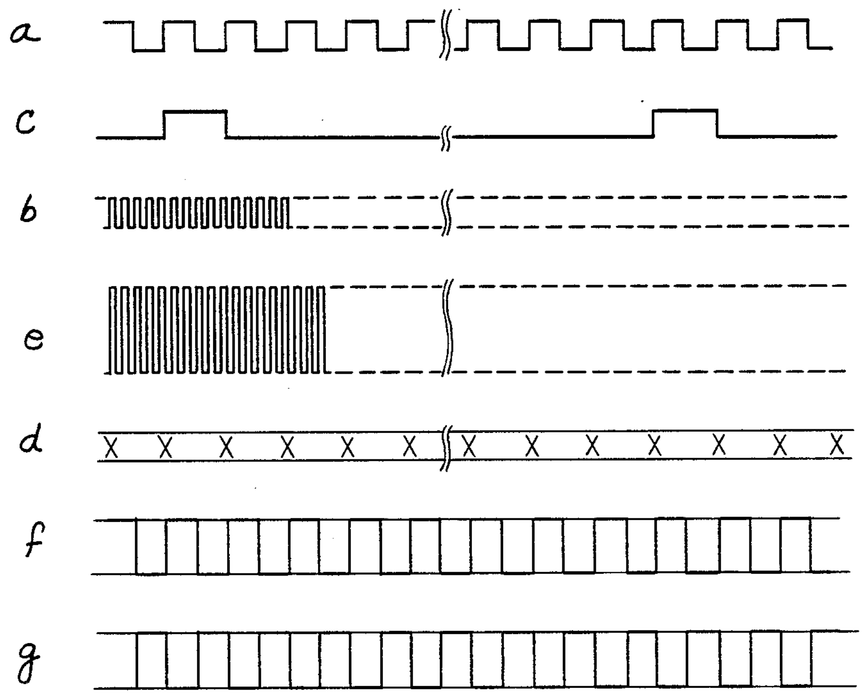
FIG. 41 shows the time charts for signal waveform at each point of the circuit illustrated in FIG. 40.

FIG. 40 is a block diagram showing an example of a practical circuit for realizing the driving waveform as shown in FIG. 39. Upon receipt of the signal a or b the transmission gate 111 is selected, and then the common electrode waveform at the time of selecting 0 V and the common electrode waveform at the time of non-selecting e are selected by the common electrode data c to form the common electrode waveform. On the other hand, upon receip of the signal a the transmission gate 111 is selected, and the "ON" waveform f and the "OFF" waveform g are selected by the common electrode data d to form the segment electrode waveform, and then the segment electrode waveform are applied to the liquid crystal element 113. V1, V2, and 0 V are the source voltages of the common electrode and the segment electrode. FIG. 41 shows each signal at each point of the circuit as shown in FIG. 40.

Embodiment 14

Figure 42:
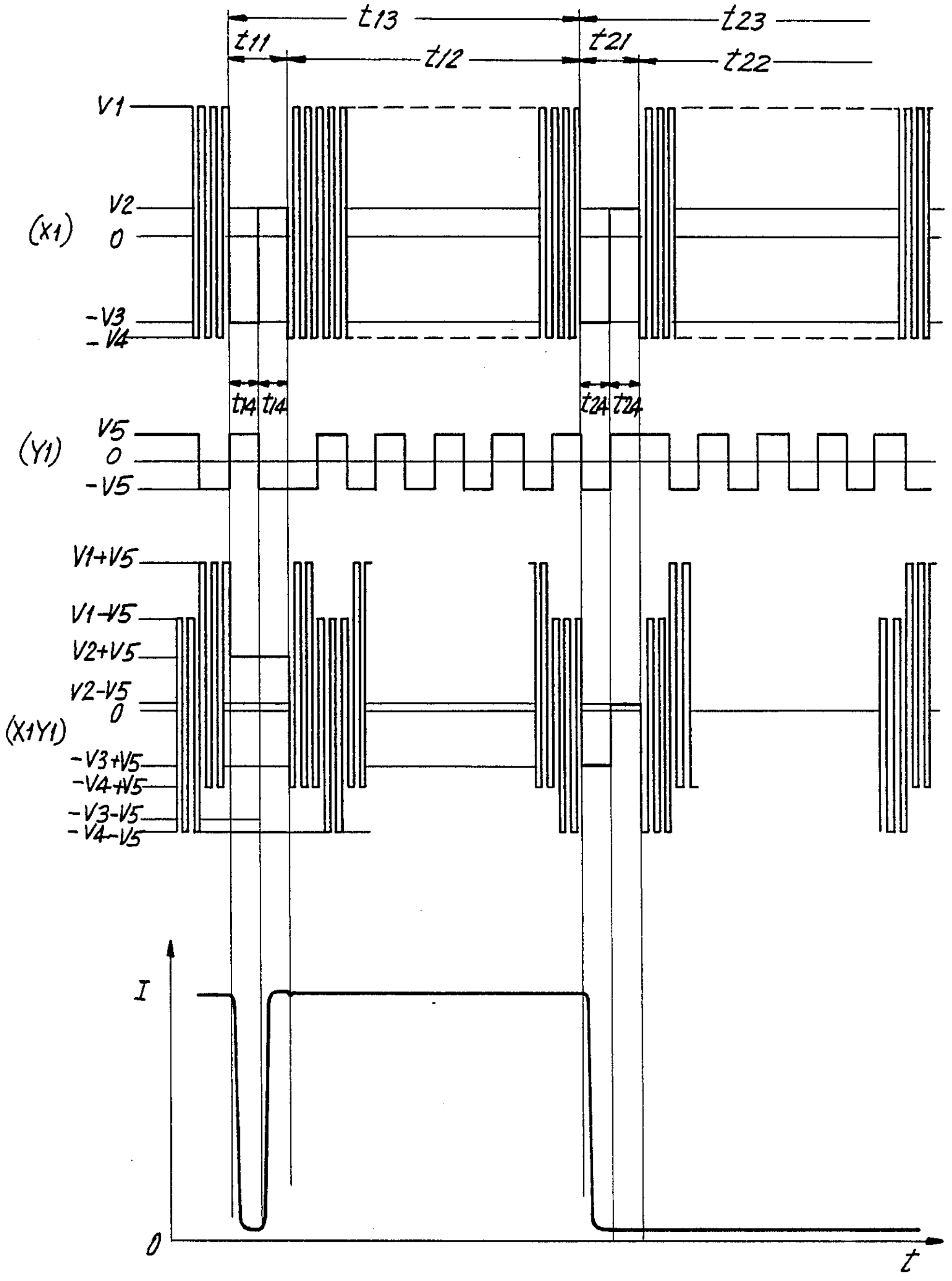
FIG. 42 shows the relationship between the driving waveform and the light transmitting state indicated in Embodiment 14 of the present invention.

FIG. 42 shows the waveform applied to the common electrode X1 and the segment electrode Y1 for turning "ON" or "OFF" as shown in FIG. 2(*b*) and the light transmitting state of the picture element (X1 Y1). For a fuller understanding the variation of the light transmitting state, "ON" or "OFF" state was switched in the next flame period t23.

In FIG. 42, t13 shows the first flame period, t23 shows the next flame period, t11 and t21 show the selecting term, and t12 and t22 show the non-selecting term. t14 shows the pulse width of 200 μsec.

Embodiment 14 is differemnt from Embodiment 13 in that the difference of the amplitude of the positive and negative pulses applied in the selecting term t11(t21) is amended by the alternating pulse having the high frequency which is applied in the non-selecting term t12(t22). Therefore, the amplitudes V1 and V4 of this alternating pulses are determined so that the condition of $|V3-t14|-|V2-t14|=\frac{1}{2}(|V1-t12|-|V4-t12|)$ is satisfied. According to the present embodiment, since t12 is 10t14, the amplitudes V1, V2, V3, and V4 are 30 V, 10 V, 20 V, and 28 V, respectively. And the amplitude V5 is 5 V.

The voltage pulses of −V3 and V2 are applied to the common electrode X1 by turns in the selecting term t11(t21), on the other hand, the alternating pulse having the positive amplitude of V1, the negative amplitude of V4, and the frequency of 10 KHz is applied in the non-selecting term t12(t22). The voltage pulses of +V5 and −V5 are applied to the segment electrode Y1 by turns so that the picture element is turned "ON", on the other hand, the voltage pulses of −V5 and +V5 are applied by turns so that the picture element is turned "OFF". At this time, in case of "ON", the voltage pulses of (−V3−V5) and (+V2+V5) more than the saturation voltage are applied to the picture element (X1 Y1), on the other hand, in case of "OFF", the negative voltage pulse (−V3+V5) more than the saturation voltage and the voltage pulse (+V2−V5) less than the threshold voltage are applied. The alternating pulse having the positive amplitude of (+V1−V5) and the negative amplitude of (−V4+V5) and the alternating pulse having the positive amplitude of (+V1−V5) and the negative amplitude of (−V4−V5) are applied alternatively over the term t14 in the non-selecting term. The difference of the amplitude of the positive and negative pulses which are applied in the selecting term is the voltage pulse of (V3-V2) regardless of the on-off pattern, and the difference (V3-V2) is amended by the alternating pulse applied in the non-selecting term, thereby rendering the average of the voltage pulse which is applied to the liquid crystal equal to zero. In this embodiment, the memory property of the liquid crystal is also improved, thereby obtaining the same good contrast ratio as Embodiment 13.

Figure 43:
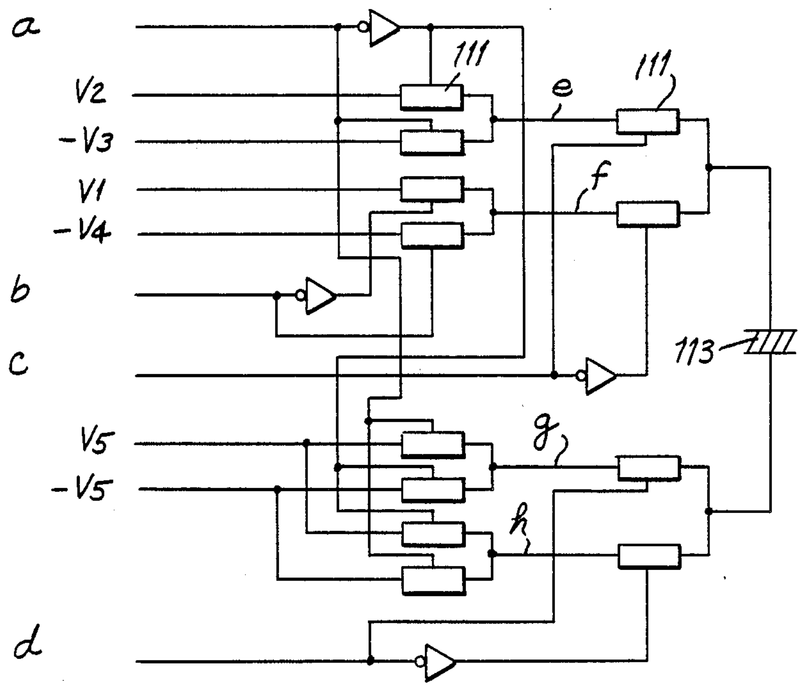
FIG. 43 shows an example of the practical circuit for realizing the driving waveform illustrated in FIG. 42.
Figure 44:
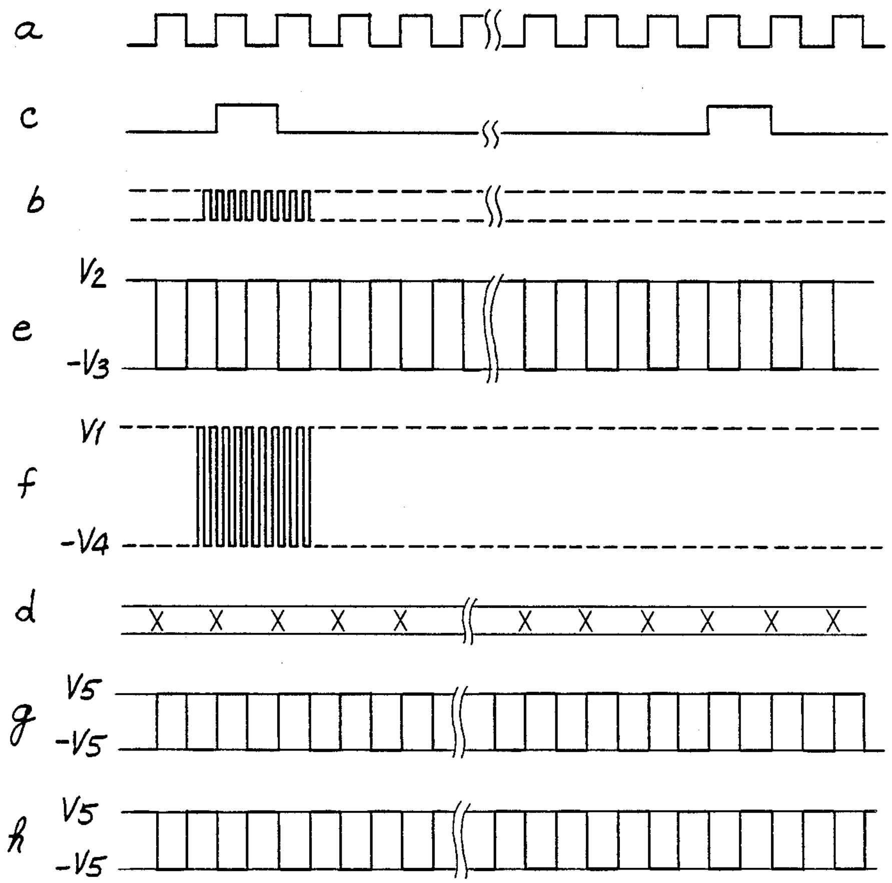
FIG. 44 shows the time charts for signal waveform at each point of the circuit illustrated in FIG. 43.

FIG. 43 is a block diagram showing an example of a practical circuit for realizing the driving waveform as shown in FIG. 42. Upon receipt of the signal a or b the transmission gate 111 is selected, and the common electrode waveform at the time of selecting e and the common electrode waveform at the non-selecting f are selected by the common electrode data c to form the common electrode waveform. On the other hand, upon receipt of the signal a the transmission gate 111 is selected, and the "ON" waveform g and the "OFF" waveform h are selected by the common electrode data d to form the segment electrode waveform, and then the formed segment electrode waveform is applied to the liquid crystal element 113. V1, V2, −V3, −V4, and V5 are the source voltages of the common electrode and the segment electrode. FIG. 44 shows each signal at each point of the circuit as shown in FIG. 43.

Embodiment 15

Figure 45:
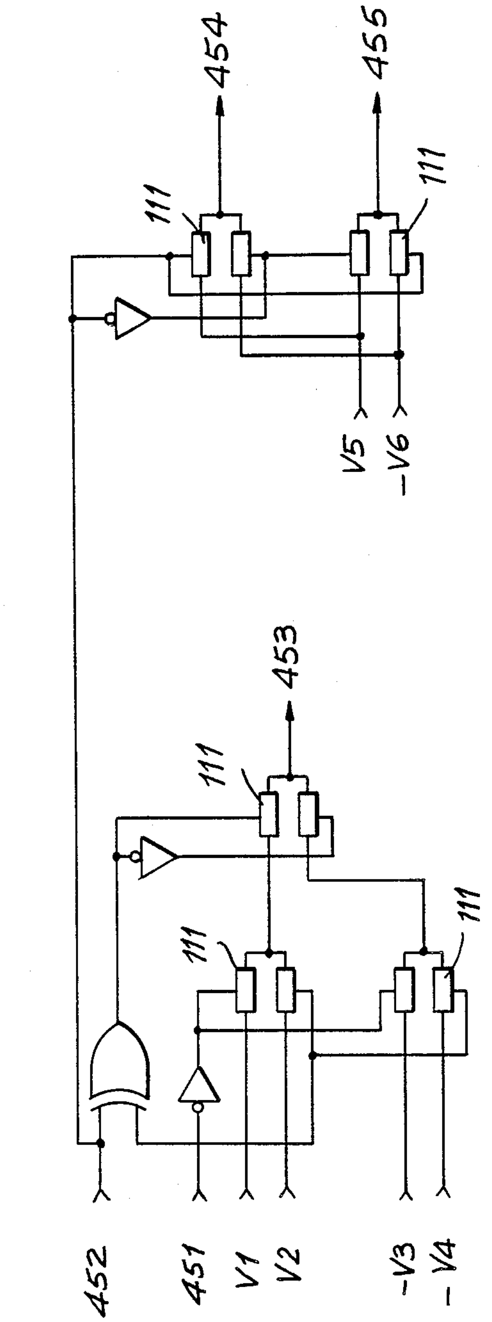
FIG. 45 shows an example of the practical circuit for realizing the driving waveform indicated in Embodiment 15 of the present invention.
Figure 46:
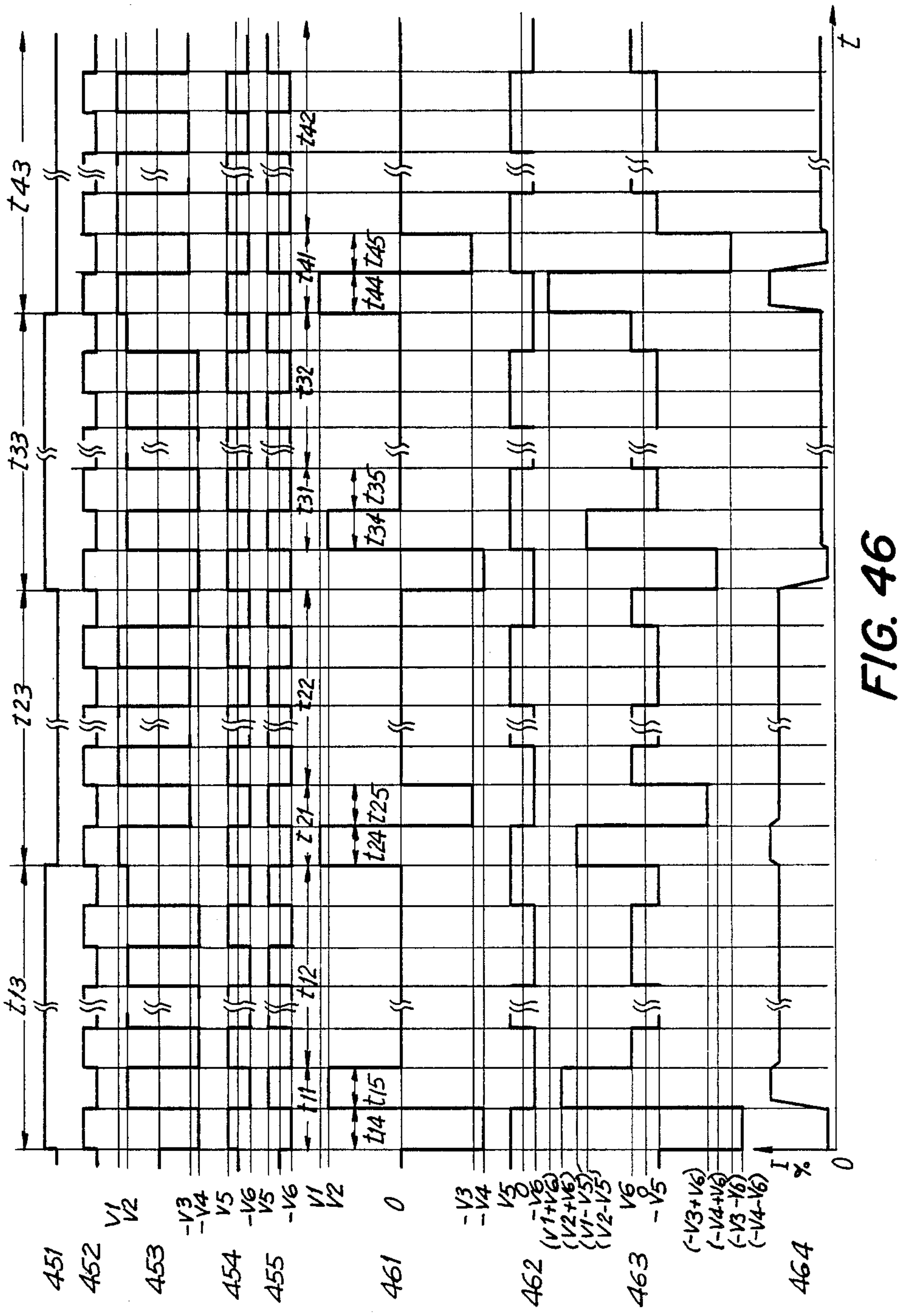
FIG. 46 shows the time charts for signal waveform at each point of the circuit illustrated in FIG. 45, and the relationship between the driving waveform and the light transmitting state.
Figure 81:
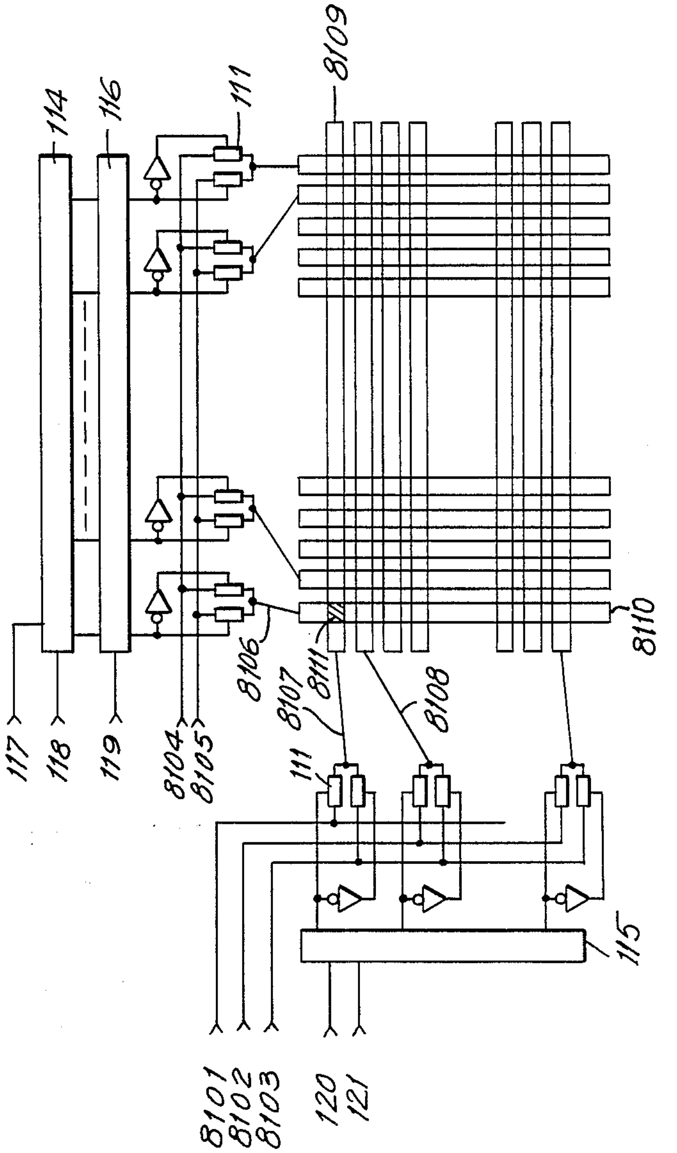
FIG. 81 shows an example of the driving circuit used in each embodiment of the present invention.

FIG. 45 is a block diagram showing a practical circuit for realizing the driving waveform according to the present embodiment. FIG. 81 shows an example of a driving circuit for applying the driving waveform formed by the circuit as shown in FIG. 45 to the liquid crystal element. 451 is a flame signal, 452 is a signal for switching the polarity. The transmission gate 111 is switched by these signals 451 and 452, and the voltage of V1, V2, −V3, and −V4 are switched to form the selecting waveform 453 of the common electrode. Further, the voltages of V5 and −V6 are switched to form the "ON" waveform 454 and the "OFF" waveform 455 of the segment electrode. FIG. 46 shows the time charts of these signal waveforms.

These signal waveforms are applied to the driving circuit as shown in FIG. 81 to form the driving waveform which is applied to the common electrode and the segment electrode. Namely, the selecting waveform 453 is applied to 8101 and 8102, 0 V is applied to 8103 as the non-selecting waveform, the "ON" waveform 454 is applied to 8105, and the "OFF" waveform 455 is applied to 8104, respectively.

In FIG. 81, 121 is a common electrode data. The common electrode data 121 is transmitted to the shift register 115 by the common electrode shift clock 120, then the transmission gate 111 is switched by outputting the selecting signal per one common electrode succesively, and further, the common electrode driving waveform is applied to 8107. 117 is a segment electrode data. This segment electrode data 117 is transmitted to the shift register 114 by the segment electrode shift clock 118. After the data enough for one common electrode is transmitted, the segment electrode data 117 is latched to the latch circuit 116 by the latch pulse 119. The transmission gate 111 is switched by the output of the latch circuit 116, then the "ON" waveform 454 and the "OFF" waveform 455 are switched, and further the segment electrode driving waveform is applied to 8106.

FIG. 46 shows the waveform applied to the common electrode 8109 and the segment electrode 8110 as shown in FIG. 81 and the synthetic waveform applied to the picture element 8111 and the light transmitting state.

Each of t13, t23, t33, and t43 shows the one flame period, each of t11, t21, t31, and t41 shows the selecting term, and each of t12, t22, t32, and t42 shows the non-selecting term, respectively. Each of t14, t15, t24, t25, t34, t35, t44, and t45 shows the pulse width, and in the present embodiment, all of them are 200 μsec, respectively.

The amplitudes V1 and V4 are 10 V, V2 and V3 are 8 V, and V5 and V6 are 2 V.

The voltage pulses applied to the common electrode 8109 are as follows. Namely, for the selecting term t11(t21, t31, t41), as shown in 461 of FIG. 46, the voltage pulses of −V4 and +V2 are applied to the common electrode 8109 by turns as the first selecting waveform and the voltage pulses of +V1 and −V3 are applied to the same by turns as the second selecting waveform alternatively at intervals of one flame. On the other hand, for the non-selecting term t12(t22, t32, t42), the voltage of 0 V is applied.

The voltage pulses applied to the segment electrode 8110 are as follows. The voltage pulses of +V5 and −V6 are applied to the segment electrode 8110 in the order of positive and negative as the "ON" waveform, on the other hand, the voltage pulses of −V6 and +V6 are applied to the same in the order of negative and positive as the "OFF" wavefom as shown in 462 of FIG. 46.

At this time, the synthetic waveform applied to the picture element 8111 is as follows. Namely, as shown in 463 of FIG. 46, for the period in which the first selecting waveform is applied to the common electrode 8109, in case of "ON", the voltage pulses of (−V4−V5) and (V2+V6) are applied in the order of negative and positive to the picture element 8111, on the other hand, in case of "OFF", the voltage pulses of (−V4+V6) and (V2−V5) are applied in the order of negative and positive. And for the period in which the second selecting waveform is applied to the common electrode 8109, in case of "ON", the voltage pulses of (V1−V5) and (−V3+V6) are applied in the order of positive and negative, on the other hand, in case of "OFF", the voltage pulses of (V1+V6) and (−V3−5) are applied in the order of positive and negative. The voltage pulses of −V5 and +V6 are applied in the non-selecting term.

The present embodiment provides the driving method in which the positive or negative pulse more than the saturation voltage is applied at the beginning of the selecting term to turn the picture element "ON" or "OFF" state. Further, the "ON" or "OFF" state is selected by whether to switch the "ON" or "OFF" state by making the next applied pulse have the opposite polarity and more than the saturation voltage or to hold "OFF" state by making the next applied pulse have the opposite polarity and less than the threshold voltage. The difference of the amplitude between the positive pulse and the negative pulse in the flame in which the first selecting waveform is applied, becomes (−V4+V2), that is, −2V, however, since the difference of the amplitude between the positive pulse and the negative pulse in the flame in which the second selecting waveform is applied, becomes (V1−V3), that is, +2 V, and therefore, the differences are offset each other. Namely, the average of the voltage pulse applied to the picture element at intervals of two flames becomes zero in the present embodiment, and accordingly, the deterioration of the liquid crystal element can be prevented. 461 of FIG. 46 shows the light transmitting state of the picture element 8111.

Embodiment 16

Figure 47:
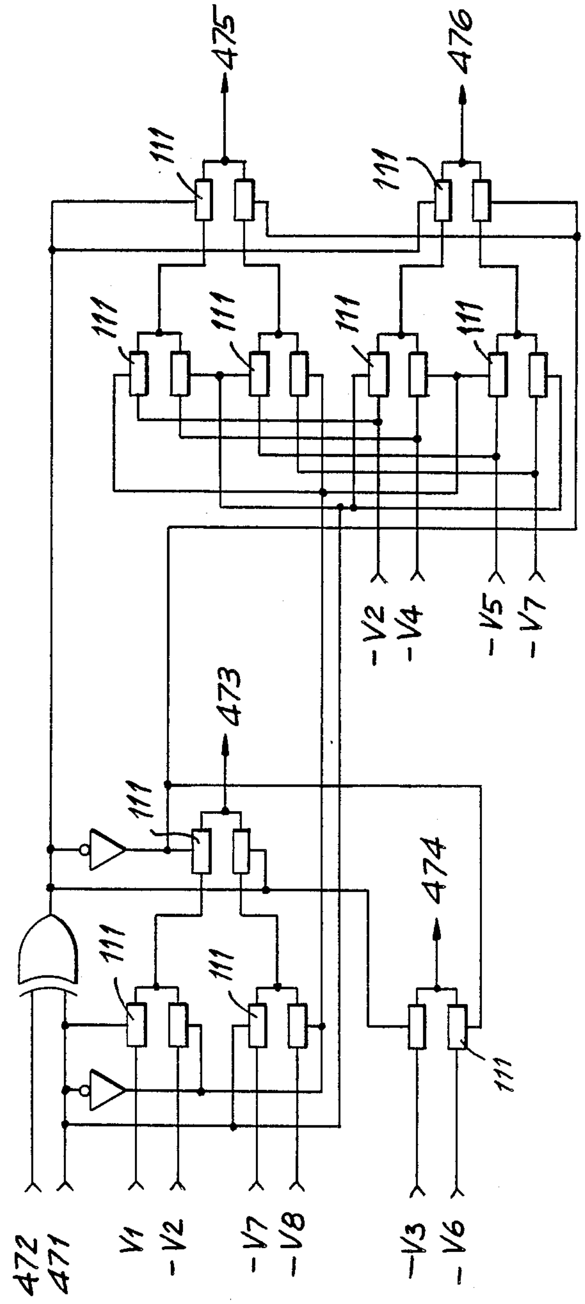
FIG. 47 shows an example of the practical circuit for realizing the driving waveform indicated in Embodiment 16 of the present invention.

FIG. 47 is a block diagram showing a practical circuit for realizing the driving waveform according to the present embodiment. FIG. 81 shows an example of a driving circuit for applying the driving waveform formed by the circuit as shown in FIG. 47 to the liquid crystal element. 471 is a flame signal, 472 is a signal for switching the polarity. The transmission gate 111 is switched by these signals 471 an 472, and the voltages of V1, −V2, −V7, and −V8 are switched to form the selecting waveform 473 of the common electrode and the voltages of −V3 and −V6 are switched to form the non-selecting waveform 474 of the common electrode. And further, the voltages of −V2, −V4, −V5, and −V7 are switched to form the "ON" waveform 475 and the "OFF" waveform 476 of the signal electrode.

Figure 48:
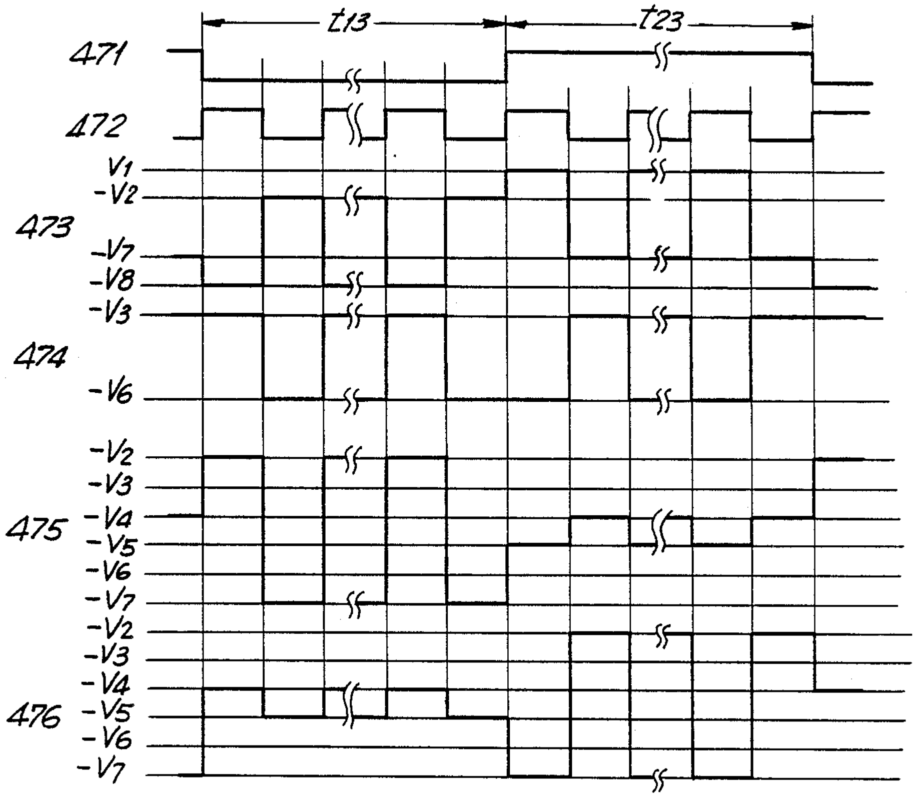
FIG. 48 shows the time charts for signal waveform at each point of the circuit illustrated in FIG. 47.

FIG. 48 shows the time charts of these segment waveforms.

These waveforms are applied to the driving circuit as shown in FIG. 81 to form the driving waveform applied to the common electrode and the segment electrode. Namely, the selecting waveform 473 is applied to 8101 and 8102, the non-selecting waveform 474 is applied to 8103, the "ON" waveform 475 is applied to 8105, and the "OFF" waveform 476 is applied to 8104, respectively.

In FIG. 81, 121 is the common electrode data. The common electrode data 121 is transmitted to the shift register 115 by the common electrode shift clock 120, then the transmission gate 111 is switched by outputting the selecting signal per one common electrode successively, and further, the common electrode driving waveform is applied to 8107. 117 is the segment electrode data. This segment electrode data 117 is transmitted to the shift register 114 by the segment electrode shift clock 118. After the data enough for one common electrode is transmitted, the segment electrode data 117 is latched to the latch circuit 116 by the latch pulse 119. The transmission gate 111 is switched by the output of the latch circuit 116, then the "ON" waveform 475 and the "OFF" waveform 476 are switched, and further the segment electrode driving waveform is applied to 8106.

Figure 49:
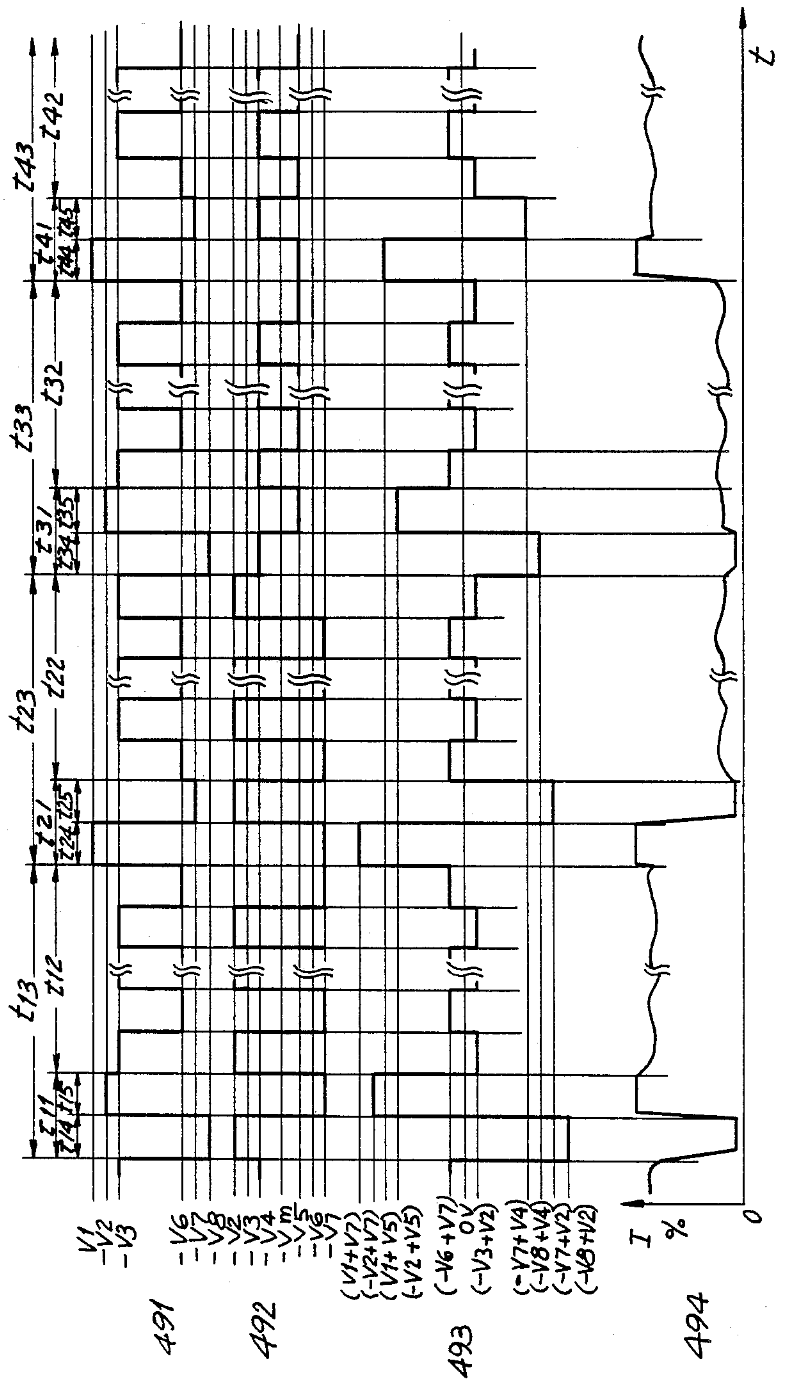
FIG. 49 shows the relationship between the driving waveform and the light transmitting state indicated in Embodiment 16 of the present invention.

FIG. 49 shows the waveform applied to the common electrode 8109 and the segment electrode 8110 as shown in FIG. 81 and the synthetic waveform applied to the picture element 8111 and the light transmitting state.

Each of t13, t23, t33, and t43 shows the one flame period, each of t11, t21, t31, and t41 shows the selecting term, and each of t12, t22, t32, and t42 shows the non-selecting term, respectively. Each of t14, t15, t24, t25, t34, t35, t44, and t45 shows the pulse width, and in this embodiment, all of them are 200 μsec, respectively.

The amplitude V1 is 0 V, V2 is 2 V, V3 is 4 V, V4 is 6 V, V5 is 5 V, V6 is 10 V, V7 is 12 V, and V8 is 14 V. −Vm is a intermediate voltage of the voltage pulse which is applied to the segment electrode, in this case, the value of −Vm is −7 V.

Embodiment 16 is different from Embodiment 15 in that the voltage level of the common electrode is equal to that of the segment electrode so as to reduce the voltage which is applied to the common electrode, and that the "ON" waveform and the "OFF" waveform of the segment electrode were varied by the selecting waveform applied to the common electrode.

The voltage pulses applied to the common electrode 8109 are as follows. Namely, for the selecting term t11(t21, t31, t41), as shown in 491 of FIG. 49, the voltage pulses of −V8 and −V2 are applied to the common electrode 8109 by turns as the first selecting waveform and the voltage pulses of V1, and =V7 are applied to the same by turns as the second waveform alternately at intervals of one flame, on the other hand, for the non-selecting term t12(t22, t32, t42), the voltage pulses of −V3 and −V6 are applied by turns in the flame in which the first selecting waveform is applied, and the voltage pulses of −V6 and −V3 are applied by turns in the flame in which the second selecting waveform is applied.

The voltage pulses applied to the segment electrode 8110 as follows. Namely, for the period in which the first selecting waveform is applied to the common electrode, as shown in 492 of FIG. 49, −V2 and −V7 are applied to the segment electrode 8110 by turns as the "ON" waveform, and −V4 and −V5 are applied to the same by turns as the "OFF" waveform. On the other hand, for the period in which the second selecting waveform is applied to the common electrode, −V5 and −V4 are applied by turns as the "ON" waveform, and −V7 and −V2 are applied by turns as the "OFF" waveform.

At this time, the synthetic waveform applied to the picture element 8111 is as follows. Namely, as shown in 493 of FIG. 49, for the period in which the first selecting waveform is applied to the common electrode, in case of "ON", the voltage pulses of (−V8+V2) and (−V2+V7) are applied in the order of negative and positive to the picture element 8111, on the other hand, in case of "OFF", the voltage pulses of (−V8+V4) and (−V2+V5) are applied in the order of negative and positive. And for the period in which the second selecting waveform is applied to the common electrode, in case of "ON", the voltage pulses of (V1+V5) and −V7+V4) are applied in the order of positive and negative, on the other hand, in case of "OFF", the voltage pulses of (V1+V7) and (−V8+V2) are applied in the order of positive and negative. And further the voltage pulses of (=V6+V7) and −V3+V2) or (=V3+V4) and (−V6+V5) are applied in the non-selecting term.

The present embodiment provides the driving method in which the positive or negative pulse more than the saturation voltage is applied at the begining of the selecting term to turn the picture element "ON" or "OFF" state. Further the "ON" or "OFF" state is selected by whether to switch the "ON" or "OFF" state by making the next applied pulse have the opposite polarity and more than the saturation voltage or to hold "OFF" state by making the next applied pulse have the opposite polarity and less than the threshold voltage. The difference of the amplitude between the positive pulse and the negative pulse in the flame in which the first selecting waveform is applied, becomes (V7-V8) or (V4+V5−V2−V8), that is −2 V however, since the difference of the amplitude between the positive pulse and the negative pulse in the flame in which the second selecting waveform is applied, becomes V2 or (V4+V5−V7), that is, +2 V, and therefore, the differences are offset each other. Namely, the average of the voltage pulse applied to the picture element at intervals of two flames becomes zero in the present embodiment, and accordingly, the deterioration of the liquid crystal element can be prevented. 494 of FIG. 49 shows the light transmitting state of the picture element 8111.

Embodiment 17

Figure 50:
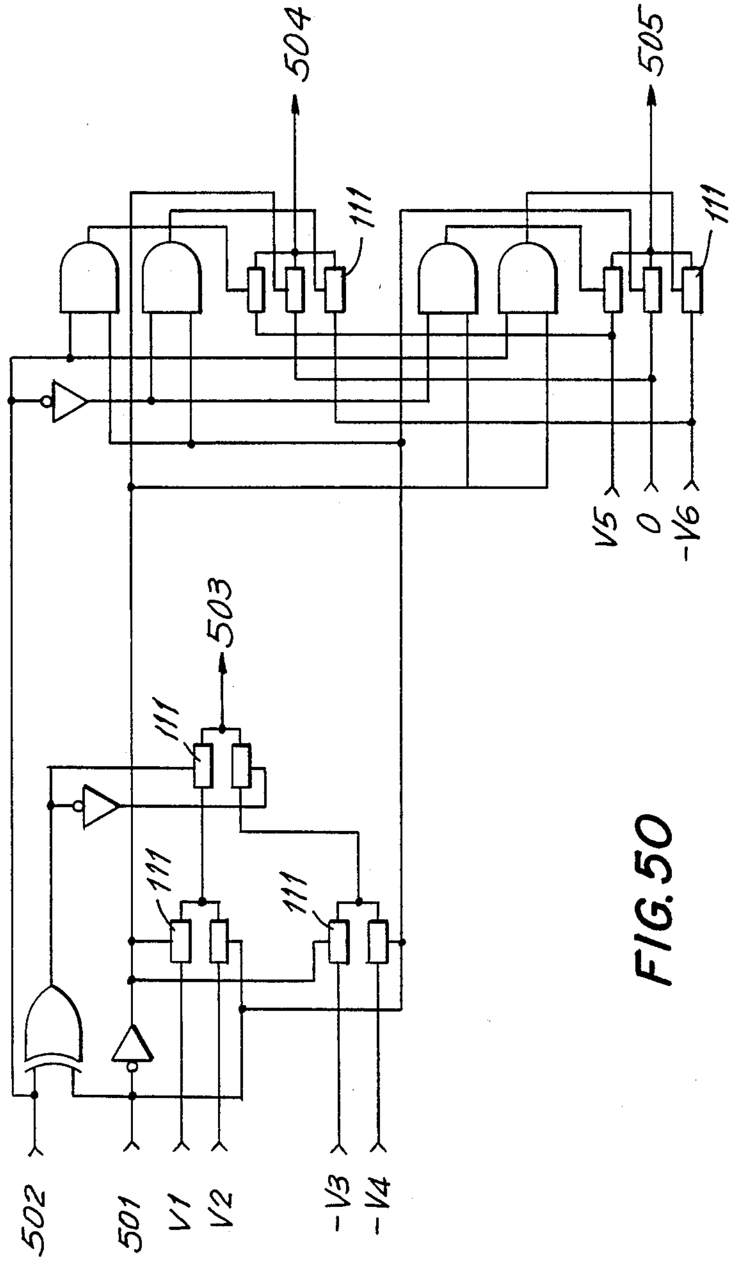
FIG. 50 shows an example of the practical circuit for realizing the driving waveform indicated in Embodiment 17 of the present invention.
Figure 51:
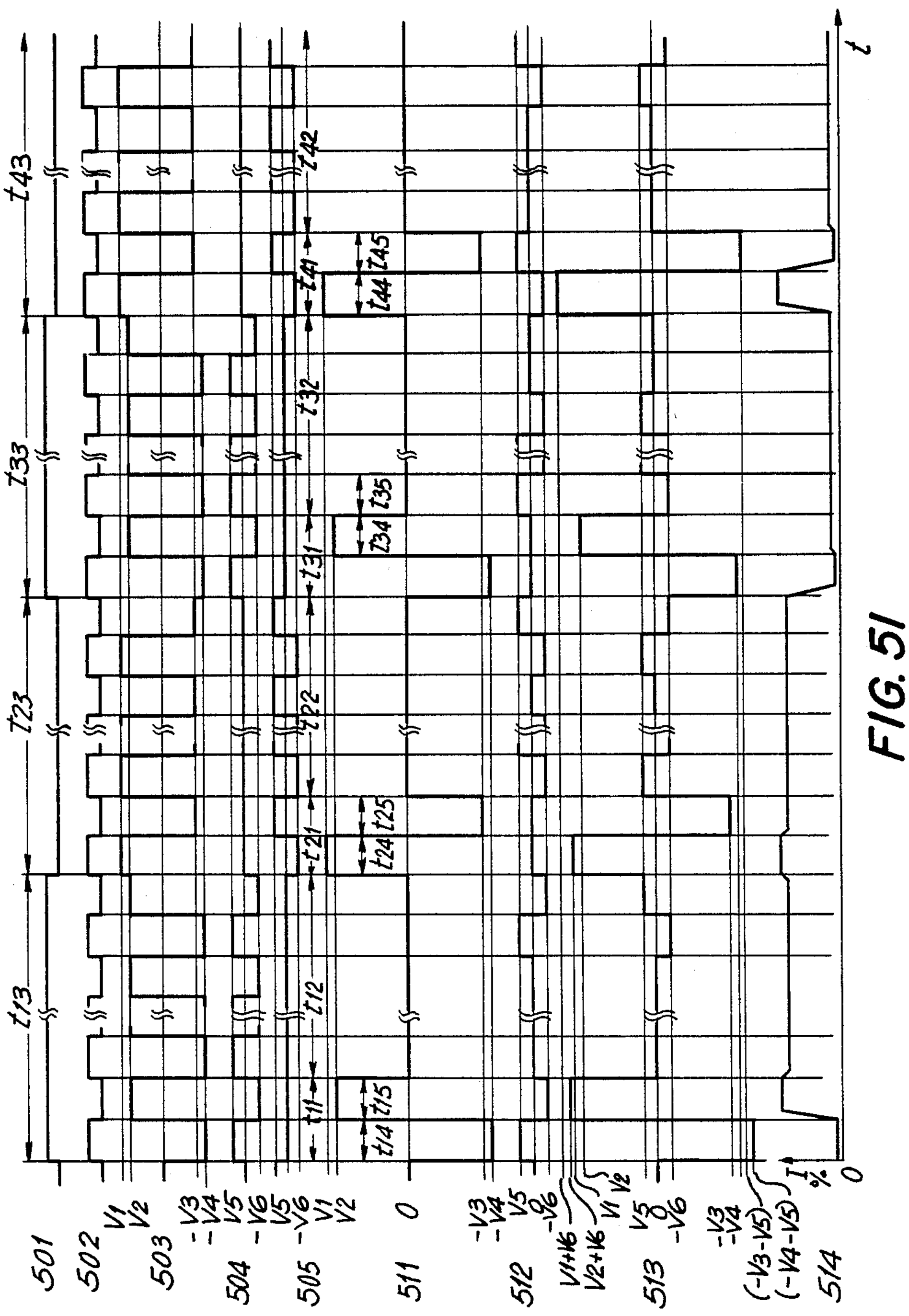
FIG. 51 shows the time charts for signal waveform at each point of the circuit illustrated in FIG. 50, and the relationship between the driving waveform and the light transmitting state.

FIG. 50 is a block diagram showing a practical circuit for realizing the driving waveform according to the present embodiment. FIG. 81 shows an example of a driving circuit for applying the driving waveform formed by the circuit as shown in FIG. 50 to the liquid crystal element. 501 is a flame signal, 502 is a signal for switching the polarity. The transmission gate 111 is switched by these signals 501 and 502, and the voltages of V1, V2, −V3, and −V4 are switched to form the selecting waveform 503 of the common electrode. Further, the voltages of V5, V6, and 0 V are switched to form the "ON" waveform 504 and the "OFF" waveform 505 of the segment electrode. FIG. 51 shows the time charts of these segment waveforms.

These signal waveforms are applied to the driving circuit as shown in FIG. 81 to form the driving waveform applied to the common electrode and the segment electrode. Namely, the selecting waveform 503 is applied to 8101 and 8102, 0 V is applied to 8103 as the non-selecting waveform, the "ON" waveform 504 is applied to 8105, and the "OFF" waveform 505 is applied to 8104, respectively.

In FIG. 81, 121 is a common electrode data. The common electrode data 121 is transmitted to the shift register 115 by the common electrode shift clock 120, then the transmission gate 111 is switched by outputting the selecting signal per one common electrode successively, and further, the common electrode driving waveform is applied to 8107. 117 is a segment electrode data. This segment elecgtrode data 117 is transmitted to the shift register 114 by the segment electrode shift clock 118. After the data enough for one common electrode is transmitted, the segment electrode data 117 is latched to the latch circuit 116 by the latch pulse 119. The transmission gate 111 is switched by the output of the latch circuit 116, then the "ON" waveform 504 and the "OFF" waveform 505 are switched, and further, the segment electrode driving waveform is applied to 8106.

FIG. 51 shows the driving waveform applied to the common electrode 8109 and the segment electrode 8110 as shown in FIG. 81 and the synthetic waveform applied to the picture element 8111 and the light transmitting state.

Each of t13, t23, t33, and t43 shows one flame period, each of t11, t21, t31, and t41 shows the selecting term, and each of t12, t22, t32, and t42 shows the non-selecting term, respectively. Each of t14, t15, t24, t25, t34, t35, t44, and t45 shows the pulse width, in the present embodiment, all of them are 200 μsec, respectively.

The amplitudes V1 and V4 are 8 V, V2 and V3 are 6 V, and V5 and V6 are 2 V.

The voltage pulses applied to the common electrode 8109 are as follows. Namely, for the selecting term t11(t21, t31, t41), as shown in 511 of FIG. 51, the voltage puses of −V4 and V2 are applied to the common electrode 8109 by turns as the first selcting waveform and the voltage pulses of V1 and −V3 are applied to the same by turns as the second waveform alternately at intervals of one flame, on the other hand, for the non-selecting term t12(t22, t32, t42), the voltage of 0 V is applied.

The voltage pulses applied to the segment electrode 8110 are as follows. Namely, for the period in which the first selecting waveform is applied, as shown in 512 of FIG. 51, the voltage pulses of V5 and −V6 are applied to the segment electrode 8110 in the order of positive and negative as the "ON" waveform, on the other hand, the voltage of 0 V is applied to the same as the "OFF" waveform. And for the period in which the second selecting waveform is applied, the voltage 0 V is applied as the "ON" waveform, and the voltage pulses of −V6 and V5 are applied to the same in the order of negative and positive as the "OFF" waveform.

At this time, the synthetic waveform applied to the picture element 111 is as follows. Namely, as shown in 513 of FIG. 51, for the period in which the first selecting waveform is applied to the common electrode, in case of "ON", the voltage pulses of (−V4−V5) and (V2+V6) are applied in the order of negative and positive, in case of "OFF", the voltage pulses of −V4 and V2 are applied in the order of negative and positive. And for the period in which the second selecting waveform, is applied to the commom electrode, in case of "ON", the voltage pulses of V1 and −V3 are applied in the order of positive and negative, on the other hand, in case of "OFF", the voltage pulses of (V1+V6) and (−V3−V5) are applied in the order of positive and negative.

And the voltage 0 V or the voltage pulses of V5 and −V6 are applied in the non-selecting term.

The present embodiment provides the driving method in which the positive or negative pulse more than the saturation voltage is applied at the begining of the selecting term to turn the picture element "ON" or "OFF" state. Further, the "ON" or "OFF" state is selected by whether to switch the "ON" or "OFF" state by making the next applied pulse have the opposite polarity and more than the saturation voltage or to hold "OFF" state by making the next applied pulse have the opposite polarity and less than the threthold voltage. The difference of the amplitude between the positive pulse and the negative pulse in the flame in which the first selecting waveform is applied, becomes (V2−V4), that is, −2 V, however, since the difference of the amplitude between the positive pulse and the negative pulse in the flame in which the second selecting waveform is applied, becomes (V1−V3), that is, +2 V, and therefore, the differences are offset each other. Namely, the average of the voltage pulse applied to the picture element at intervals of two flames becomes zero in the present embodiment, and accordingly, the deterioration of the liquid crystal element can be prevented. 514 of FIG. 51 shows the light transmitting state of the picture element 8111.

Embodiment 18

Figure 52:
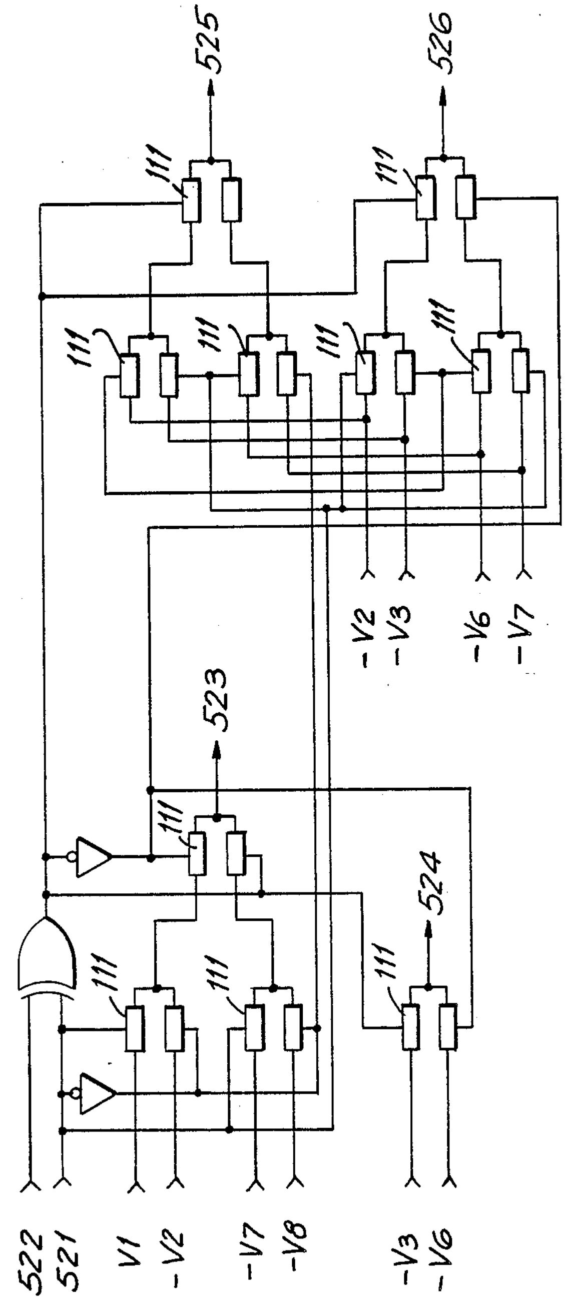
FIG. 52 shows an example of the practical circuit for realizing the driving waveform indicated in Embodiment 18 of the present invention.
Figure 53:
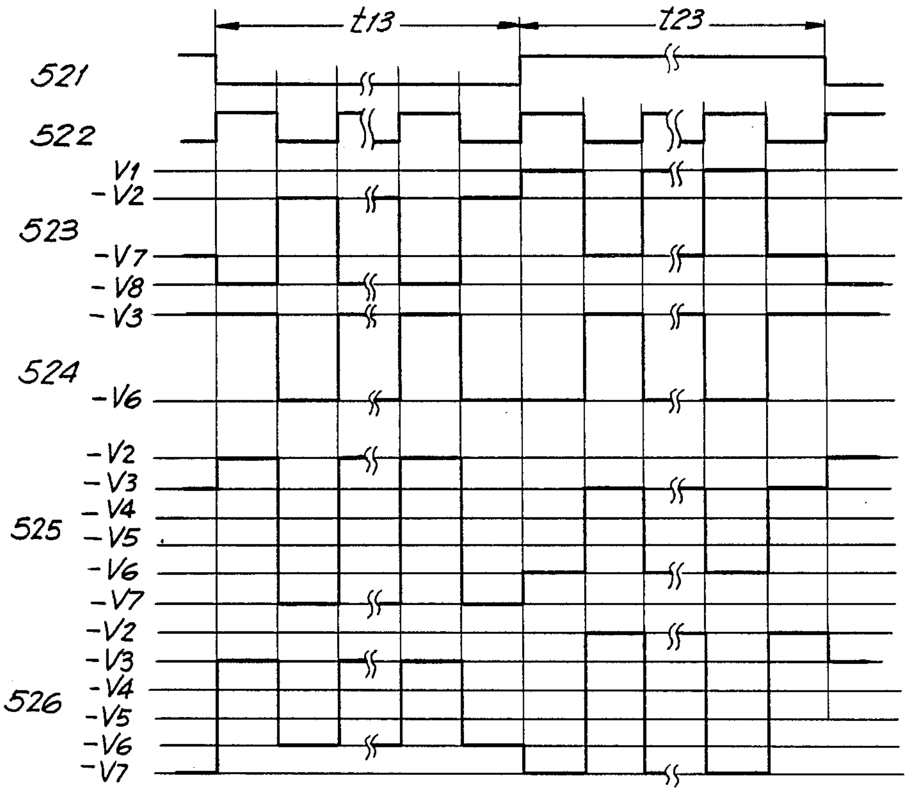
FIG. 53 shows the time charts for signal waveform at each point of the circuit illustrated in FIG. 52.

FIG. 52 is a block diagram showing a practical circuit for realizing the driving waveform according to the present embodiment. FIG. 81 shows an example of a driving circuit for applying the driving waveform formed by the circuit as shown in FIG. 52 to the liquid crystal element. 521 is a flame signal, 522 if a signal for switching the polarity. The transmission gate 111 is switched by these signals 521 and 522, then the voltages of V1, −V2, −V7, and −V8 are switched to form the selcting waveform 523 of the common electrode, and further, the voltages of −V3 and −V6 are switched to form the non-selecting waveform 524 of the common electrode. And the voltages of −V2, −V3, −V6, and −V7 are switched to form the "ON" waveform 525 and the "OFF" waveform 526 of the segment electrode. FIG. 53 shows the time charts of these signal waveforms.

These waveforms are applied to the driving circuit as shown in FIG. 81 to form the driving waveform applied to the comon electrode and the segment electrode. Namely, the selecting waveform 523 is applied to 8101 and 8102, the non-selecting waveform 524 is applied to 8103, the "ON" waveform 525 is applied to 8105, and the "OFF" waveform 526 is applied to 8104, respectively.

In FIG. 81, 121 is a common electrode data. This common electrode data 121 is transmitted to the common electrode shift register 115 by the common electrode shift clock 120, then the transmission gate 111 is switched by outputting the selecting signal per one common electrode succesively, and further, the common electrode driving waveform is applied to 8107. 117 is a segment electrode data. The segment electrode data 117 is transmitted to the shift register 114 by the segment electrode shift clock 118. After the data enough for one common electrode is transmitted, the segment electrode data 117 is latched to the latch circuit 116 by the latch pulse 119. The transmission gate 111 is switched by the output of the latch circuit 116, then the "ON" waveform 525 and the "OFF" waveform 526 are switched, and further the segment electrode driving waveform is applied to 8106.

Figure 54:
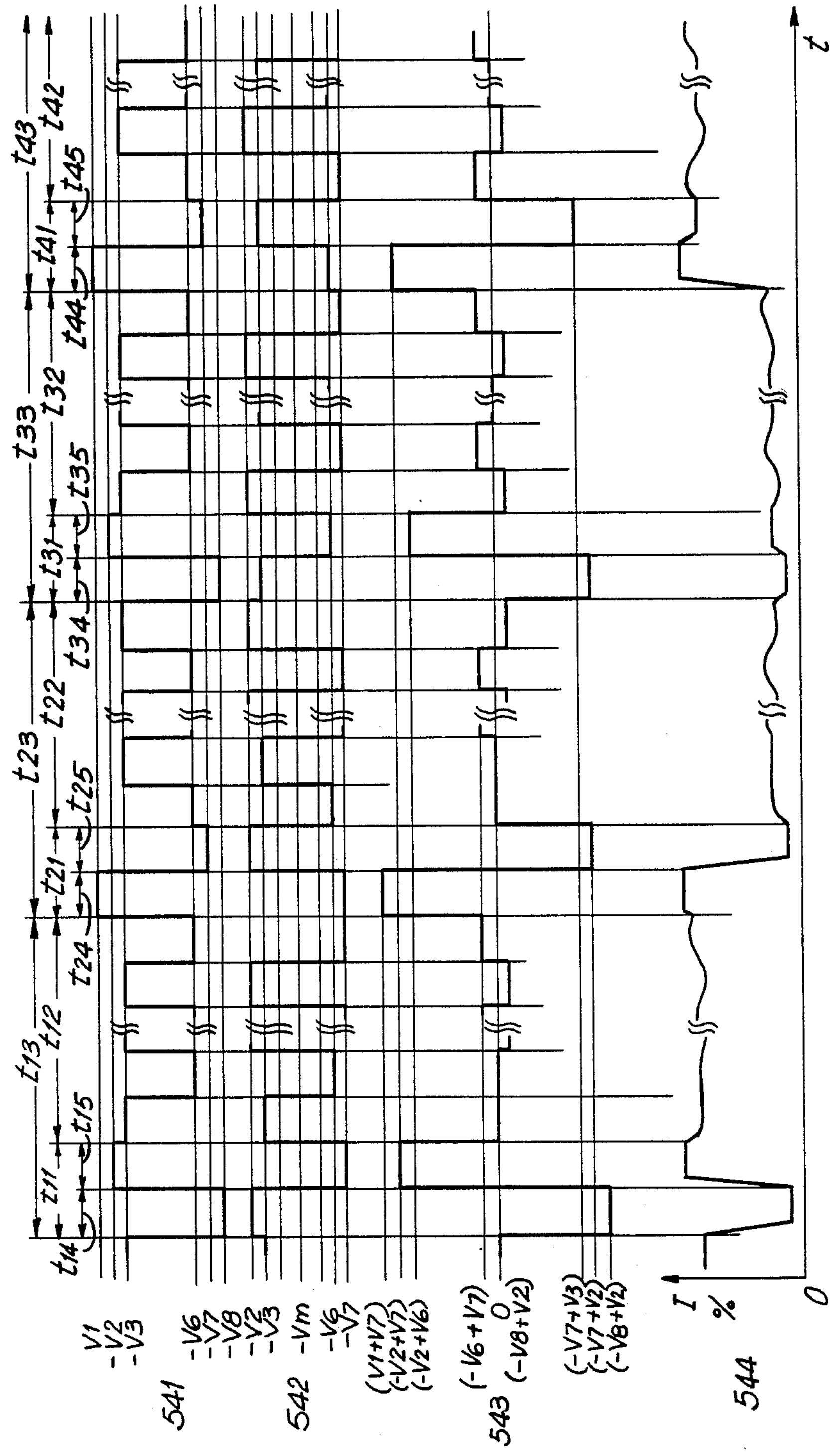
FIG. 54 shows the relationship between the driving waveform and the light transmitting state indicated in Embodiment 18 of the present invention.

FIG. 54 shows the waveform applied to the common electrode 8109 and the segment electrode 8110 is shown in FIG. 81 and the synthetic waveform applied to the picture element 8111 and the light transmitting state.

Each of t13, t23, t33, and t43 shows one flame period, each of t11, t21, t31, and t41 shows the selecting term, and each of t12, t22, t32, and t42 shows the non-selecting term, respectively. Each of t14, t15, t24, t25, t34, t35, t44, and 45 shows the pulse width, and in the present embodiment, all of them are 200 sec, respectively.

The amplitude V1 is 0 V, V2 is 2 V, V3 is 4 V, V6 is 8 V, V7 is 10 V, and V8 is 12 V. Vm is a intermediate voltage of the voltage pulse applied to the segment electrode, in this case, Vm is 6 V.

Embodiment 18 is different from Embodiment 17 in that the voltage level of the common electrode is equal to that of the segment electrode so as to reduce the voltage applied to the common electrode.

The voltage pulses applied to the common electrode 8109 are as follows. Namely, as shown in 541 of FIG. 54, for the selecting term t11(t21, t31, t41), the voltage pulses of −V8 and −V2 are applied to the common electrode 8109 by turns as the first selecting waveform and the voltage pulses of V1 and −V7 are applied to the same by turns as the second selecting waveform alternately at intervals of one flame. On the other hand, for the non-selecting term t12 (t22, t32, t42), the voltage pulses of −V3 and −V6 are applied by turns in the flame period in which the first selecting waveform is applied, and the voltage pulses of −V6 and −V3 are applied by turns in the flame period in which the second selecting waveform is applied.

The voltage pulses applied to the segment electrode 8110 are as follows. Namely, as shown in 542 of FIG. 54, for the period in which the first selecting waveform is applied, the voltage pulses of −V2 and −V7 are applied to the common electrode 8110 by turns as the "ON" waveform, and the voltage pulses of −V3 and −V6 are applied by turns as the "OFF" waveform. On the other hand, for the period in which the second selecting waveform is applied, the voltage pulses of −V6 and −V3 are applied by turns as the "ON" waveform and the voltage pulses of −V7 and −V2 are applied by turns as the "OFF" waveform.

At this time, the synthetic waveform applied to the picture element 8111 is as follows. Namely, as shown in 543 of FIG. 54, for the period in which the first selecting waveform is applied to the common electrode, in case of "ON", the voltage pulses of (−V8+V2) and (−V2+V7) are applied in the order of negative and positive to the picture element 8111, on the other hand, in case of "OFF", the voltage pulses of (−V7+V2) and (−V2+V6) are applied in the order of negative and positive. And for the period in which the second selecting waveform is applied to the common electrode, in case of "ON", the voltage pulses of (−V2+V7) and (−V7+V3) are applied in the order of positive and negative, on the other hand, in case of "OFF", the voltage pulses of (V1+V7) ad (−V7+V2) are applied in the order of positive and negative.

The voltage of 0 V or the voltage pulses of (−V6+V7) and (−V3+V2) are applied in the non-selecting term.

The present embodiment provides the driving method in which the positive or negative pulse more than the saturation voltage is applied at the begining of the selecting term to turn the picture element "ON" or "OFF" state. Further, the "ON" or "OFF" state is selected by whether to switch the "ON" and "OFF" state by making the next applied pulse have the opposite polarity and more than the saturation voltage or to hold "OFF" state by making the next applied pulse have the opposite polarity and less than the threthold voltage.

The difference of the amplitude between the positive pulse and the negative pulse in the flame in which the first selecting waveform is applied, becomes (V7−V8) or (V6−V7), that is, −2 V, however, since the difference of the amplitude between the positive pulse and the negative pulse in the flame in which the second selecting waveform is applied, becomes (V3-V2) or V2, that is, +2 V, and therefore, the differences are offset each other. Namely, the average of the voltage pulse applied to the picture element at intervals of two flames becomes zero in the present embodiment, and accordingly, the deterioration of the liquid crystal element can be prevented. 544 of FIG. 54 shows the light transmitting state of the picture element 8111.

Embodiment 19

Figure 55:
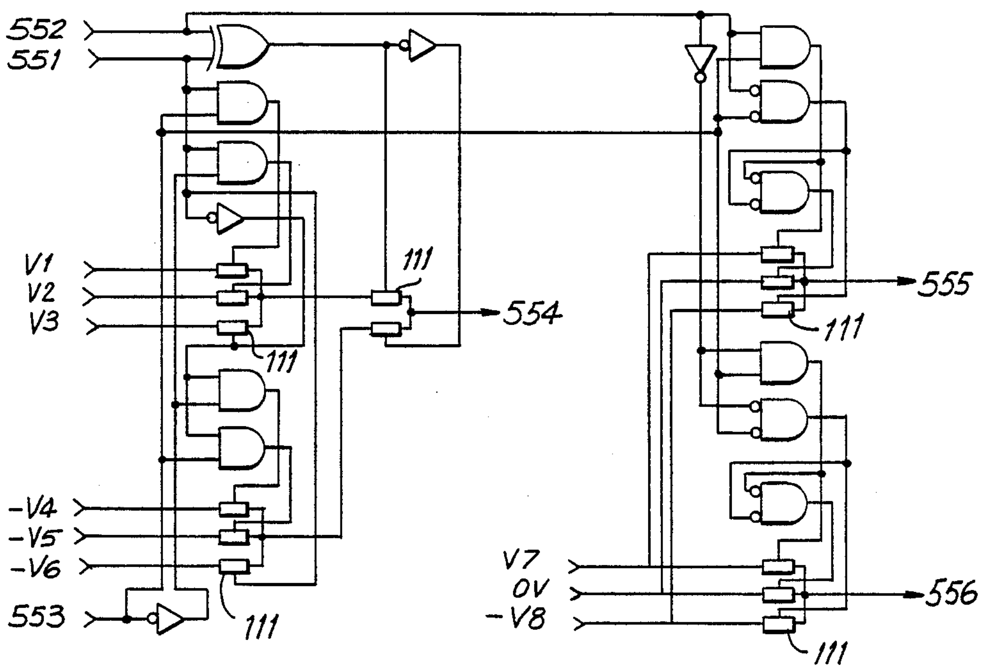
FIG. 55 shows an example of the practical circuit for realizing the driving waveform indicated in Embodiment 19 of the present invention.
Figure 56:
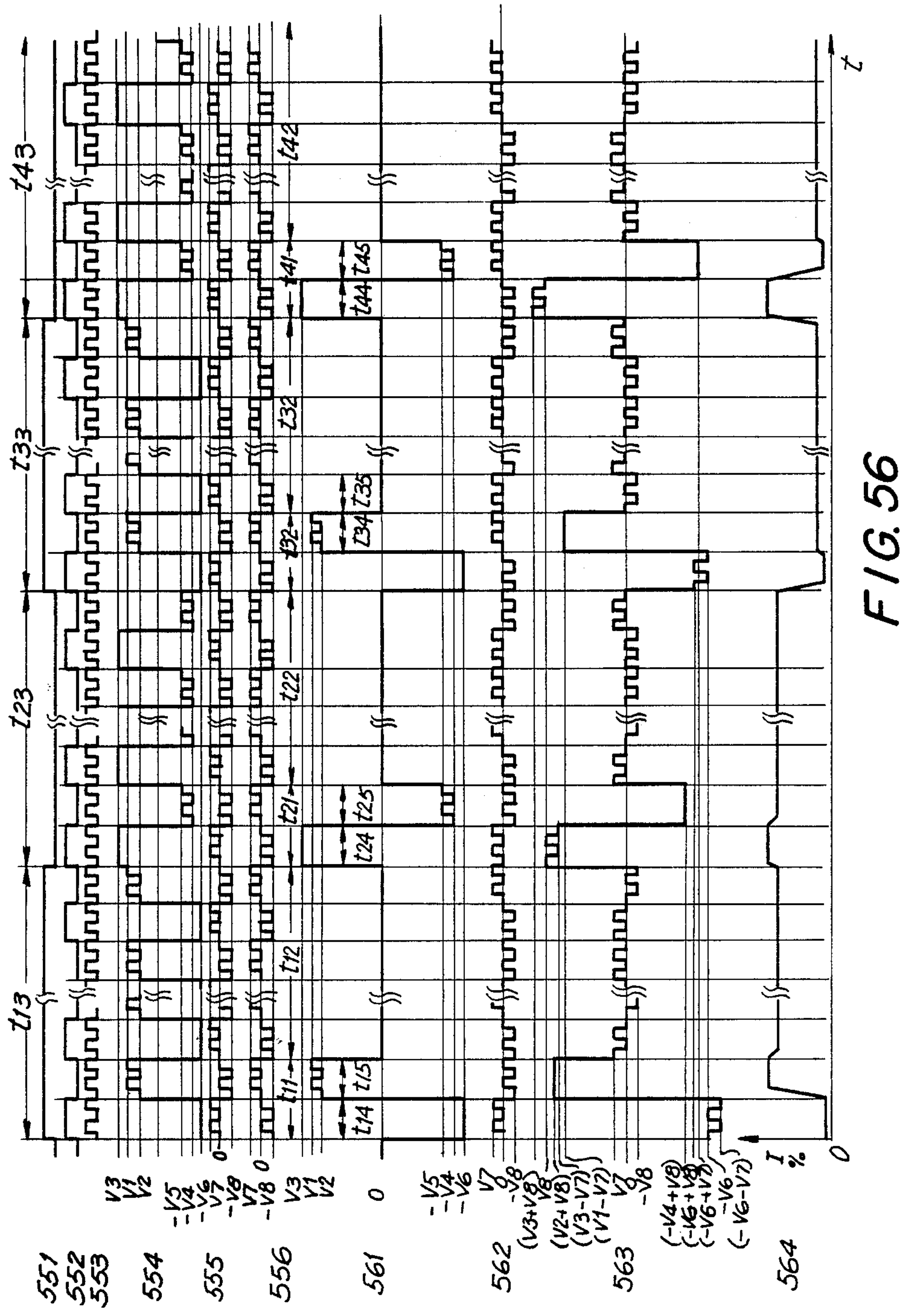
FIG. 56 shows the time charts for signal waveform at each point of the circuit illustrated in FIG. 50, and the relationship between the driving waveform and the light transmitting state.

FIG. 55 is a block diagram showing a practical circuit for realizing the driving waveform according to the present embodiment. FIG. 81 shows an example of the driving circuit for applying the driving waveform formed by the circuit as shown in FIG. 55 to the liquid crystal element. 551 is a flame signal, 552 is a signal for switching the polarity, and 553 is a signal for switching the pulse for writting. The transmission gate 111 is switched by these signals 551, 552, and 553, and the voltages of V1, V2, V3, −V4, −V5, and −V6 are switched to form the selecting waveform 554 of the common electrode. And the voltages of V7, −V8 and 0 V are switched to form the "ON" waveform 555 and the "OFF" waveform 556. FIG. 56 shows the time charts of these signal waveforms.

These waveforms are applied to the driving circuit as shown in FIG. 81 to form the driving waveform applied to the common electrode and the segment electrode. Namely, the selecting waveform 554 is applied to 8101 and 8102, the voltage of 0 V is applied to 8103 as the non-selecting waveform, the "ON" waveform 55 is applied to 8105, and the "OFF" waveform 556 is applied to 8104.

In FIG. 81, 121 is a common electrode data. This common electrode data 121 is transmitted to the shift register 115 by the common electrode shift clock 120, then the transmission gate 111 is switched by outputting the selecting signal per one common electrode succesively, and further, the common electrode driving waveform is applied to 8107. 117 is a segment electrode data. This segment electrode data 117 is transmitted to the shift register 114 by the segment electrode shift clock 118. After the data enough for one common electrode is transmitted, the segment electrode data 117 is latched to the latch circuit 116 by the latch pulse 119. The transmission gate 111 is switched by the output of the latch circuit 116, then the "ON" waveform 555 and the "OFF" waveform 556 are switched, and further, the segment electrode driving waveform is applied to 8106.

FIG. 56 shows the waveform applied to the common electrode 8109 and the segment electrode 8110 as shown in FIG. 81 and the synthetic waveform applied to the picture element 8111 and the light transmitting state.

Each of t13, t23, t33, and t43 shows one flame period, each of t11, t21, t31, and t41 shows the selecting term, and each of t12, t22, t32, and t42 shows the non-selecting term, respectively. And each of t14, t15, t24, t25, t34, t35, t44, and t45 shows the pulse width, in this case, all of them are 200 μsec. respectively. The pulse width of the switching signal for writing pulse (hereinafter referred to as t/4) is ¼ of said pulse width, that is, 50 μsec.

The amplitudes V1 and V4 are 9 V, V2 and V5 are 6 V, V3 and V6 are 11 V, and V7 and V8 are 3 V.

In the present embodiment, the switching signal for writing pulse is superimposed on the driving waveform, then the pulse width of the pulse applied to the picture element in the non-selecting term is reduced, and therefore, the effect on the light transmitting state can be prevented as little as possible.

The voltage pulses applied to the common electrode 8109 are as follows. Namely, as shown in 561 of FIG. 56, for the selecting term t11(t21, t31, t41), the voltage pulses which is formed by that the switching signal for writing pulse is superimposed on the voltage pulses −V6 and V2, are applied to the common electrode 8109 in the order of negative and positive as the first selecting waveform and the voltage pulses which is formed by that the switching signal for writing pulse is superimposed on the voltage pulses V1 and −V5, are applied to the same in the order of positive and negative as the second selecting waveform alternately at intervals of one flame. On the other hand, for the non-selecting term t12(t22, t32, t42), the voltage of 0 V is applied.

The voltage pulses applied to the common electrode 8110 are as follows. Namely, as shown in 562 of FIG. 56, the voltage of 0 V and V7 having the pulse width of t/4 are applied alternately two at a time as the "ON" waveform, then the voltage pulses of −V8 and 0 V having the pulse width of t/4 are applied alternately two at a time. On the other hand, as the "OFF" waveform, the pulses of reverse phase with respect to the "ON" waveform are applied.

At this time, the synthetic waveform applied to the picutre element 8111 is as follows. Namely, as shown in 563 of FIG. 56, for the period in which the first selecting waveform is applied to the common electrode, in case of "ON", the pulse which is formed by that the voltage pulse of −V7 is superimposed on the voltage pulse of −V6 partly and the voltage pulse (V2+V8)=V1 are applied, in case of "OFF", the pulse which is formed by that the voltage pulse of V8 is superimposed on the voltage pulse of −V6 partly and the voltage pulse (V2+V8)=V1 are applied. On the other hand, for the period in which the second selecting waveform is applied to the common electrode, in case of "ON", the pulse which is formed by that the voltage pulse of −V7 is superimposed on the voltage pulse of V3 partly and the voltage pulse (−V4+V8)=−V5 are applied, in case of "OFF", the pulse which is formed by that the voltage pulse of V6 is superimposed on the voltage pulse of V3 and the voltage pulse of (−V5−V7)=−V4 are applied.

The voltage of 0 V or the voltage pulses of V7 and −V8 having the pulse width of t/4 are applied in the non-selecting term.

In the present embodiment, since the pulses which is formed by that the voltage pulses of ±V7 or ±V8 is superimposed on the voltage pulses of V3 or −V6 partly and which is applied at the beginning of the selecting term are all more than the saturation voltage, the picture element once turns "ON" or "OFF" state, then the "ON" or "OFF" state is selected by whether to switch the "ON" or "OFF" state or to hold "OFF" state whether the next applied pulse having the opposite polarity is more than the saturation voltage or less than the threthhold voltage.

The difference of the amplitude between the positive pulse and the negative pulse in the flame in which the first selecting waveform is applied, becomes (V6+V7/2−V1)=(V6−V8/2−V2), that is, −3.5 V, however, since the difference of the amplitude between the positive pulse and the negative pulse in the flame in which the second selecting waveform is applied, bcomes (V3−V7/2−V5)=(V3+V8/2−V4)=+3.5 V, and therefore, the differences are offset each other. Namely, the average of the voltage pulse applied to the picture element at intervals of two flames becomes also zero in the present embodiment, and accordingly, the deterioration of the liquid crystal element can be prevented. 564 of FIG. 56 shows the light transmitting state of the picture element 8111.

In the present embodiment, the pulse width of the pulse which is superimposed on the driving waveform is determined t/4, however, it is not necessary to limit this, it has only to increase the number of the superimposed pulse by reducing the pulse width.

Embodiment 20

Figure 57:
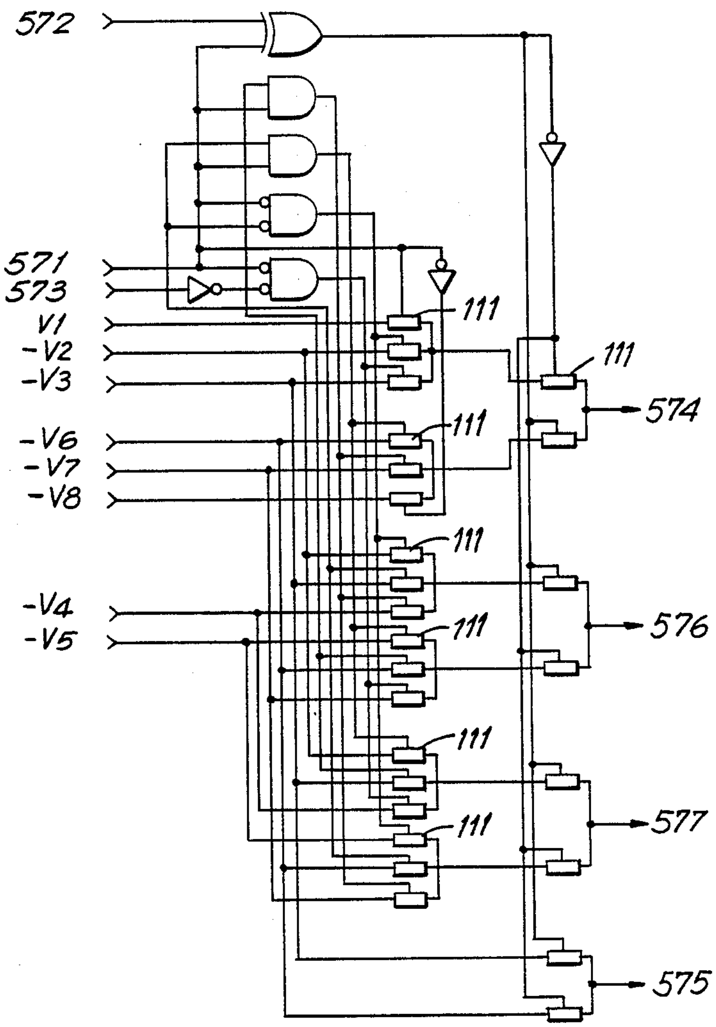
FIG. 57 shows an example of the practical circuit for realizing the driving waveform indicated in Embodiment 20 of the present invention.
Figure 58:
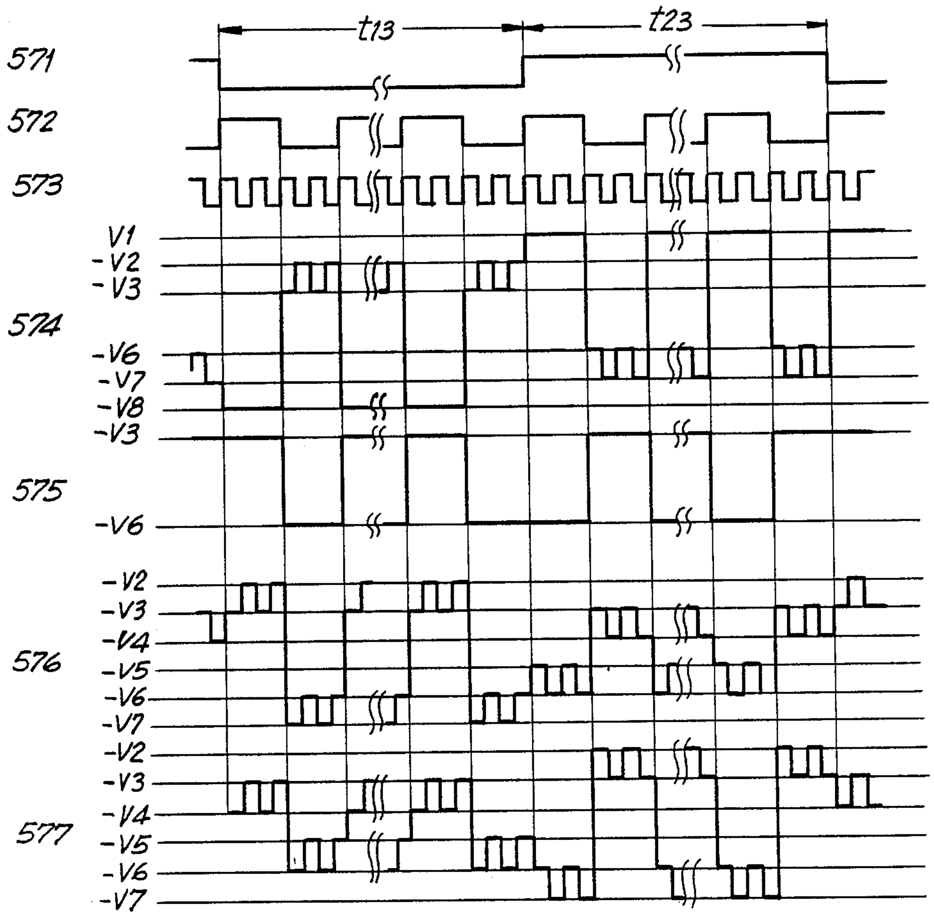
FIG. 58 shows the time charts for signal waveform at each point of the circuit illustrated in FIG. 57.

FIG. 57 is a block diagram showing a practical circuit for realizing the driving waveform according to the present embodiment. FIG. 81 shows an example of a driving circuit for applying the driving waveform formed by the circuit as shown in FIG. 57 to the liquid crystal element. 571 is a flame signal, 572 is a signal for switching the polarity, 573 is a switching signal for writing pulse. The transmission gate 111 is switched by these signal 571, 572, and 573, then the voltage of V1, −V2, −V3, −V6, −V7, and −V8 are switched to form the selecting waveform 574 of the common electrode, and further, the voltages of −V3 and −V6 are switched to form the non-selecting waveform 575 of the common electrode. And the voltages of −V2, −V3, −V4, −V5, −V6, and −V7 are switched to form the "ON" waveform 576 and the "OFF" waveform 577 of the segment electrode. FIG. 58 shows the time charts of these signal waveform.

These waveforms are applied to the driving circuit as shown in FIG. 81 to form the driving waveform applied to the common electrode and the segment electrode. Namely, the selecting waveform 574 is applied to 8101 and 8102, the non-selecting waveform 575 is applied to 8103, the "ON" waveform 576 is applied to 8105, and the "OFF" waveform is applied to 8104, respectively.

In FIG. 81, 121 is a common electrode data. This common electrode data 121 is transmitted to the common electrode shift register 115 by the common electrode shift clock 120, then the transmission gate 111 is switched by outputting the selecting signal per one common electrode successively, and further, the common electrode driving waveform is applied to 8107. 117 is a segment electrode data. This segment electrode data 117 is transmitted to the shift register 114 by the segment electrode shift clock 118. After the data enough for one common electrode is transmitted, the segment electrode data 117 is latched to the latch circuit 116 by the latch pulse 119. The transmission gate 111 is switched by the output of the latch circuit 116, then the "ON" waveform 576 and the "OFF" waveform 577 are switched, and further, the segment electrode driving waveform is applied to 8106.

Figure 59:
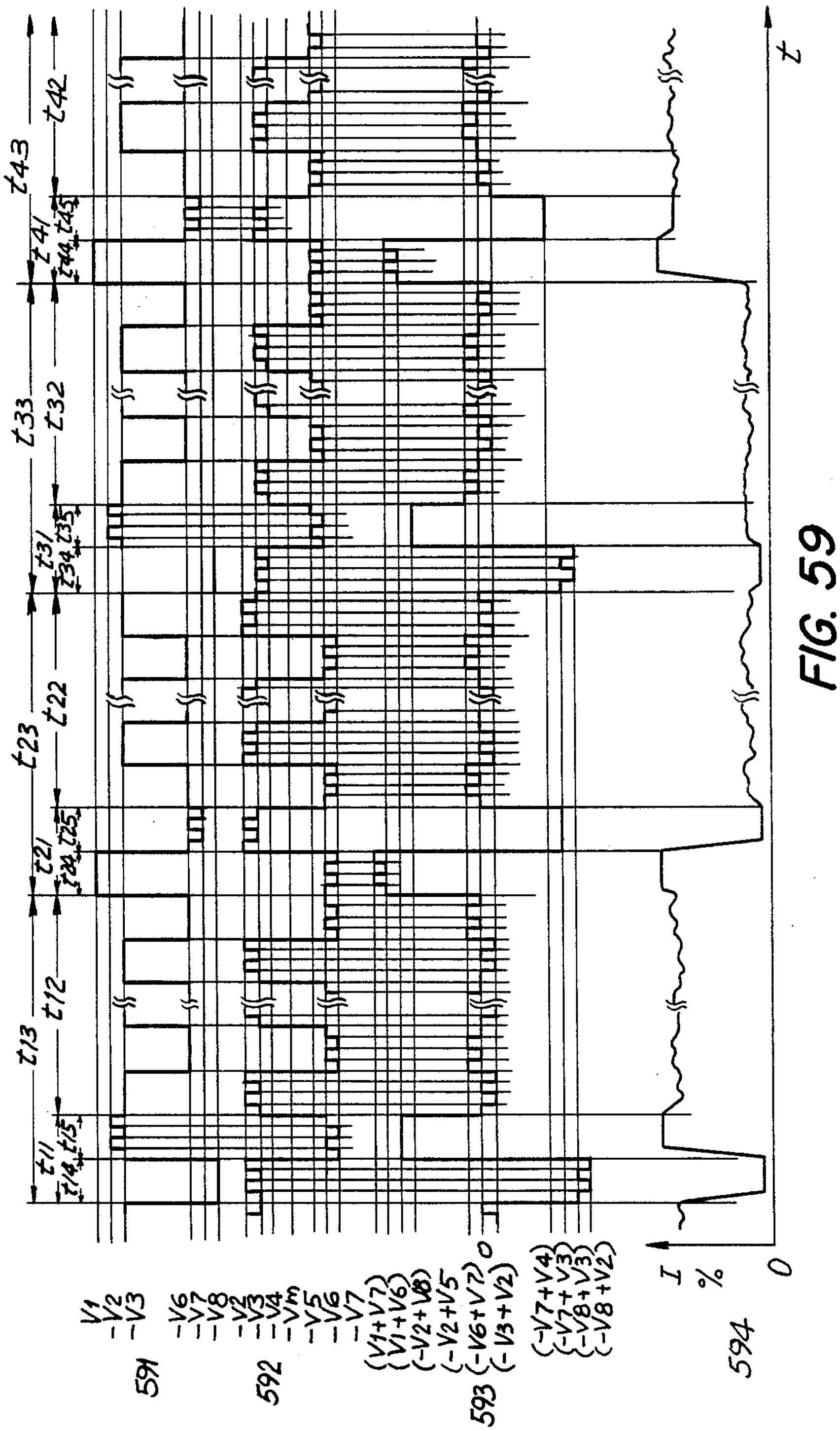
FIG. 59 shows the relationship between the driving waveform and the light transmitting state indicated in Embodiment 20 of the present invention.

FIG. 59 shows the waveform applied to the common electrode 8109 and the segment electrode 8110 as shown in FIG. 81 and the synthetic waveform applied to the picture element 8111 and the light transmitting state.

Each of t13, t23, t33, and t43 shows one flame period, each of t11, t21, t31, and t41 shows the selecting term, and each of t12, t22, t32, and t42 shows the non-selecting term. And each of t14, t15, t24, t25, t34, t35, t44, and t45 shows the pulse width, and in the present embodiment, all of them are 200 μsec, respectively. The pulse width of the switching signal for writing pulse (hereinafter referred to as t/4) is $\frac{1}{4}$ of said pulse width, that is, 50 μsec.

The amplitude of V1 is 0 V, V2 is 2 V, V3 is 4 V, V4 is 6 V, V5 is 8 V, V6 is 10 V, V7 is 12 V, and V8 is 12 V. Vm is a intermediate voltage of the voltage pulse which is applied to the segment electrode, in this case, Vm is 7 V.

Embodiment 20 is different from Embodiment 19 in that the voltage level of the common electrode is equal to that of the segment electrode so as to reduce the voltage applied to the common electrode, and the on-off waveform is varied according to the selecting waveform.

The voltage pulses applied to the common electrode 8109 are as follows. Namely, as shown in 591 of FIG. 59, for the selecting term t11(t21, t31, t41), the pulse which is formed by that the switching signal for writing pulse is superimposed on the voltage pulses of —V8 and −V3, is applied to the common electrode 8109 by turns as the first selecting waveform and the pulse which is formed by that the switching signal for writing pulse is superimposed on the voltage pules of V1 and −V7 is applied to the same by turns as the second selecting waveform alternately at intervals of one flame. On the other hand, for the non-selecting term t12(t22, t32, t42), the voltage pulse of −V3 and −V6 are applied in the order of —V3 and −V6 or in the order of −V6 and −V3.

The voltage pulses applied to the segment electrode 8110 are as follows. Namely, as shown in 592 of FIG. 59, for the period in which the first selecting waveform is applied, the voltage pulses of −V3 and −V4 having the pulse width of t/4 are applied alternately two at a time, then the voltage pulses of −V7 and −V6 having the pulse width of t/4 are applied alternately two at a time as the "ON" waveform, and the voltage pulses of −V3 and −V4 having the pulse width of t/4 are applied alternately two at a time, then the voltage pulses of −V6 and −V5 having the pulses width of t/4 are applied alternately two at a time as the "OFF" waveform. On the other hand, for the period in which the second selecting waveform is applied, the pulses having the opposite pulse comparing aforementioned "OFF" waveform are applied as the "ON" waveform, and the pulses having the opposite pulse comparing aforementioned "ON" waveform are applied as the "OFF" waveform.

At this time, the synthetic waveform applied to the picture element 8111 is as follows. Namely, as shown in 593 of FIG. 59, for the period in which the first selecting waveform is applied to the common electrode, in case of "ON", the voltage pulse which is formed by that the voltage pulse (V2–V3) is superimposed on the voltage pulse (−V8+V3) partly and the voltage pulse of (−V3+V7)=(−V2+V6) are applied to the picture element 8111, on the other hand, in case of "OFF", the voltage pulse which is formed by that the voltage pulse (V3–V4) is superimposed on the voltage pulse of (−V8+V4) partly and the voltage pulse of (−V3+V6)=(−V2+V5) are applied. And for the period in which the second selecting waveform is applied to the common electrode, in case of "ON", the pulse which is formed by that the voltage pulse (V5–V6) is superimposed on the voltage pulse of (V1+V6) partly and the voltage pulse of (−V6+V3)=(−V7+V4) are applied, on the other hand, in case of "OFF", the voltage pulse which is formed by that the voltage pulse of (V6–V7) is superimposed on the voltage pulse (V1+V7) partly and the voltage pulse (−V6+V2)=(−V7+V3) are applied.

The voltage of 0 V and the voltage pulses of (−V6+V7) and (−V3+V2) having the pulse width of t/4 are applied in the non-selecting term.

The synthetic waveform applied to the picture element according to the present embodiment is basically equal to that in Embodiment 19. The difference of the amplitude between the positive pulse and the negative pulse in the flame in which the first selecting waveform is applied, becomes (V8−V2/2−V3/2−V6+V2)=(V8−V3/2−V4/2−-V5+V2), that is, −3 V, however, since the difference of the amplitude between the positive pulse and the negative pulse in the flame in which the second selecting waveform is applied, becomes (V6/2+V7/2+V3−V7)=(V5/2+V6/2+V4−V7), that is, +3 V, and therefore, the differences are offset each other. The average of the voltage pulse applied to the picture element at intervals of two flames becomes zero. 594 of FIG. 59 shows the light transmitting state of the picture element 8111.

Embodiment 21

Figure 82A:
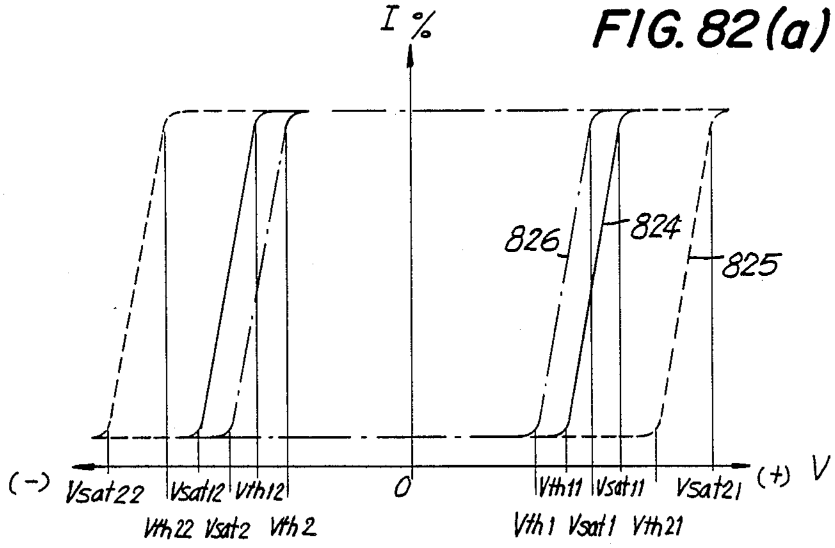
FIG. 82 shows the variation of the light transmitting state in accordance with the waveform of the applied voltage.
Figure 82B:
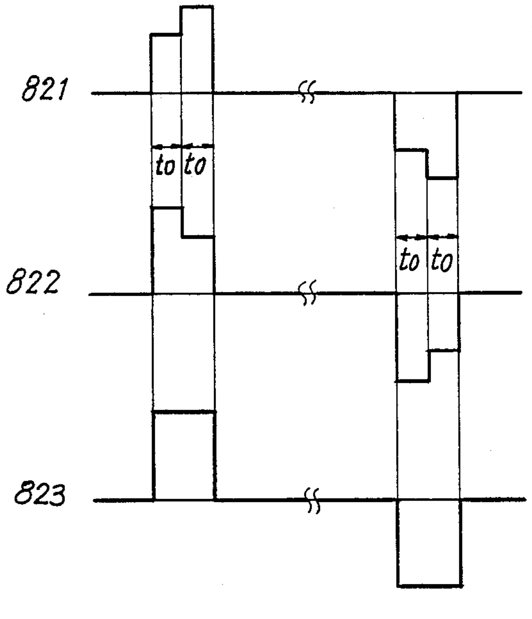

FIG. 82(*a*) and (*b*) show the relationship between the waveform of the applied voltage pulse and the light transmitting state. It is already indicated that the threthhold voltage and the saturation voltage of the ferroelectric liquid crystal varies according to the pulse width. However, the present inventors found that the threshold voltage and the saturation voltage of the ferroelectric liquid crystal varies also according to the applied pulse. Namely, when the pulse having the waveform as shown in 821 of FIG. 82(*b*) is applied, as shown in 824 of FIG. 82(*a*) with a solid line, the positive and the negative threshold voltages become Vth11 and Vth12, and the saturation voltages become Vsat11 and Vsat12. When the pulse having the waveform as shown in 822 of FIG. 82(*b*) is applied, as shown in 825 of FIG. 82(*a*) with a dotted line, the positive and the negative threshold voltage become Vth21 and Vth22 and the saturation voltages become Vsat21 and Vsat22, this absolute values are lager than that in 821. And when the pulse having the waveform as shown in 823 is applied, as shown in 826 with a solid-dotted line, the positive and the negative threshold voltages become Vth1 and Vth2 and the saturation voltages become Vsat1 and Vsat2, this absolute values are smaller than that in 821.

Especially, since $Vth21 > Vsat11$ and $|Vth22| > |Vsat21|$, although the voltage level becomes more than the saturation voltage when the pulse having the waveform according to 821 is applied, the voltage level becomes less than the threshold voltage when the pulse having the waveform according to 822, thus the liquid crystal element does not respond. Therefore, there would be possible to control the response and the non-response by same voltage level. The present embodiment provides the driving waveform in which these threthhold property of the ferroelectric liquid crystal is used.

Figure 60:
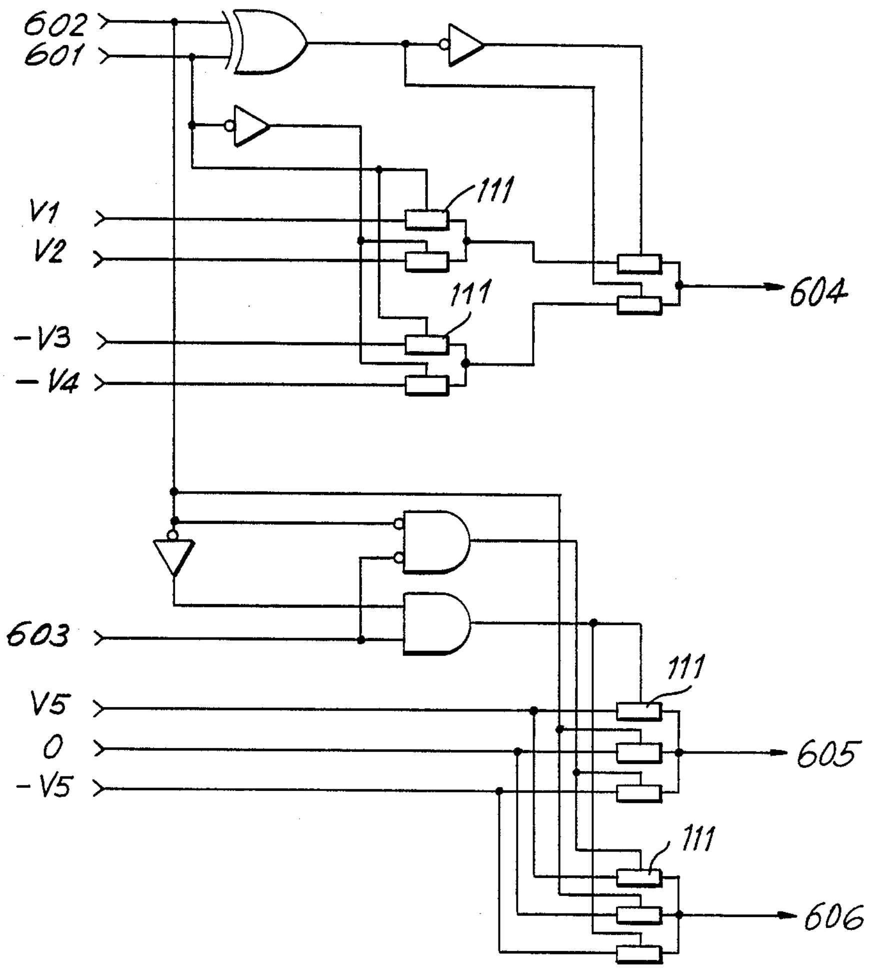
FIG. 60 shows an example of the practical circuit for realizing the driving waveform indicated in Embodiment 21 of the present invention.
Figure 61:
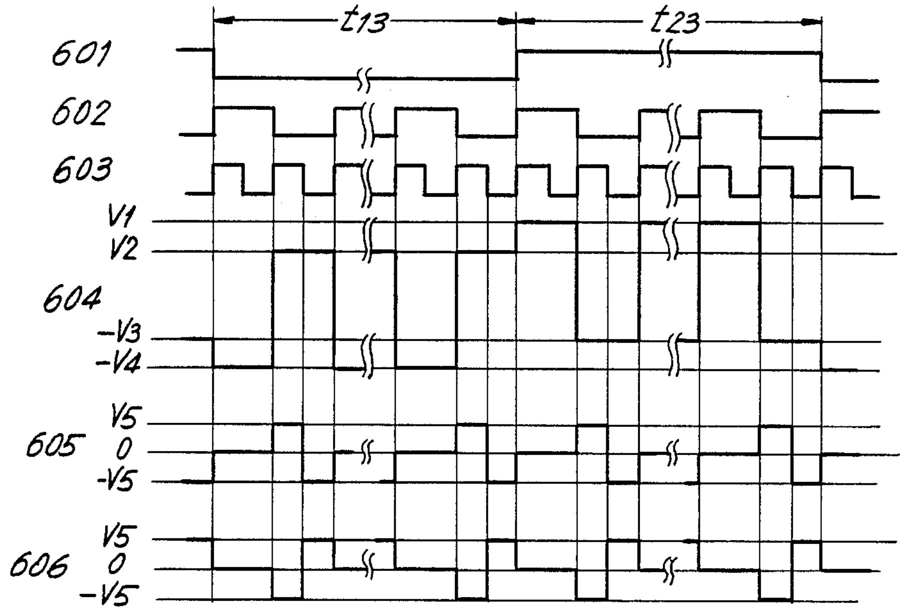
FIG. 61 shows the time charts for signal waveform at each point of the circuit illustrated in FIG. 60.

FIG. 60 is a block diagram showing a practical circuit for realizing the driving waveform according to the present embodiment. FIG. 81 shows an example of a driving circuit for applying the driving waveform formed by the circuit as shown in FIG. 60 to the liquid crystal element. 601 is a flame signal, 602 is a signal for switching the polarity. The transmission gate 111 is switched by these signals 601 and 602, then the voltage of V1, V2, −V3, and −V4 are switched to form the selecting waveform 604 of the common electrode. The voltage pulses of 0 V, V5 and −V5 are swtiched by the signal for switching the polarity 602 and the clock pulse 603 to form the "ON" waveform 605 and the "OFF" waveform 606 of the common electrode. FIG. 61 shows the time charts of these signal waveforms.

These signal waveforms are applied to the driving circuit as shown in FIG. 81 to form the driving waveform applied to the common electrode and the segment electrode. Namely, the selecting waveform 604 is applied to 8101 and 8102, the voltage of 0 V is applied to 8103 as the non-selecting waveform, the "ON" waveform 605 is applied to 8105, and the "OFF" waveform 606 is applied to 8104, respectively.

In FIG. 81, 121 is a common electrode data. This common electrode data 121 is transmitted to the common electrode shift register 115 by the common electrode shift clock 120, then the transmission gate 111 is switched by outputting the selecting signal per one common electrode successively, and further, the common electrode driving waveform is applied to 8107. 117 is a segment electrode data. This segment electrode data 117 is transmitted to the shift register 114 by the segment electrode shift clock 118. After the data enough for one common electrode is transmitted, the segment electrode data 117 is latched to the latch circuit 116 by the latch pulse 119. The transmission gate 111 is switched by the output of the latch circuit, then the "ON" waveform 605 and the "OFF" waveform 606 are switched, and further, the segment electrode driving waveform is applied to 8106.

Figure 62:
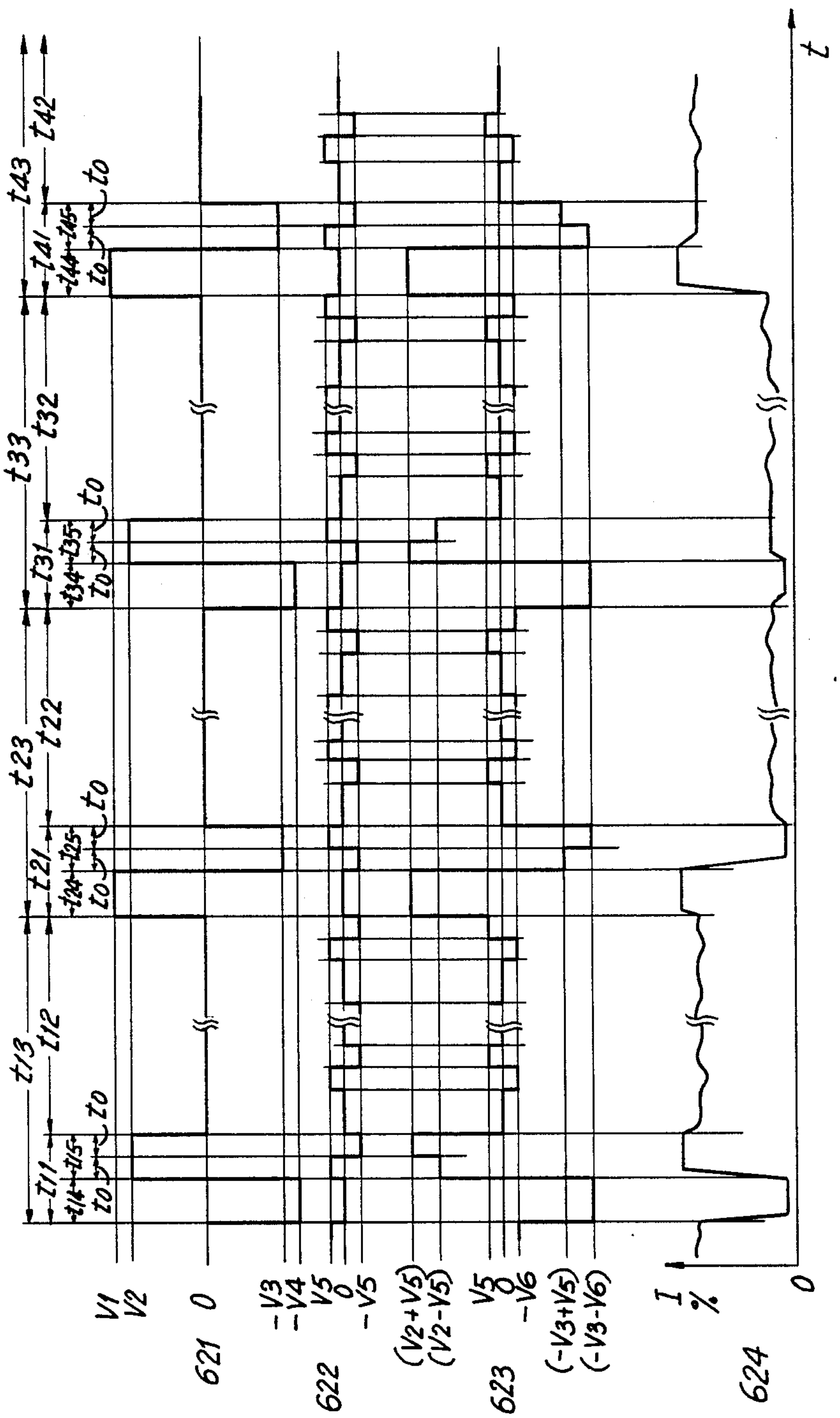
FIG. 62 shows the relationship between the driving waveform and the light transmitting state indicated in Embodiment 21 of the present invention.

FIG. 62 shows the waveforms applied to the common electrode 8109 and the segment electrode 8110 a shown in FIG. 81 and the synthetic waveform applied to the picture element 8111 and the light transmitting state.

Each of t12, t23, t33, and t43 shows one flame period, each of t11, t21, t31, and t41 shows the selecting term, and each of t12, t22, t32, and t42 shows the non-selecting term, respectively. Each of t14, t24, t34, and t44 shows the pulse width of the pulse which is applied during the first period of the selecting term, and each of t15, t25, t35, and t45 shows the pulse width of the pulse which is applied during the latter half of the selecting term. According to the present embodiment, all of them are same pulse width, further t0 shows the pulse width of ½ of said t15(t25, t35, t45).

The amplitudes V1 to V5 are determined so as to satisfy the following conditions:

$$V1 = V4 > Vsat1, |Vsat2|$$

$$V5 < Vth1, |Vth2|$$

$$V1 = (V2 + V5) = (V3 + V5)$$

$$Vths1 > (V2 + V5) > Vsat11$$

$$|Vth22| > (V3 + V5) > |Vsat12|$$

The voltage pulses applied to the common electrode 8109 are as follows. Namely, as shown in 621 of FIG. 26, for the selecting term, the voltage pulses of −V4 and V2 are applied by turns to the common electrode 8109 as the first selecting waveform and the voltage pulses of V1 and −V3 are applied to the same by turns as the second selecting waveform alternately at intervals of one flame. On the other hand, the voltage of 0 V is applied for the non-selecting term.

The voltage pulses applied to the segment electrode 8110 are as follows. Namely, as shown in 622 in FIG. 62, after the voltage of 0 V is applied during the term 2t0, the voltage pulses of V5 and −V5 having the pulse width of t0 are applied by turns so that the picture element is turned "ON". On the other hand, after the voltage of 0 V is applied during the term 2t0, the voltage pulses of −V5 and V5 having the pulse width of t0 are applied by turns so that the picture element is turned "OFF".

At this time, the synthetic waveform applied to the picture element 8111 is as follows. Namely, as shown in 623 of FIG. 62, for the period in which the first selecting waveform is applied to the common electrode, in case of "ON", after the voltage pulse of −V4 is applied, the pulse having the amplitudes that the same in the first half period t0 is (V2−V5) and the same in the latter half period t0 is (V2+V5) is applied. And in case of "OFF", after the voltage pulse of −V4 is applied, the pulse having the amplitudes that the same in the first half period t0 is (V2+V5) and the same in the latter half period t0 is (V2−V5) is applied. On the other hand, for the period in which the second selecting waveform is applied to the common electrode, in case of "ON", after the voltage pulse V1 is applied, the pulse having the amplitudes that the same in the first half period t0 is (−V3−V5) and the same in the latter half period t0 is (−V3+V5) is applied. And in case of "OFF", after the voltage pulse of V1 is applied, the voltage pulse having the amplitudes that the same in the first half period t0 is (−V3+V5) and the same in the latter half period t0 is (−V3−V5) is applied. The voltage of 0 V and the voltage pulses of ±V5 having the pulse width of t0 are applied during the non-selecting term.

In the present embodiment, as shown in FIGS. 82(*a*) and (*b*), the voltage pulse applied in the latter half period of the selecting term t11 and t12 is more than the saturation voltage, however, since the waveform shape of the pulse applied in the latter half period of the selecting term t31 and t41 is different from that in the selecting term t11 and t12 with regardless of the same amplitude, thus it becomes less than the threshold voltage. As a result of that, the present embodiment provides the driving method in which the positive and negative pulse more than the saturation voltage are applied at the beginning of the selecting term to turn the picture element "ON" or "OFF" state. Further, the "ON" or "OFF"

state is selected by whether to switch or to hold the "ON" or "OFF" state by the opposite pulse which is applied next.

The difference of the amplitude between the positive pulse and the negative pulse in the flame period in which the first selecting waveform is applied, becomes $(V2+V5)/2+(V2-V5)/2-V4=V2-V4$, on the other hand, the difference of the amplitude between positive pulse and the negative pulse in the flame in which the second selecting waveform is applied, becomes $(-V3-V5)/2+(-V3+V5)/2+V1=V1-V3$. Namely, since $V1=V4$, $V2=V3$, the difference are offset each other. Accordingly, the average of the voltage pulse applied to the picture element at intervals of two flames becomes zero in the present embodiment, and therefore, the deterioration of the liquid crystal element can be prevented. 624 of FIG. 62 shows the light transmitting stage of the picture element 8111.

Embodiment 22

The present embodiment also provides the driving waveform using the threthhold property of the ferroelectric liquid crystal as shown in FIGS. 82(*a*) and (*b*).

Figure 63:
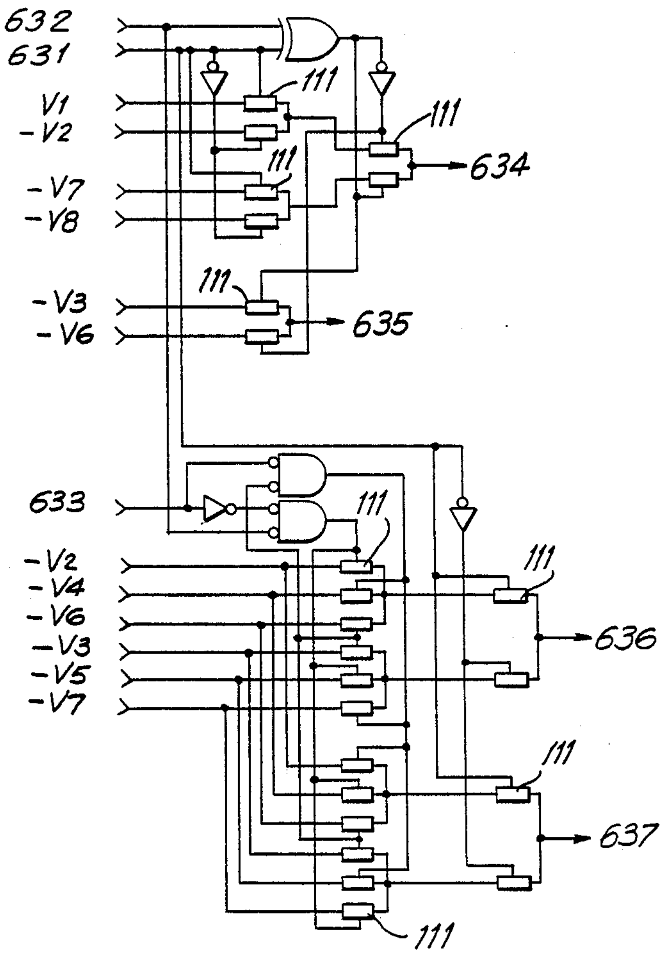
FIG. 63 shows an example of the practical circuit for realizing the driving waveform indicated in Embodiment 22 of the present invention.
Figure 64:
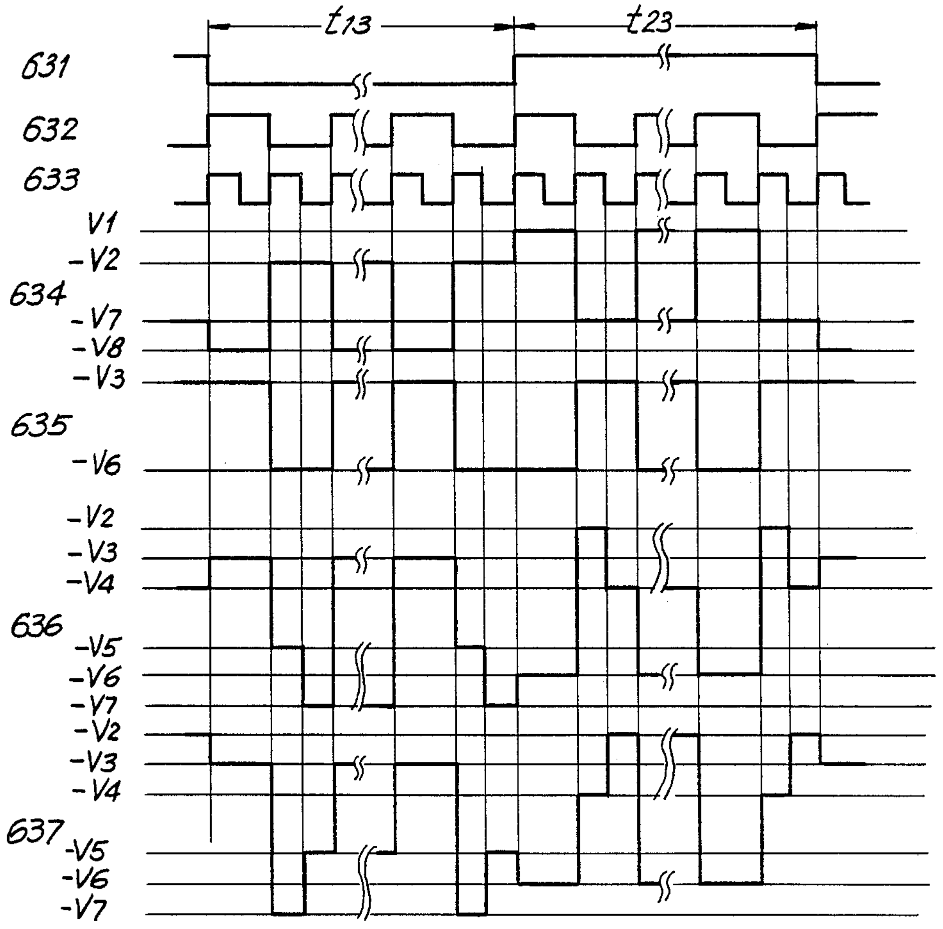
FIG. 64 shows the time charts for signal waveform at each point of the circuit illustrated in FIG. 63.

FIG. 63 is a block diagram showing a practical circuit for realizing the driving waveform according to the present embodiment. FIG. 81 shows an example of a driving circuit for applying the driving waveform formed by the circuit as shown in FIG. 63 to the liquid crystal element. 631 is a flame signal, 632 is a signal for switching the polarity. The transmission gate 111 is switched by these signals 631 and 632, then the voltages of V1, −V2, −V7, and −V8 are switched to form the selecting waveform 634 of the common electrode, and further, the voltages of −V3 and −V6 are switched to form the non-selecting waveform 635 of the common electrode. The voltages of −V2, −V3, −V4, −V5, −V6, and −V7 are switched by the signal for switching the polarity 632 and the clock pulse 633 to form the "ON" waveform 636 and the "OFF" waveform 637 of the common electrode. FIG. 64 shows the time charts of these signal waveforms.

These waveforms are applied to the driving circuit as shown in FIG. 81 to form the driving waveform applied to the common electrode and the segment electrode. Namely, the selecting waveform 634 is applied to 8101 and 8102, the non-selecting waveform 635 is applied to 8103, the "ON" waveform 636 is applied to 8105, and the "OFF" waveform 637 is applied to 8104, respectively.

Figure 65:
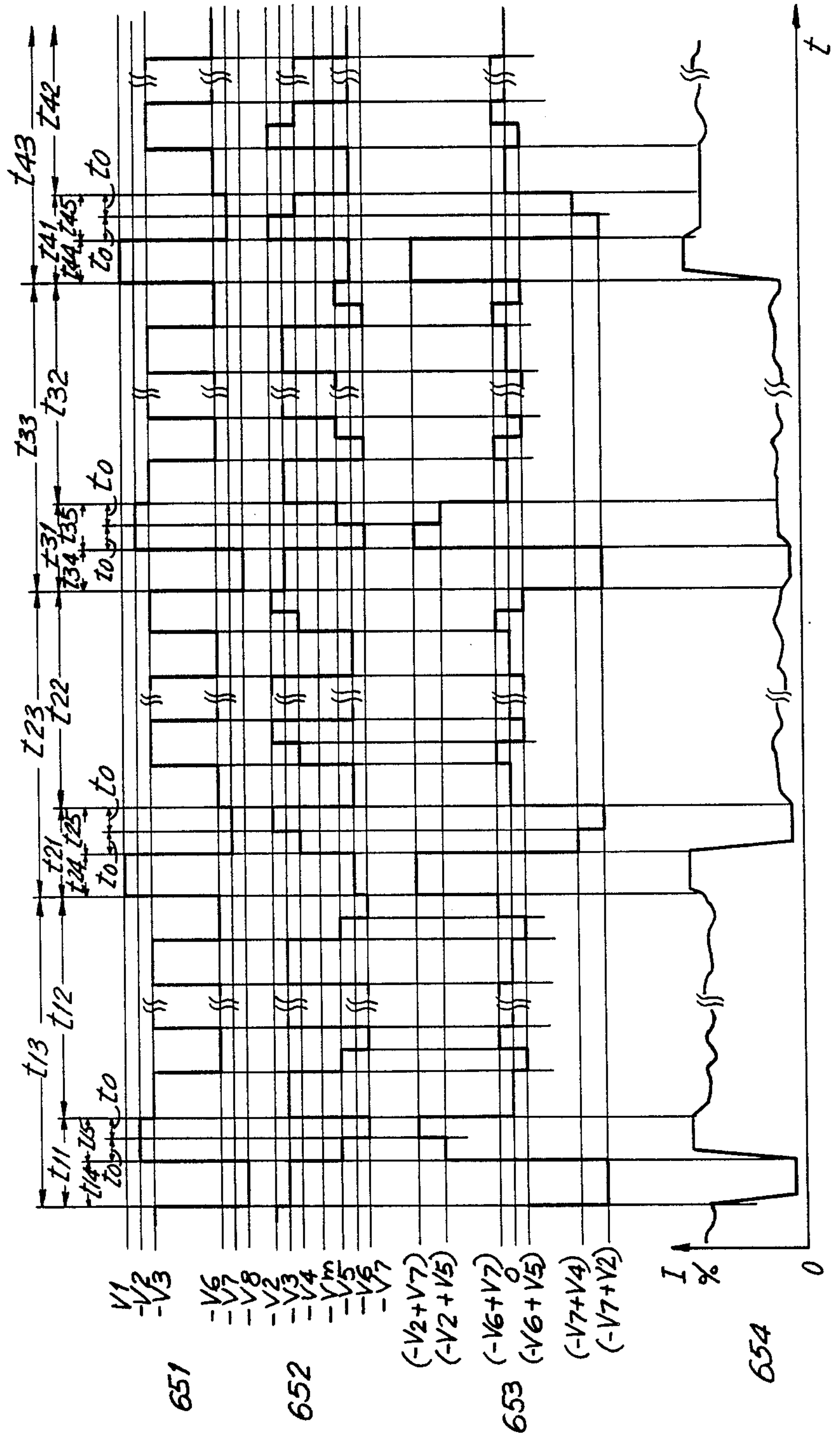
FIG. 65 shows the relationship between the driving waveform and the light transmitting state indicated in Embodiment 22 of the present invention.

In FIG. 81, 121 is a common electrode data. This common electrode data 121 is transmitted to the common electrode shift register 115 by the common electrode shift clock 120, then the transmission gate 111 is switched by outputting the selecting signal per one common electrode succesively, and further, the common elelctrode driving waveform is applied to 8107. 117 is a segment electrode data. This segment electrode data 117 is transmitted to the shift register 114 by the segment electrode shift clock 118. After the data enough for one common electrode is transmitted, the segment electrode data 117 is latched to the latch circuit 116 by the latch pulse 119. The transmission gate 111 is switched by the output of the latch circuit 116, then the "ON" waveform 636 and the "OFF" waveform 637 are switched, and further the segment electrode driving waveform is applied to 8106. FIG. 65 shows the waveform applied to the common electrode 8109 and the segment electrode 8110 as shown in FIG. 81 and the synthetic waveform applied to the picture element 8111 and the light transmitting state.

Each of t13, t23, t33, and t43 shows one flame period, each of t11, t21, t31, and t41 shows the selecting term, and each of t12, t22, t32, and t42 shows the non-selecting term, respecctively. Each of t14, t24, t34, and t44 shows the pulse width of the pulse which is applied in the first half period of the selecting term, and each of t15, t25, t35, and t45 shows the pulse width of the pulse which is applied in the latter half period of the selecting term, in the present embodiment, all of them have the same pulse width. Further, t0 shows the pulse width of half of the term t15 (t25, t35, t45).

Embodiment 22 is different from Embodiment 21 in that the voltage level which is applied to the common electrode is equal to that of the signal electrode so as to reduce the voltage applied to the common electrode, and therefore, the "ON" waveform and the "OFF" waveform are varied according to the selecting waveform.

The amplitudes of V1 to V6 and Vm are determined so as to satisfy the following conditions:

$$V1=0$$

$$(V1+V6)>Vsat1$$

$$(V8-V3)>|Vsat2|$$

$$(V7-V6)=(V4+V3)<Vth1$$

$$(V6-V5)=(V3-V2)<|Vth2|$$

$$Vth21>(V7-V2)>Vsat11$$

$$|Vth22|>(V7-V2)>|Vsat12|$$

$$(Vm-V2)=(V7-Vm)$$

The voltage pulses applied to the common electrode 8109 are as follows. Namely, as shown in 651 of FIG. 65, for the selecting term, the voltage of −V8 is applied during the first half period, then the voltage pulse of −V2 is applied during the latter half period as the first selecting waveform, and the voltage pulse of V1 is applied during the first half period, then the voltage pulse of −V7 is applied during the latter half period as the second selecting waveform. On the other hand, for the non-selecting term, the voltage pulses of −V6 and −V3 are applied in the order of −V6 and −V3 or −V3 and −V6 are applied.

The voltage pulses applied to the segment electrode 8110 are as follows. Namely, as shown in 652 of FIG. 65, for the period in which the first selecting waveform is applied, the voltage pulse −V3 is applied during the first half period, then the voltage pulses of −V5 and −V7 having the pulse width of t0 are applied by turns during the latter half period as the "ON" waveform, and the voltage pulse −V3 is applied during the first half period, then the voltage pulses of −V7 and −V5 are applied during the latter half period as the "OFF" waveform. On the other hand, for the period in which the second selecting waveform is applied, the voltage pulse −V6 is applied during the first half period, then the voltage pulses −V2 and −V4 having the pulse width of t0 are applied by turns during the latter half period as the "ON" waveform, and the voltage of −V6 is applied during the first half period, then the voltage pulses of −V4 and −V2 are applied as the "OFF" waveform.

At this time, the synthetic waveform applied to the picture element 8111 is as follows. Namely, as shown in 653 of FIG. 65, for the period in which the first selecting waveform is applied to the common electrode, in case of "ON", the voltage pulse of (−V8+V3) is applied, then the pulse having the amplitudes that the same in the first half period t0 is (−V2+V5) and the same in the latter half period t0 is (−V2+V7) is applied, in case of "OFF", the voltage pulse of (−V8+V3) is applied, then the pulse having the amplitudes that the same in the first half period t0 is (−V2+V7) and the same in the latter period t0 is (−V2+V5) is applied. On the other hand, for the period in which the second selecting waveform is applied to the common electrode, in case of "ON", the voltage pulse of (V1+V6) is applied, then the pulse having the amplitudes that the same in the first period t0 is (−V7+V2) and the same in the latter period t0 is (−V7+V4) is applied, in the case of "OFF", the voltage pulses of (V1+V6) is applied, then the voltage pulse having the amplitudes that the same in the first half period t0 is (−V7+V4) and the same in the latter half period t0 is (−V7+V2) is applied. The voltage pulses of 0 V, (−V6+V7) and (−V6+V5) are applied in the non-selecting term.

The synthetic waveform according to the present embodiment is the same as that in Embodiment 21 substantially, the average of the volage pulse applied to the picture element at intervals of two flames becomes zero as well as the on-off can be selected in the same manner as Embodiment 21. 654 of FIG. 65 shows the light transmitting state of the picture element 8111.

Embodiment 23

The present embodiment provides the driving method using the threthhold property of the ferroelectric liquid crystal as shown in FIG. 82(*a*) and (*b*).

Figure 66:
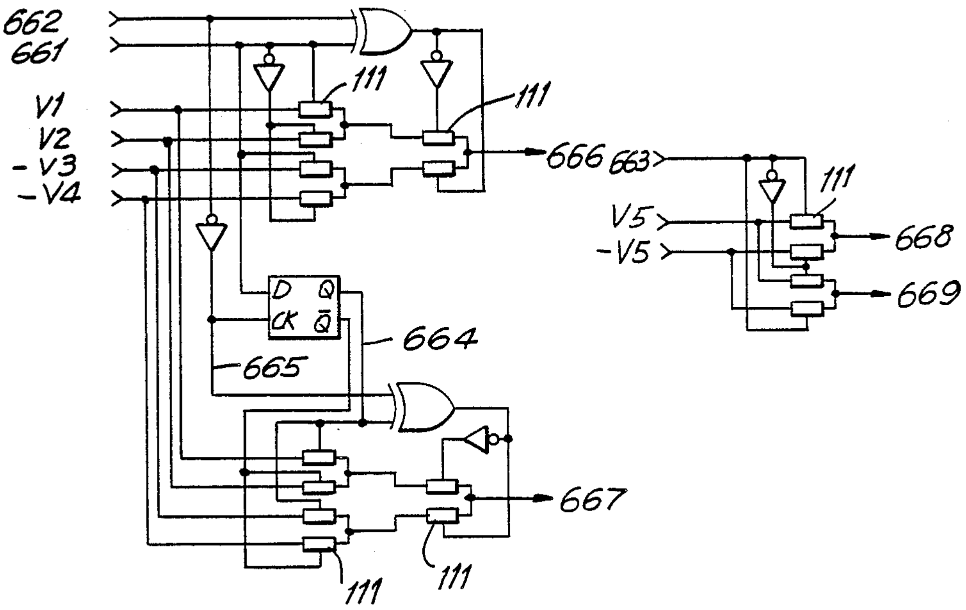
FIG. 66 shows an example of the practical circuit for realizing the driving waveform indicated in Embodiment 23 of the present invention.
Figure 67:
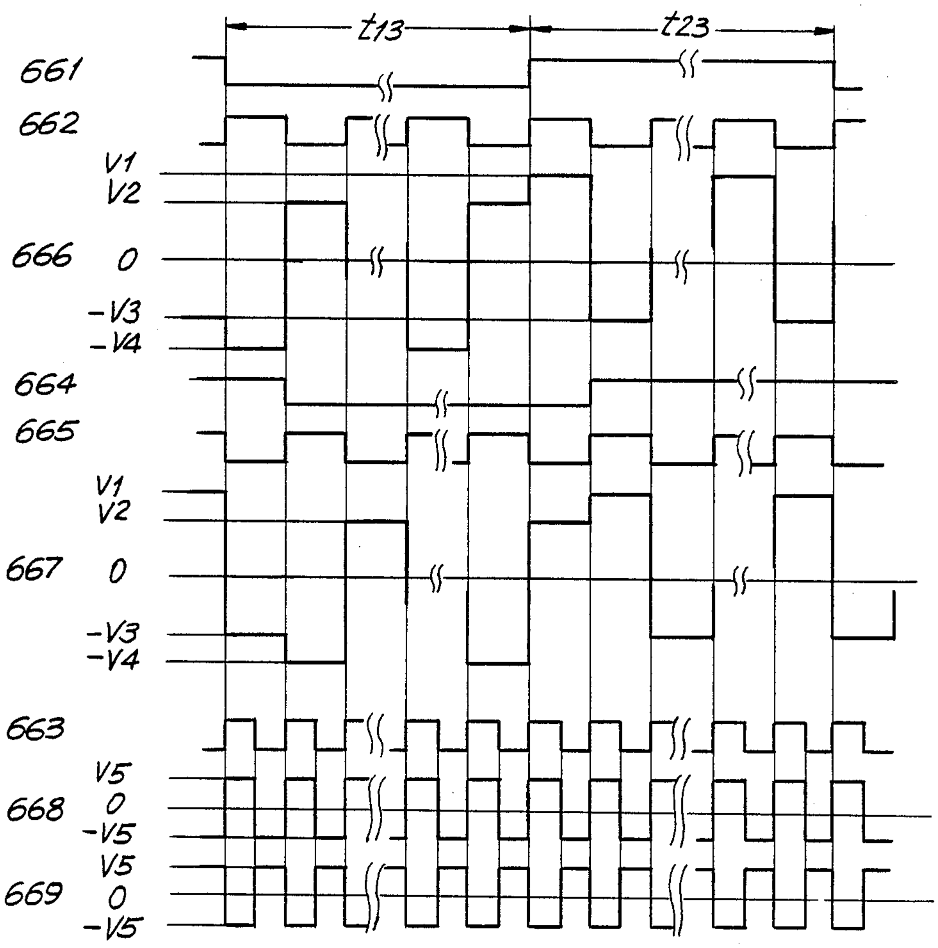
FIG. 67 shows the time charts for signal waveform at each point of the circuit illustrated in FIG. 66.
Figure 68:
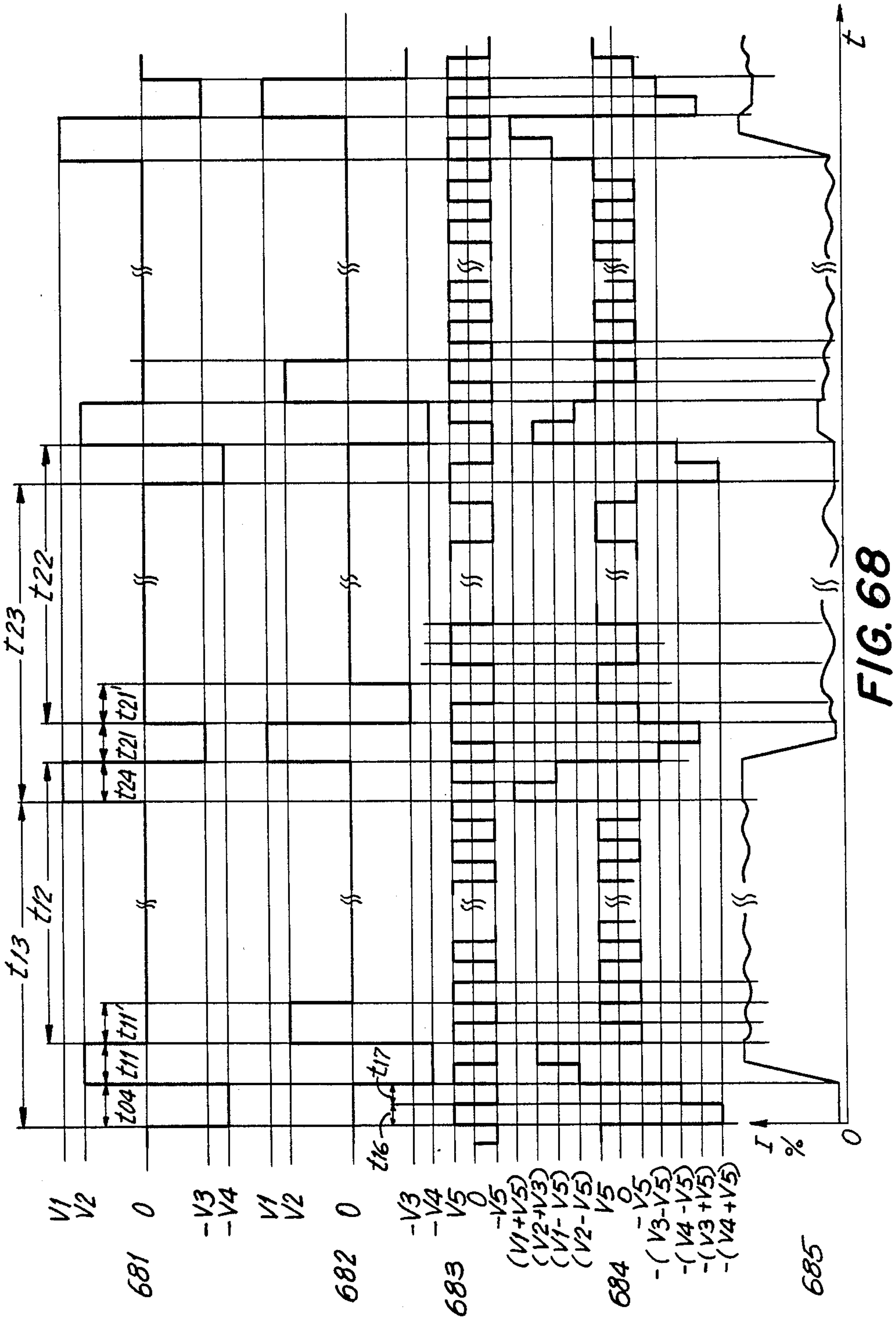
FIG. 68 shows the relationship between the driving waveform and the light transmitting state indicated in Embodiment 23 of the present invention.

FIG. 66 is a block diagram showning a pracitical circuit for relaizing the driving waveform according to the present embodiment. 661 is a flame signal, 662 is a signal for switching the polarity. 664 is a delayed signal of the flame signal 661, 665 is a switching signal of the signal for switching the polarity 662. The transmission gate 111 is switched by these signals, and the voltages of V1, V2, —V3, and −V4 are switched to form an odd numbered common electrode selecting waveform 666 and an even numbered common electrode selecting waveform 667. The transmission gate 111 is switched by the clock pulse 663, and the voltage pulses of V5 and −V5 are switched to form the "ON" waveform 668 and the "OFF" wveform 669 for the segment electrode. FIG. 67 shows the time charts of these waveforms. The signals of 666, 667, 668, and 669 as shown in FIG. 66 are applied to the driving circuit as shown in FIG. 81, namely, 666 is connected to 8101, 667 is connected to 8102, 668 is connected to 8105, 669 is connected to 8104, and the voltage of 0 V is connected to 8103, respectively. In FIG. 81, 121 is a common electrode data. This common electrode data 121 is transmitted to the common electrode shift register 115 by the common electrode shift clock 120, then the transmission gate 111 is switched by outputting the selecting signal per one common electrode succesively to form the odd numbered common driving waveform 8017 and the even numbered common electrode waveform 8108. 117 is a segment electrode data. This segment electrode data 17 is transmitted to the shift register 114 by the segment electrode shift clock 118. After the data enough for one common electrode is transmitted, the segment electrode data 117 is latched to the latch circuit 116 by the lath pulse 119. The transmission gate 111 is switched by the output of the latch circuit 116, then the 8104 and 8105 are switched to form the segment driving waveform 8106. 681, 682, 683, and 684 of FIG. 68 shows the time charts of the waveform and the synthetic waveform of 8107, 8108, and 8106. The driving condition of this driving waveform is as follows.

| | |
|---|---|
| (V1 + V5) > Vsat21 | (V2 + V5) > Vsat11 |
| (V2 + V5) < Vth21 | $\lvert -V3 - V5 \rvert > \lvert Vsat12 \rvert$ |
| $\lvert -V3 - V5 \rvert < \lvert Vth22 \rvert$ | $\lvert -V4 - V5 \rvert > \lvert Vsat22 \rvert$ |
| V5 < Vth1 | $\lvert -V5 \rvert < \lvert Vth2 \rvert$ |
| $\lvert V1 \rvert = \lvert -V4 \rvert$ | $\lvert V2 \rvert = \lvert -V3 \rvert$ |
| t04 = t11 | t16 = t17 |

With respect to the picture element 8111 of FIG. 81, the movement of the liquid crystal element is explained as follows. During the period of t04 of FIG. 68, the memory state of the liquid crystal element is erased to turn the picture element "OFF" by applying the erase pulse having the voltage pulse of $\lvert -V4-V5 \rvert > \lvert Vsat22 \rvert$, and applied just before the odd numbered flame. On the other hand, t11 is the selecting term of the odd numbered flame, and it is selected that the waveform synthesized with the common electrode waveform is the same as shown in 821 of FIG. 82 or the same as shown in 822 of FIG. 82 by whether the waveform applied to the segment electrode is the "ON" waveform or the "OFF" waveform. When the synthesized waveform is equal to the waveform as shown in 821, then the liquid crystal element turns "ON", on the other hand, when the synthesized waveform is equal to the waveform as shown in 822, the liquid crystal element still maintains "OFF" state. Since the voltage pulses of V5 and −V5 whose absolute value is less than the threshold voltage are only applied to the liquid crystal element during the non-selecing term t12, the writing state during the term t11 is maintained.

The erase pulse as shown in 682 is applied to the liquid crystal element which is selected next as well as the data is written to the liquid crystal element during the selecting term t11 to erase the last memory state during the term t11. For the even numbered flame, during the period of t24, the memory state of the liquid crystal element is erased to turn the picture element "ON" by applying the erase pulse having the opposite polarity with respect to the term t04 just before the odd numbered flame, having the voltage pulse of (V1+V5)>Vsat21, and applied just before the even numbered flame during the term of t14. On the other hand, the term t21 is a selecting term, and it is selected that the waveform synthesized with the common driving waveform is the same as shown in 821 of FIG. 82 or the same as shown in 822 of FIG. 82 by whether the waveform applied to the segment electrode is the "ON" waveform or the "OFF" waveform. When the synthesized waveform is equal to the waveform as shown in 821 of FIG. 82, the liquid crystal element turns "ON", on the other hand, when the synthesized waveform is equal to the waveform as shown in 822, the liquid crystal element still maintain "OFF" state. And during the non-selecting term t22, in the same manner as that in the odd numbered flame, the writing state for the term t21 is maintained.

The erase pulse shown in 682 is applied to the liquid crsytal element which is selected next as well as the data is written to the liquid crystal element during the non-selecting term t22 to erase the last memory state during the term t11. Accordingly, there would be possible to reduce the time of the selecting term to half by applying the erase pulse to the liquid crystal element which is selected next as well as the data is written to the liquid crystal element during the selecting term t21. In the present embodiment, the erase pulse is applied just before the liquid crsytal is selected, however, it needs not to output just before the selecting term, and therefore, it has only to apply the erase pulse before the selecting term at the predetermined time.

Embodiment 24

The present embodiemnt also provides the driving method using the threthhold property of the ferroelectric liquid crystal as shown in FIG. 82(*a*) and (*b*).

Figure 69:
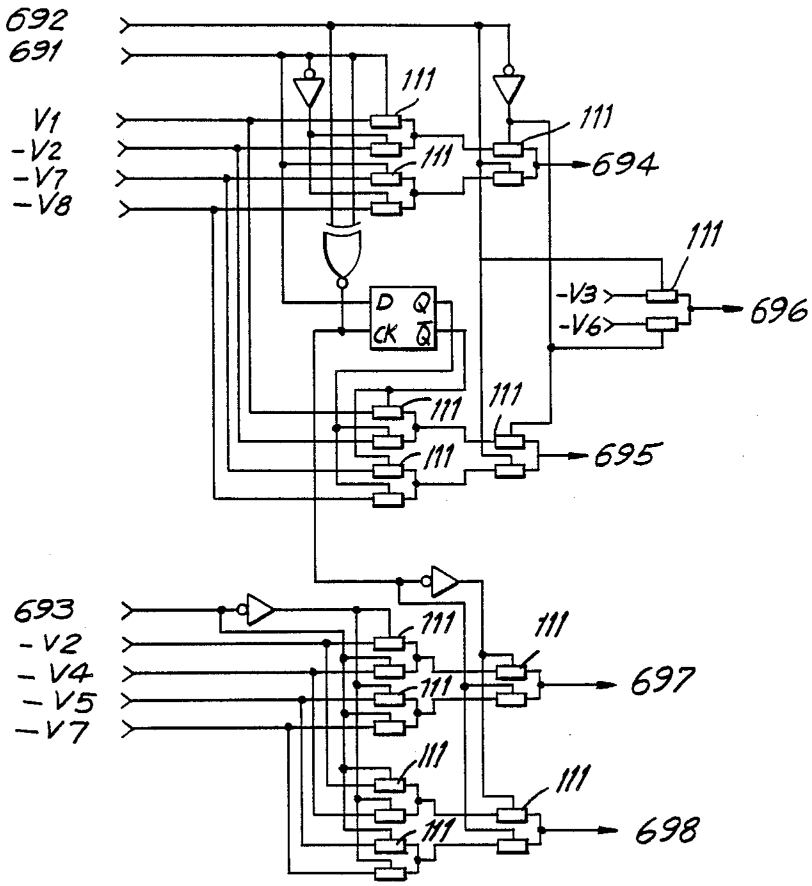
FIG. 69 shows an example of the practical circuit for realizing the driving waveform indicated in Embodiment 24 of the present invention.

FIG. 69 is a block diagram as shown in a practical circuit for realizing the driving waveform accoding to the present embodiemnt. 691 is a flame signal and 692 is a signal for switching the polarity. The transmission gate 111 is switched by the signals 691 and 692, then the voltages of V1, −V2, −V7, −V8, −V3, and −V6 are switched to form the odd numbered common electrode selecting waveform 694, the even numbered common selecting waveform 695, and the common electrode non-selecting waveform 696. The transmission gate 111 is switched by the signals of 691, 692, and the clock pulse 693, then the voltages of −V2, −V4, −V5, and −V7 are switched to form the "ON" waveform 697 and the "OFF" waveform 698 for the segment electrode.

Figure 70:
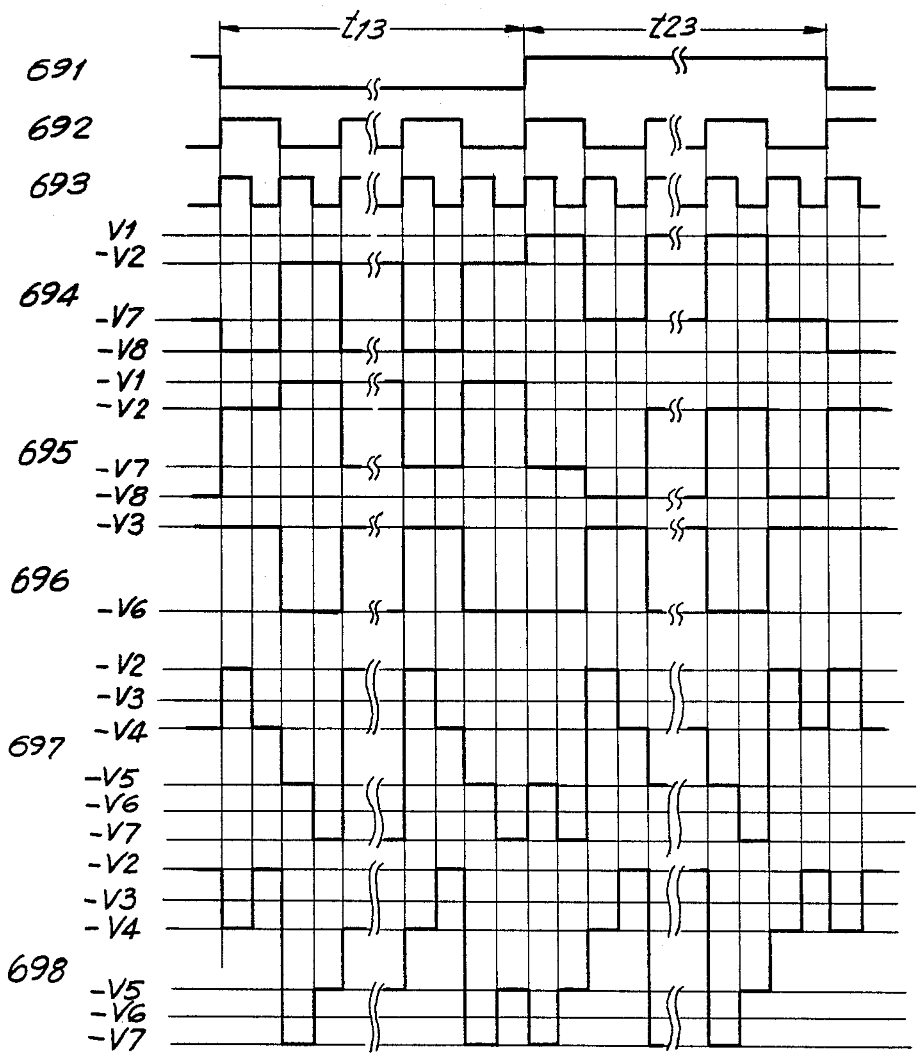
FIG. 70 shows the time charts for signal waveform at each point of the circuit illustrated in FIG. 69.
Figure 71:
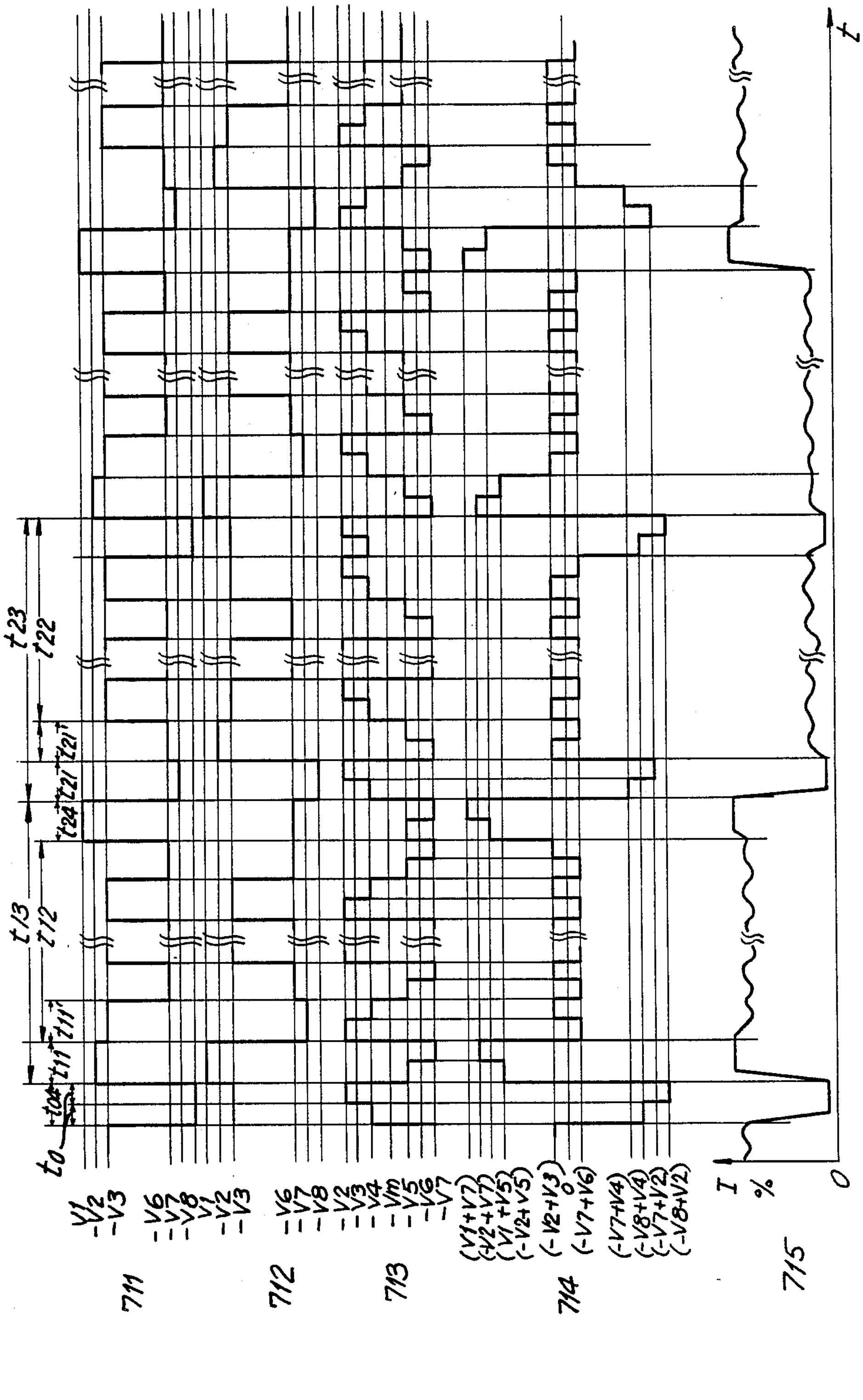
FIG. 71 shows the relationship between the driving waveform and the light transmitting state indicated in Embodiment 24 of the present invention.

FIG. 70 shows the time charts of these waveforms. Each waveform of 694, 695, 696, 697, and 698 as shown in FIG. 70 is input to the driving circuit as shown in FIG. 81. Namely, 694 is connected to 8101, in the same manner, 695 is 8102, 696 is 8103, 697 is 8105, and 698 is 8105, respectively. As indicated in Embodiment 23, the odd numbered common driving waveform 711, the even numbered common driving waveform 712, and the segment electrode waveform 713 of FIG. 71 are formed by these signals 117, 118, 119, 120, and 121, and further the formed waveforms 711, 712, and 713 are applied to the liquid crystal element. The waveforms are indicated in 714 of FIG. 71. The driving conditions according to the driving waveform as follows.

| | |
|---|---|
| $V1 = 0$ | |
| $\lvert -V8 + V2 \rvert > Vsat22$ | $(-V2 + V7) > Vsat11$ |
| $(-V2 + V7) < Vth21$ | $(V1 + V7) > Vsat21$ |
| $\lvert -V7 + V2 \rvert > \lvert Vsat12 \rvert$ | $\lvert -V7 + V2 \rvert < Vth22$ |
| $(-V2 + V3) < Vth1$ | $\lvert -V4 + V3 \rvert < \lvert Vth2 \rvert$ |
| $(-V2 + V3) = (-V5 + V6)$ | $(-V4 + V3) = (-V7 + V6)$ |
| $(-V2 + Vm) = (-Vm + V7)$ | $t04 = t11$ |
| $(V6 - V2) = (V7 - V3)$ | $(V8 - V3) = (V6 - V1)$ |

With respect to the picture element 8111 of FIG. 81, the movement of the liquid crystal element is explained as follows. During the period of t04 of FIG. 71, the memory state of the liquid crystal element is erased to turn the picture element "OFF" by applying the erase pulse having the voltage pulses of $\lvert -V8+V2 \rvert > \lvert Vsat22 \rvert$ which is the synthesized voltage of the common driving waveform 711 and the segment driving waveform 713, and applied just before the odd numbered flame. On the other hand, t11 is the selecting term of the odd numbered flame, and it is selected that the waveform synthesized with the common driving waveform is the same as shown in 821 of FIG. 82 or the same as shown in 822 of FIG. 82 by whether the waveform applied to the segment electrode is the "ON" waveform or the "OFF" waveform. When the synthesized wavefom is equal to the waveform as shown in 821, then the liquid crystal element turns "ON", on the other hand, when the synthesized waveform is equal to the waveform as shown in 822, then the liquid crystal element still maintaines "OFF" state. For the non-selecting term, the voltage pulses of −V3 and −V6 are applied by turns in the common driving waveform 711. Since the voltage pulse whose absolute value is always less then the threshold voltage are only applied to the liquid crystal element during the synthesized waveform 713, as shown in 714, the writing state during the term t11 is maintained.

The common driving waveform as shown in 712 is applied to the liquid crystal element which is selected next as well as the data is written t0 the liquid crystal element during the selecting term t11, thereby applying the erase pulse having the opposite polarity with respect to the term t04 and t24 so that the last memory state is erased to turn the picture element "ON" state. For the even numbered flame, during the period of t24, the memory state of the liquid crystal element is erased to turn the picture element "ON" by applying the erase pulse having the opposite polarity with respect to the term t04 just before the odd numbered flame and having the voltage pulse of $(V1+V7) > Vsat21$. On the other hand, the term t21 is a selecting term, and it is selected that the waveform synthesized with the common driving waveform is the same as shown in 821 of FIG. 82 or the same as shown in 822 of FIG. 82 by whether the waveform applied to the segment electrode is the "ON" waveform or the "OFF" waveform. When the synthesized wavefom is equal to the waveform as shown in 821, the liquid crystal element turns "OFF", on the other hand, when the synthesized wavefrom is equal to the waveform as shown in 822, the liquid crystal element still maintains "ON" state. And during the non-selecting term, in the same manner as that in the odd numbered flame, the writing state during the term t21 is mainained. The common driving waveform as shown in 712 is applied to the liquid crystal element which is selected next as well as the data is written to the liquid crystal element during the term t21, thereby applying the erase pulse having the opposite pulse with respect to the term t24 so that the last memory state is erased to turn the picture element "OFF" state. Accordinly, there would be possible to reduce the time of the selecting term to half by applying the erase pulse to the liquid crystal element which is selected next as well as the data is written to the liquid crystal element, and the polarity of the applied erase pulse is different from that of the selecting pulse between the liquid crystal element which is selected in the odd numbered flame and the liquid crystal element which is selected in the even numbered flame. The present driving method can reduce the voltage applied to the common electrode. In the present embodiment, the erase pulse is applied just before the liquid crystal is selected, however, it needs not to output just before the selecting term, and therefore, it has only to apply the erase pulse before the selecting term at the predetermined time.

Embodiment 25

Figure 72:
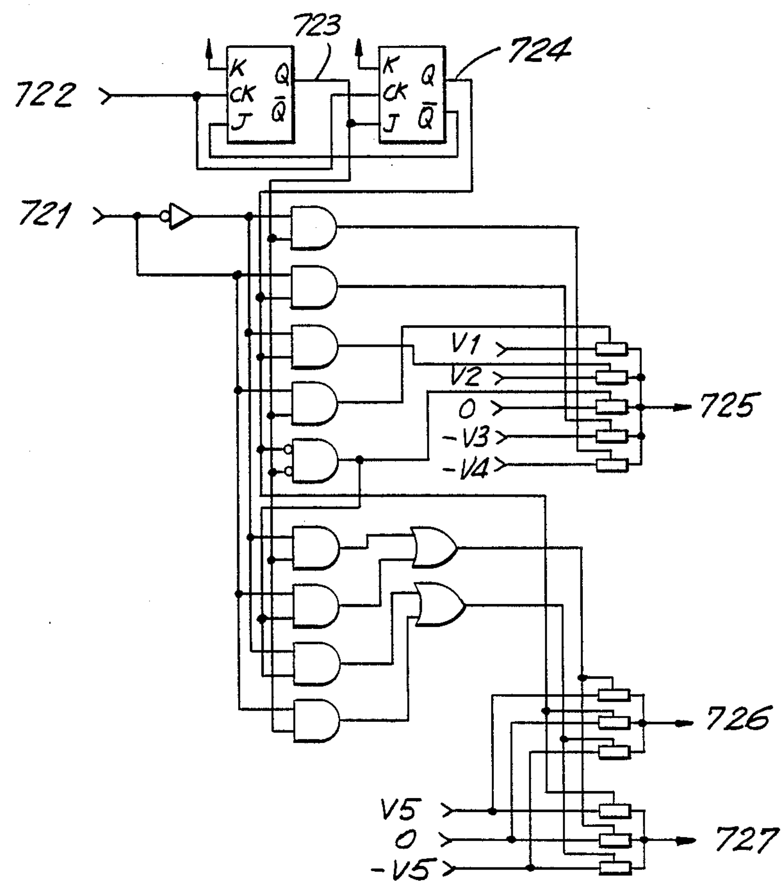
FIG. 72 shows an example of the practical circuit for realizing the driving waveform indicated in Embodiment 25 of the present invention.
Figure 73:
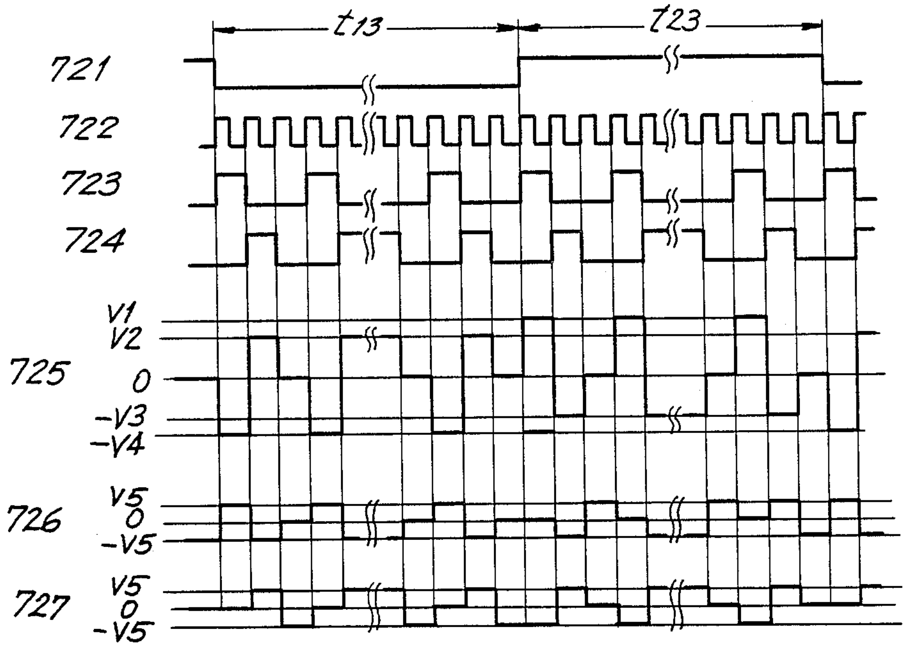
FIG. 73 shows the time charts for signal waveform at each point of the circuit illustrated in FIG. 72.

FIG. 72 is a block diagram showing the driving circuit for realizing the driving waveform according to the present embodiment. 721 is a frame signal, 822 is a clock signal. The transmission gate 111 is switched by these signals 721 and 722, then the voltages of V1, V2, −V3, and −V4 are swithced to form the common electrode selecting waveform 725. The voltages of V5 and −V5 are switched to form the "ON" waveform 726 and the "OFF" waveform 727 for the segment electrode. FIG. 73 shows the time charts of these waveforms. Each of the signals 725, 726, and 727 of FIG. 73 is input to the driving circuit as shown in FIG. 81. 725 is connected to 8101 and 8102, 826 is connected to 8105, 727 is connected to 8104, and the voltage of 0 V is connected to 8103, respectively. In FIG. 81, 121 is a common electrode data. This comon electrode data 121 is transmitted to the common electrode shift register 115 by the comon electrode shift clock 120, then the transmission gate 111 is switched by outputting the selecting signal per one common electrode succesively to form the common driving waveform 8107. 117 is a segment electrode data. This segment electrode data 117 is transmitted to the shift register 114 by the segment electrode shift clock 118. After the data enough for one common electrode is transmitted, the segment electrode data 117 is latched to the latch circuit 116 by the latch pulse 119. The transmission gate 111 is switched by the output of the latch circuit 116, then the signals of 8104 and 8105 are switched to form the segment electrode waveform 8106. The waveforms of 8107 and 8106 and its synthetic waveforms are shown in the time charts of 741, 742, and 743 of FIG. 74. The driving conditions of this driving waveform is as follows.

| | |
|---|---|
| $V1 > Vsat1$ | $(V2 + V5) > Vsat1$ |
| $(V2 - V5) < Vth1$ | $\lvert -V3 - V5\rvert > \lvert Vsat2\rvert$ |
| $\lvert -V3 + V5\rvert > \lvert Vth2\rvert$ | $\lvert -V4\rvert > \lvert Vsat2\rvert$ |
| $\lvert -V1\rvert = \lvert -V4\rvert$ | $\lvert V2\rvert$ 73 $= \lvert -V3\rvert$ |
| $V5 < Vth1$ | $\lvert -V5\rvert < \lvert Vth2\rvert$ |
| $t14 = t15 = t16$ | |

Figure 74:
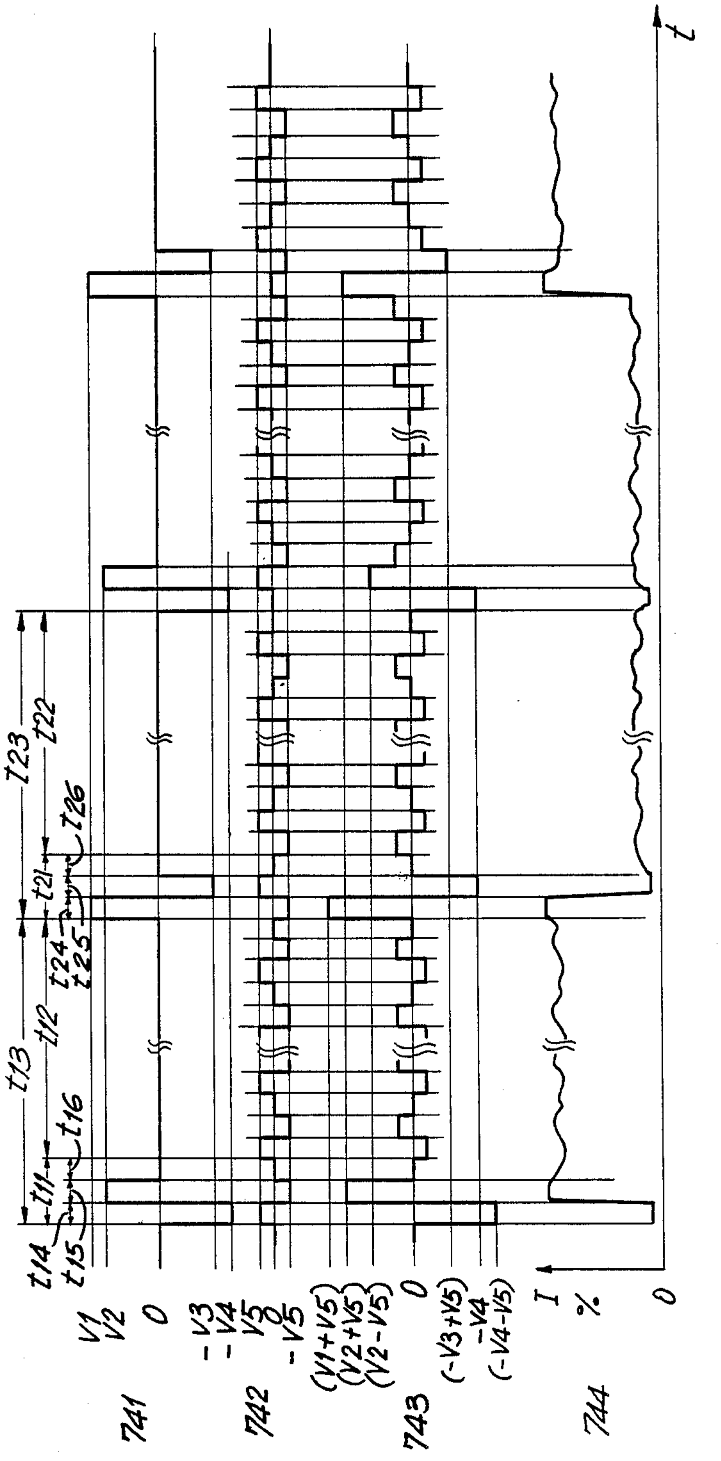
FIG. 74 shows the relationship between the driving waveform and the light transmitting state indicated in Embodiment 25 of the present invention.

With respect to the picture element 8111 of FIG. 81, the movement of the liquid crystal element is explained as follows. The term t11 of FIG. 74 is the selecting term of the odd numbered flame. During the period of t14, the memory state of the liquid crystal element is erased to turn the picture element "OFF" by applying the erase pulse having the voltage pulse whose absoluted value is more than the negative saturation voltage. During the period t15, when the segment electrode waveform is "ON" waveform, the writing pulse having the voltage pulse more than the positive saturation voltage is applied to turn the liquid crystal element "ON" state, on the other hand, when the segment electrode wavefom is the "OFF" waveform, the writing pulse having the voltage pulse less than the positive threthhold voltage is applied to maintain the "OFF" state. The voltage applied to the common electrode during the period t16 is 0 V. Since the voltage pulses of V5 and −V5 whose absolute value is less than the threthhold voltage are only applied to the liquid crystal element during the non-selecting term t12, the writing state during the term t15 is maintained.

For the even numbered flame, t21 is the selecting term. And during the term t24, the memory state of the liquid crystal element is erased to turn the picture element "ON" by applying the erase pulse having the opposite polarity with respect to in the odd numbered flame and being more than the positive saturation voltage. During the term t25, when the segment electrode waveform is the "ON" waveform, the writing pulse whose absolute value is less than the negative threthhold voltage is applied to maintain the "ON" state, on the other hand, when the segment electrode waveform is the "OFF" waveform, the erase pulse whose absolute value is more than the negative saturation voltage is applied to the liquid crystal element to turn the picture element "OFF". The voltage pulse which is applied to the common electrode during the term t26 is 0 V. During the non-selecting term t22, as same in that of the odd numbered flame, the writing state during the term t25 is maintained. According to this driving method, the pulse width of the voltage pulse which is applied in the non-selecting term is always the pulse width of t14, and further, the excellent contrast ratio can be obtained.

Embodiment 26

Figure 75:
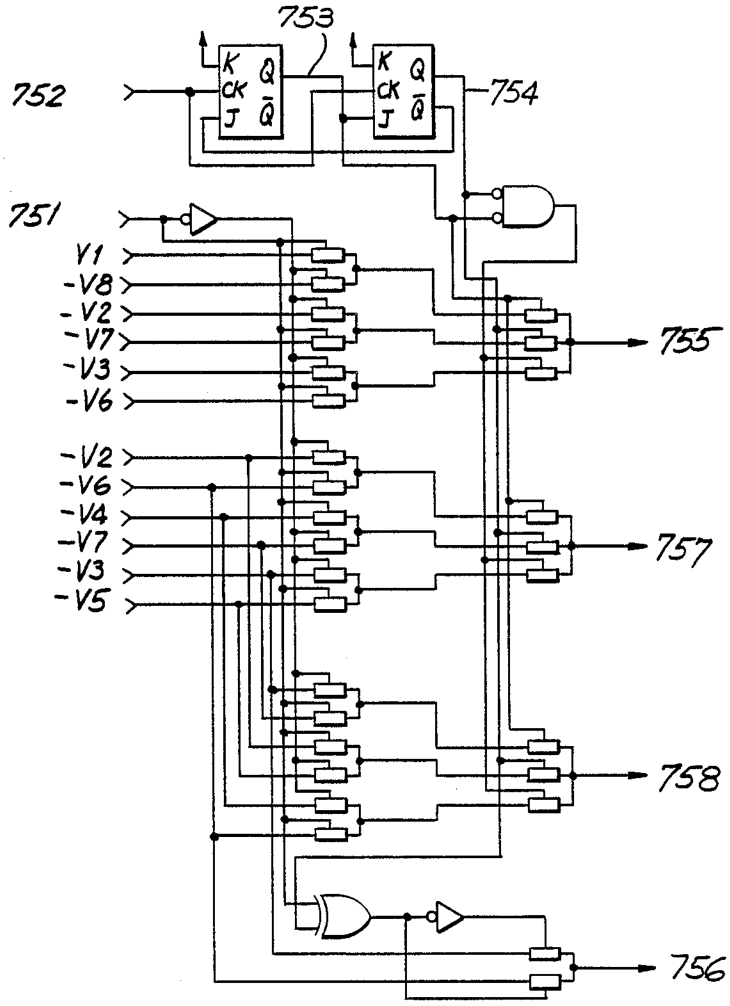
FIG. 75 shows an example of the practical circuit for realizing the driving waveform indicated in Embodiment 26 of the present invention.
Figure 76:
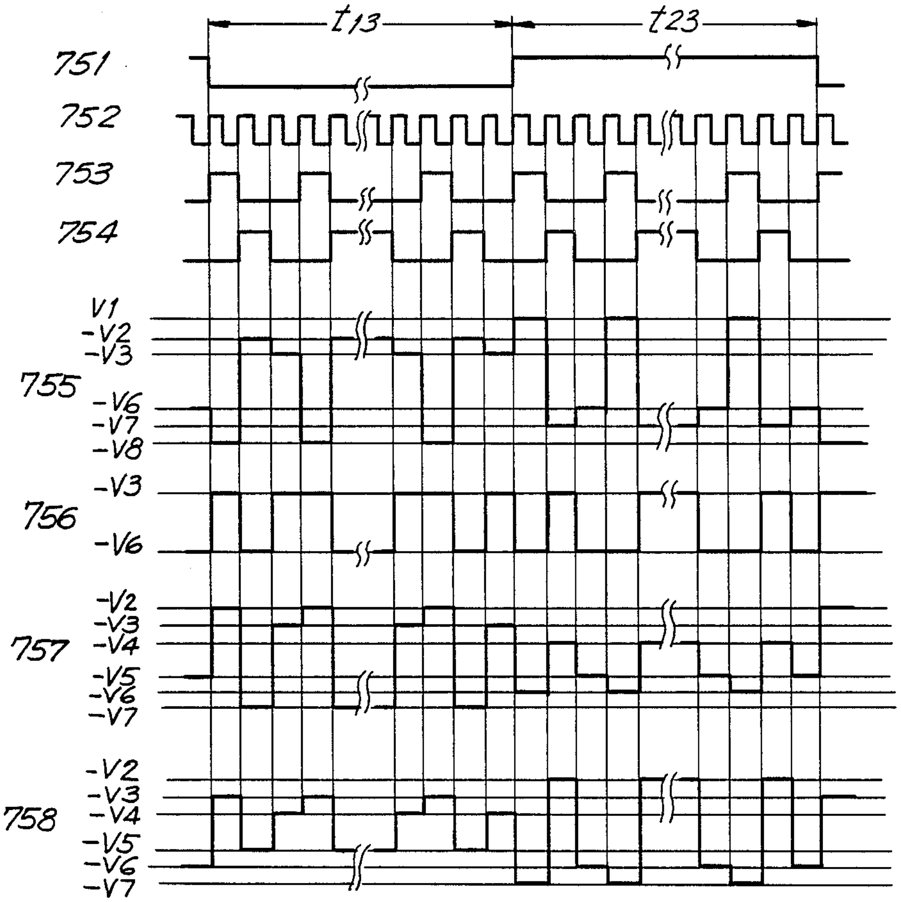
FIG. 76 shows the time charts for signal waveform at each point of the circuit illustrated in FIG. 75.
Figure 77:
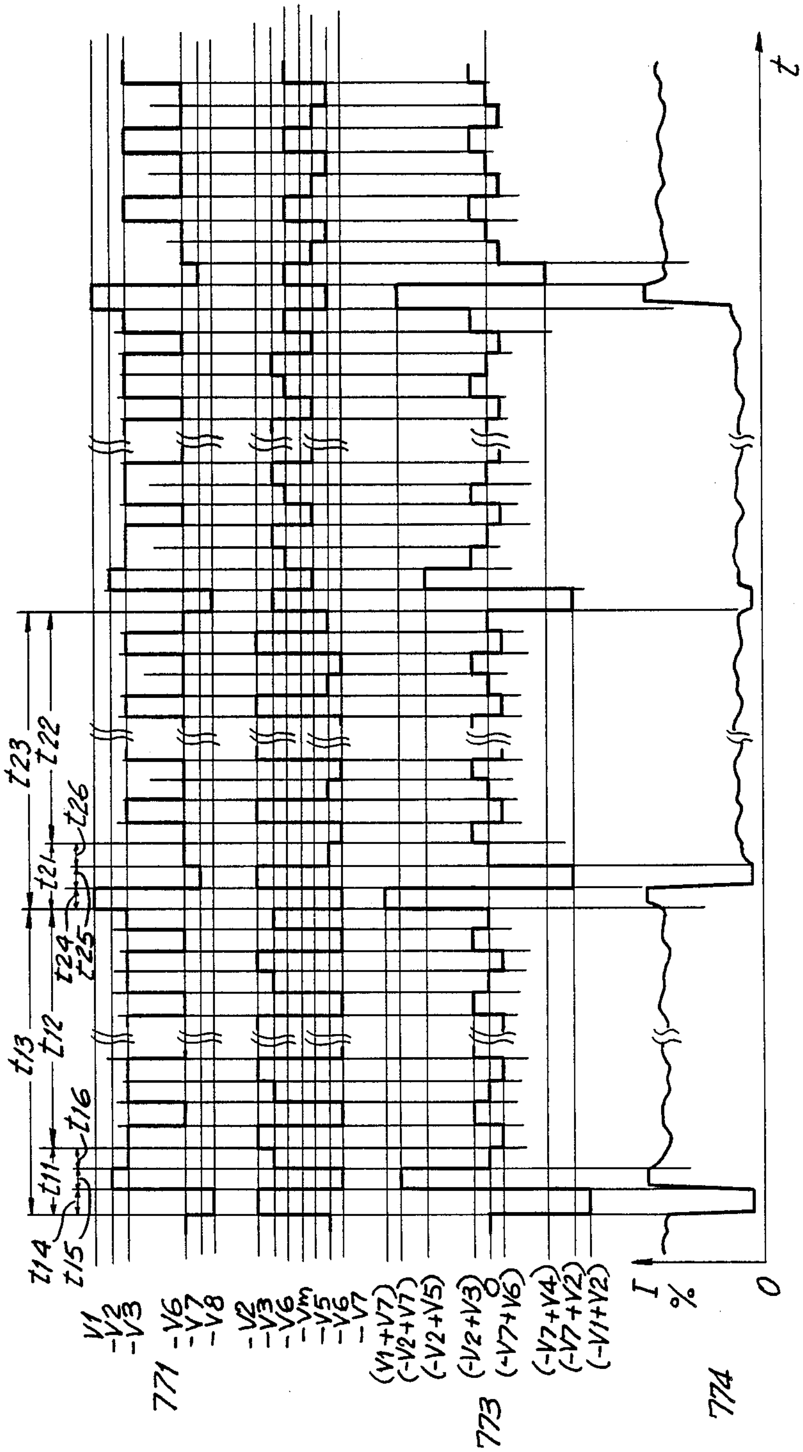
FIG. 77 shows the relationship between the driving waveform and the light transmitting state indicated in Embodiment 26 of the present invention.

FIG. 75 is a block diagram showing the practical circucuit for realizing the driving waveform according to the present embodiment. 751 is a flame signal, 752 is a clock signal. The transmission gate 111 is switched by these signals 751 and 752, then the voltages of V1, −V2, −V3, −V6, −V7, and −V8 are switched to form the common selecting waveform 755, and the voltages of −V3 and −V6 are switched to form the common driving non-selecting waveform 756. And the voltages of −V2, −V3, −V4, −V5, −V6, and −V7 are switched to form the "ON" waveform 757 and the "OFF" waveform 758 for the segment electrode. FIG. 76 shows the time charts of these waveforms. Each of the signals 755, 756, 757, and 758 of FIG. 76 is input to the driving circuit as shown in FIG. 81. 755 is connected to 8101 and 8102, 756 is connected to 8103, 757 is connected to 8105, and 758 is connected to 8104, respectively. The common driving waveform 771 and the segment driving waveform 772 of FIG. 77 are formed by these signals 117, 118, 119, 120, and 121 of FIG. 81, as indicated in Embodiment 25, and applied to the liquid crystal element. The synthetic waveform thereof is shown in 773. The driving conditions of the present driving waveform are as follows.

| | |
|---|---|
| $V1 = 0$ | $\lvert -V8 + V3\rvert > Vsat2$ |
| $(-V2 + V5) < Vth1$ | $(-V2 + V7) > Vsat1$ |
| $(V1 + V6) > Vsat1$ | $\lvert -V7 + V2\rvert > Vsat2$ |
| $\lvert -V7 + V3\rvert < \lvert Vth2\rvert$ | $(-V2 + V3) < Vth1$ |
| $\lvert -V4 + V3\rvert < \lvert Vth2\rvert$ | $(-V2 + V3) = (-V5 + V6)$ |
| $(-V4 + V3) = (-V7 + V6)$ | $(-V2 + Vm) = (-Vm + V7)$ |
| $t14 = t15 = t16$ | |
| $(V8 - V3) = (V6 - V1)$ | $(V6 - V2) = (V7 - V3)$ |

With respect to the picture element 8111 of FIG. 81, the movement of the liquid crystal element is explained as follows. The term t11 of FIG. 77 is the selecting term of the odd numbered flame. During the term t14, the memory state of the liquid crystal element is erased to turn the picture element "OFF" by appying the erase pulse having the voltage pulse whose absolute valued is more than the negative saturation voltage. And during the term t15, when the segment driving waveform is the "ON" waveform, the writing pulse having the voltage pulse more than the negative saturation voltage is applied to turn the liquid crystal element "ON", on the other hand, when the segment driving waveform is the "OFF" waveform, the writing pulse having the voltage pulse less than the positive threthhold voltage is applied to maintain the "OFF" state. The voltage applied to the common electrode during the term t16 is −V3. During the non-selecting term t12, the voltage pulses −V3 and −V6 are applied alternately in the common electrode waveform 771. However, since the voltage whose absolute value is always less than the threthhold voltage is applied in the synthesized waveform with 772 as shown in 773, the state during the term t15 is maintained. For the even numbered flame, the term t21 is the selecting term. During the term t24, the memory state of the liquid crystal element is erased to turn the picture element "ON" by applying the erase pulse whose voltage pulse is opposite polarity with respect to the odd numbered flame and being more than the positive saturation voltage is applied to turn the liquid crystal element "ON". During the term t25, when the segment driving waveform is the "ON" waveform, the writing pulse whose absolute value of the voltage pulse is less than the negative thretthold voltage is applied to maintain the "ON" state, on the other hand, when the segment driving waveform is the "OFF" waveform, the writing pulse whose absolute voltage is applied of the voltage pulse is more than the negative saturation voltage to turn the liquid crystal element "OFF" state. The voltage applied to the common electrode during the term t26 is −V6. Further for the non-selecting term t22, as shown in that of the odd numbered flame, the state during the term t25 is maintained.

In case of the present driving method, the synthesized waveform applied to the liquid crystal element is same as that in Embodiment 25. And further this driving method can reduce the voltage applied to the common electrode.

Embodiment 27

Figure 78:
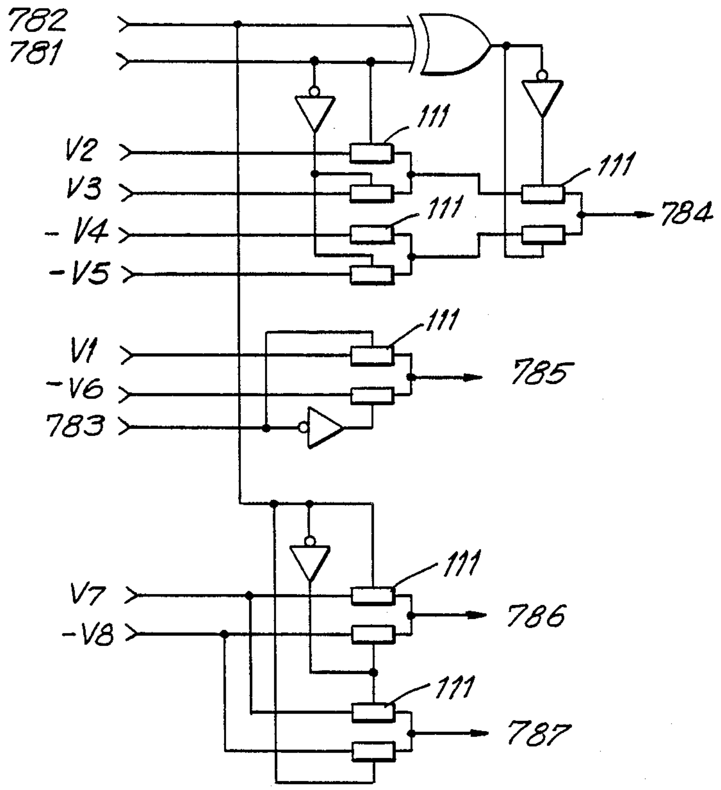
FIG. 78 shows an example of the practical circuit for realizing the driving waveform indicated in Embodiment 27 of the present invention.
Figure 79:
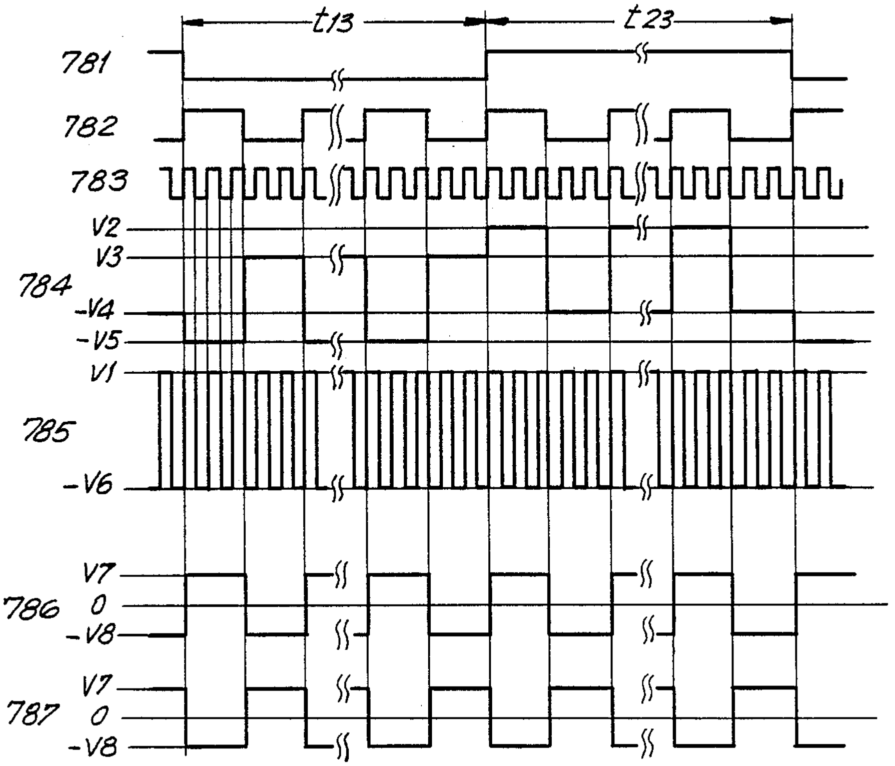
FIG. 79 shows the time charts for signal waveform at each point of the circuit illustrated in FIG. 78.
Figure 83:
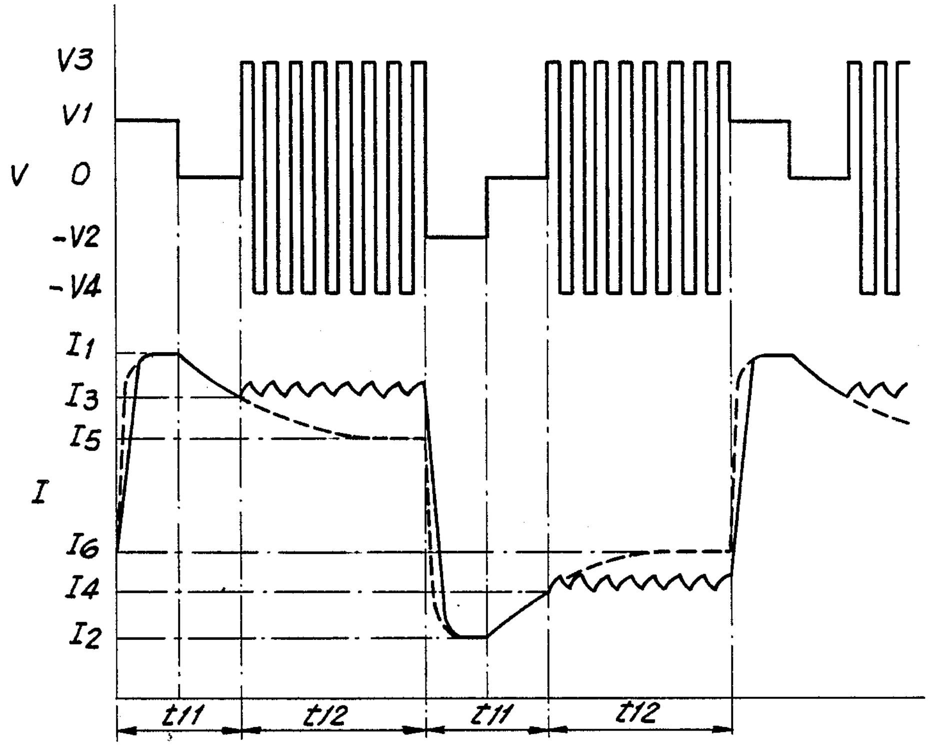
FIG. 83 shows the relationship between the driving waveform at the time when the bias voltage is applied and the light transmitting state.

FIG. 83 shows the effect of the maintaining of the memory state in accordance with the alternating bias. V is a voltage which applies to the liquid crystal element, I shows the transmitting state of the liquid crystal element. The voltage of V1 is applied to the liquid crystal element to turn the state I1, then the voltage of 0 V is applied to the liquid crystal element, so the memory of the liquid crystal element fall from I1 to I5 as indicated with the dotted line. However, the deterioration of the memory property can be improved by applying the alternating bias so that the state of I3 is maintained. FIG. 78 is a block diagram showing the practical circuit for realizing the driving waveform according to the present embodiment employing the effect of the alternating bias. 781 is a flame signal, 782 is a signal for switching the polarity. The transmission gate 111 is switched by these signals 781 and 782, then the voltages of V2, V3, −V4, and −V5 are switched to form the common selecting waveform 784, and the voltages of V1 and −V6 are switched to form the common electrode non-selecting waveform 785 by the signal 783. And the voltages of V7 and −V8 are switched to form the "ON" waveform 786 and the "OFF" waveform 787 for the segment electrode. FIG. 79 shows the time charts of these waveforms. Each of the signals 784, 785, 786, and 787 of FIG. 79 is input to the driving circuit as shown in FIG. 81. 784 is connected to 8101 and 8102, 785 is connected to 8103, 786 is connected to 8105, and 787 is connected to 8104, respectively.

In FIG. 81, 121 is a common electrode data. This common electrode data 121 is transmitted to the common electrode shift register 115 by the common electrode shift clock 120, then the transmission gate 111 is switched by outputting the selecting signal per one common electrode successively to form the common driving waveform 8107. 117 is a segment electrode data. This segment electrode data 117 is transmitted to the shift register 114 by the segment electrode shift clock 118. After the data enough for one common electrode is transmitted, the segment electrode data 117 is latched to the latch circuit 116 by the latch pulse 119. The transmission gate 111 is switched by the output of the latch circuit 116, then the signals of 8104 and 8105 are switched to form the segment driving waveform 8106. The time charts of the waveforms of 8107 and 8106 and the synthetic waveform thereof are shown in 801, 802, and 803 of FIG. 81. The driving conditions of the driving waveform are as follows.

| | |
|---|---|
| $\|V1\| = \|-V6\|$ | $\|V7\| = \|-V8\|$ |
| $\|-V5 + V7\| > \|Vsat2\|$ | $(V3 + V8) = Vsat1$ |
| $(V3 - V7) < Vth1$ | $(V2 - V7) > Vsat1$ |
| $\|-V4 + V8\| < \|Vth2\|$ | $(-V4 - V7) > \|Vsat2\|$ |
| $V7 < Vth1$ | $\|-V8\| < \|Vth2\|$ |
| $\|V2\| = \|-V5\|$ | $\|V3\| = \|-V4\|$ |
| $t14 = t15$ | |

Figure 80:
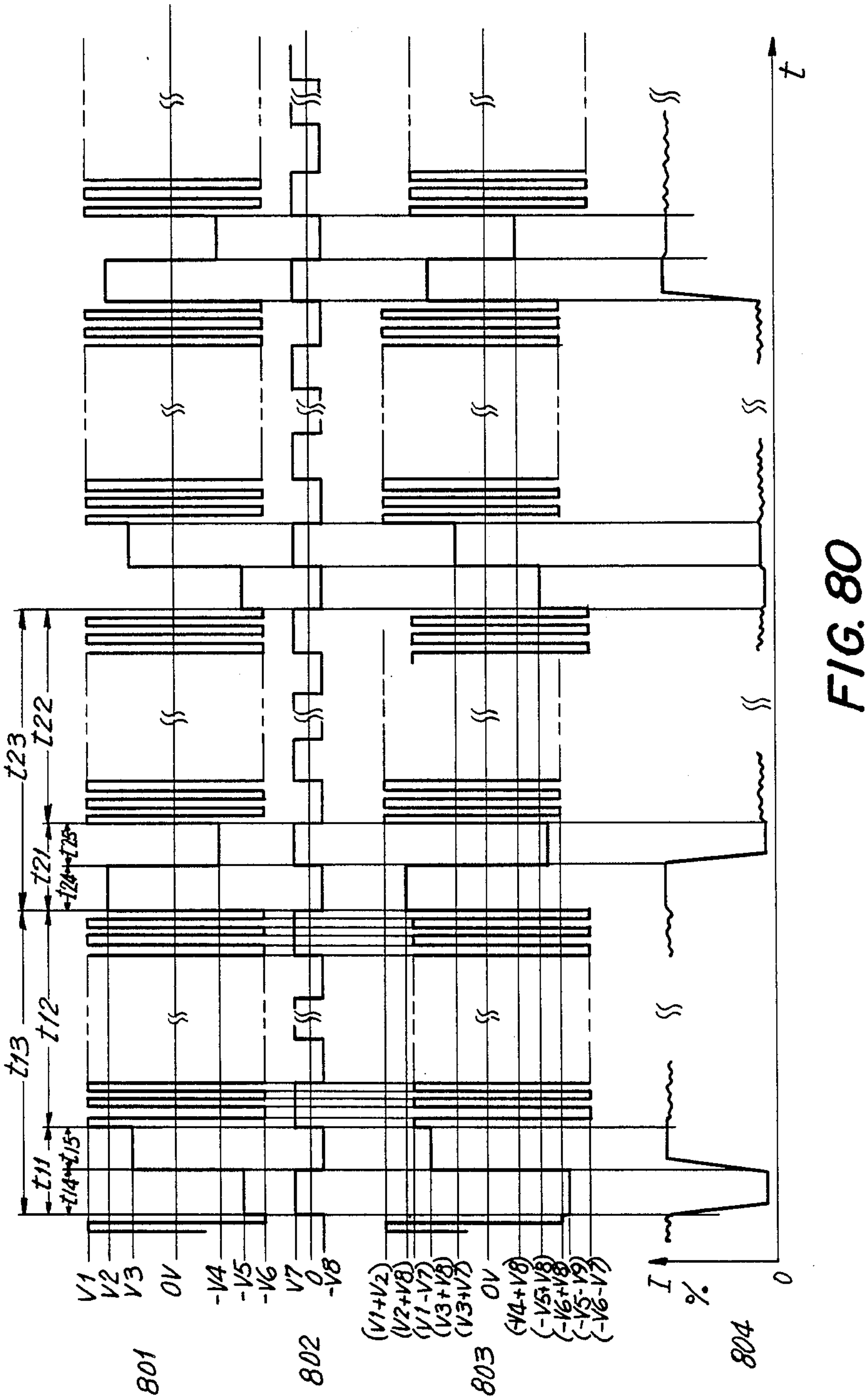
FIG. 80 shows the relationship between the driving waveform and the light transmitting state indicated in Embodiment 27 of the present invention.

With respect to the picture element 8111 of FIG. 81, the movement of the liquid crystal element is explained as follows. The term t11 of FIG. 80 is the selecting term of the odd numbered flame. During the term t14, the memory state is erased to turn the "OFF" state by applying the erase pulse having the voltage pulse whose absolute value is more than the negative saturation voltage. During the term t15, when the segment driving waveform is the "ON" waveform, the writing pulse having the voltage pulse more than the positive saturation voltage is applied to the liquid crystal element to turn the liquid crystal element "ON" state, on the other hand, when the segment driving waveform is the "OFF" waveform, the writing pulse having the voltage pulse less than the positive threshold voltage is applied to the liquid crystal element to maintain the "OFF" state. The term t12 is the non-selecting term, and the high frequency alternating bias is applied. The frequency and the voltage of the high frequency alternating bias is the limit value in which the liquid crystal molecules can not respond, and the frequency is several KHz to several tens of KHz, the voltage is several 10 V. The memory property is improved by the alternating bias of the non-selecting term, thereby storing the data. For the even numbered flame, the term t21 is the selecting term. During the term t24, the memory state is erased to turn the "ON" state by applying the erase pulse having the voltage pulse having the opposite polarity with respect to that in the odd numbered flame and being less than the negative thretthold voltage. During the term t25, when the segment electrode is the "ON" waveform, the writing pulse having the voltage pulse whose avsolute value is less than the negative thretthold voltage is applied to maintain the "ON" state, on the other hand, when the segment electrode is the "OFF" waveform, the writing pulse having the voltage pulse whose absolute value is more than the negative saturation voltage is applied to turn the liquid crystal element "OFF" state. The memory state during the non-selecting term is maintained by the high frequency alternating bias as shown in the odd numbered flame. In the present embodiment, the driving waveform in the binary display is explained, however the driving waveform in the gradation method can be drived in the same manner. Concerning the waveform applied to the common electrode, as shown in the present embodiment, it has only to change the voltage applied to the segment electrode by the gradation data so that the voltage applied to the liquid crystal element during the writing pulse t15 and t25 is changed between the thretthold voltage and the saturation voltage. And further, the pulse width of the segment driving waveform is changed by the gradation data, thereby obtaining the gradation display.

What is claimed is:

1. A method for driving a liquid crystal display being multiplex driven by a linear sequential scan, the liquid crystal display including a ferroelectric liquid crystal interposed between a pair of spaced apart substrates, one substrate having a common electrode group and one substrate having a segment electrode group arranged on a matrix array on their confronting surfaces, said method comprising:

applying during a selecting term a selecting signal and a non-selecting signal to said common electrode group;

applying a voltage pulse to said segment electrode group, the average voltage thereof being equal to an intermediate voltage of the voltage pulse which is applied to said segment electrode group;

the voltage pulse selected so that at least one voltage pulse having an amplitude which is more than a saturation voltage and which aligns said ferroelectric liquid crystal molecules to a predetermined orientating direction for turning the liquid crystal molecules "ON" or "OFF" state is applied to said ferroelectric liquid crystal during a first half of a selecting term or during a non-selecting term; or the voltage pulse for selecting the "ON" or "OFF" state is applied to the ferroelectric liquid crystal during a latter half of said selecting term or a selecting term just after said non-selecting term.

2. A method for driving a liquid crystal element according to claim 1, wherein at least one of the positive and negative voltage pulses having the amplitude and the pulse width which are more than the saturation voltage and whose absolute value and the pulse width are equal each other is applied sequentially to said ferroelectric liquid crystal during the selecting term so that the "ON" or "OFF" state is selected in accordance with in the order of applying said positive and negative voltage pulses, and a voltage pulse having an amplitude and the pulse width less than the threshold voltage and whose average value is equal to zero is applied to said ferroelectric liquid crystal during the non-selecting term.

3. A method for driving a liquid crystal element according to claim 2, wherein a high frequency alternating pulse having the amplitude and the pulse width which are less than the threshold voltage is applied during the non-selecting term, said pulse width is smaller than that of the voltage pulse which is applied in the selecting term.

4. A method for driving a liquid crystal element according to claim 1, wherein at least one of the positive and negative pulses having the amplitude and the pulse width which are more than the saturation voltage and whose absolute value and the pulse width are equal each other or the positive and negative pulses having the amplitude and the pulse width which are less than the threshold voltage and whose absolute value and the pulse width are equal each other is applied to said ferroelectric liquid crystal sequentially during the selecting term, and the positive and negative pulses having the amplitude and the pulse width which are less than the threshold voltage and whose absolute value and the pulse width are equal each other is appied just before said selecting term of the non-selecting term.

5. A method for driving a liquid crystal element according to claim 1, wherein after a first voltage pulse having the amplitude and the pulse width is at least more than the saturation voltage is applied, a second voltage pulse is applied to said ferroelectric liquid crystal during the selecting term, said second voltage pulse has the same pulse width as said first voltage pulse and a opposite polarity with respect to said first voltage pulse, and the absolute value of the amplitude of said second voltage is different from said first voltage pulse at the predetermined value, and a voltage pulse having the amplitude and the pulse width which are less than the threshold voltage is applied during the non-selecting term, the average of said applied voltage is equal to the difference of the amplitude between the voltage pulses of said first voltage pulse and said second voltage pulse.

6. A method for driving a liquid crystal element according to claim 5, wherein a high frequency alternating pulse having the pulse width which is smaller than that of the voltage pulse applied during said selecting term is applied during the non-selecting term, the average of said applied voltage is equal to the difference of the amplitude of said first voltage pulse and said second voltage pulse.

7. A method for driving a liquid crystal element according to claim 1, wherein one of the positive and negative first voltage pulse having the amplitude and the pulse width at least more than the saturation voltage is applied to said ferroelectric liquid crystal alternately at the intervals of one frame, then one of the positive and negative second voltage pulse having the opposite polarity with respect to said first voltage pulse is applied to the ferroelectric liquid crystal alternately at the intervals of one frame during the selecting term, the pulse width of the second voltage pulse is equal to that of the first voltage pulse and the amplitude of the second voltage pulse is smaller than that of the first voltage pulse at the predetermined value, and the voltage pulse having the amplitude and the pulse width smaller than the threshold voltage is applied to said ferroelectric liquid crystal during the non-selecting term, the average of the applied voltage pulse is equal to zero.

8. A method for driving a liquid crystal element according to claim 7, wherein the high frequency alternating pulse having the amplitude and the pulse width smaller than the threshold voltage is applied during the non-selecting term, said pulse width is smaller than that of the voltage pulse which is applied during said selecting term.

9. A method for driving a liquid crystal element according to claim 1, wherein the positive and the negative voltage pulse having the amplitude and the pulse width more than the saturation voltage is applied to said ferroelectric liquid crystal alternately at the interval of one frame in a term just before the selecting term within the non-selecting term, or the second voltage pulse having the opposite polarity with respect to said first voltage pulse and having the same pulse width is applied alternately at the intervals of one flame during the selecting term, the absolute value of the amplitude of the applied second pulse is smaller than that of the first voltage pulse at the predermined value.

10. A method for driving a liquid crystal element according to one of claims 7 to 9, wherein it is selected that to maintain or to turn the "ON" or "OFF" state which is selected by said first voltage pulse in accordance with the amplitude or the waveform of said second voltage pulse.

* * * * *